United States Patent
Shintani

(10) Patent No.: US 8,348,526 B2
(45) Date of Patent: *Jan. 8, 2013

(54) FOCAL PLANE SHUTTER DEVICE AND IMAGING DEVICE

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/005,517

(22) Filed: Jan. 12, 2011

(65) Prior Publication Data

US 2011/0176799 A1 Jul. 21, 2011

(30) Foreign Application Priority Data

| Jan. 15, 2010 | (JP) | 2010-006593 |
| May 31, 2010 | (JP) | 2010-123986 |
| Jan. 6, 2011 | (JP) | 2011-001299 |

(51) Int. Cl.
- *G03B 19/12* (2006.01)
- *G03B 9/08* (2006.01)
- *G03B 9/40* (2006.01)

(52) U.S. Cl. .................. 396/357; 396/456; 396/484

(58) Field of Classification Search .................. 396/357, 396/456, 484, 443

See application file for complete search history.

(56) References Cited

U.S. PATENT DOCUMENTS

| 4,975,722 | A * | 12/1990 | Suzuki et al. | 396/456 |
| 6,390,691 | B1 * | 5/2002 | Nakagawa | 396/357 |
| 6,749,348 | B2 | 6/2004 | Seita | |
| 7,708,480 | B2 * | 5/2010 | Yoshida et al. | 396/510 |
| 8,167,507 | B2 * | 5/2012 | Shintani | 396/443 |
| 2010/0026881 | A1 | 2/2010 | Kim | |
| 2010/0027987 | A1 | 2/2010 | Tanaka et al. | |
| 2010/0067897 | A1 | 3/2010 | Sakai | |
| 2011/0164871 | A1 | 7/2011 | Shintani | |

FOREIGN PATENT DOCUMENTS

| JP | 2001-311979 A | 11/2001 |
| JP | 2004-61865 A | 2/2004 |
| JP | 2007-316503 A | 12/2007 |
| JP | 2009-88825 A | 4/2009 |
| JP | 2010-34818 A | 2/2010 |
| JP | 2010-72077 A | 4/2010 |

OTHER PUBLICATIONS

Shintani, "Focal Plane Shutter Device and Imaging Device" filed Dec. 21, 2010, U.S. Appl. No. 12/973,911.
Notice of Allowance (mailed Feb. 9, 2012) issued in co-pending U.S. Appl. No. 12/973,911.

* cited by examiner

*Primary Examiner* — Christopher Mahoney
(74) *Attorney, Agent, or Firm* — Shinjyu Global IP

(57) ABSTRACT

A focal plane shutter device includes a shutter base plate having an opening part, a front curtain, a first elastic member, a rear curtain, a second elastic member, and a drive unit. The front curtain is movable between a first and second position to cover and uncover the opening. The first urging member is configured to move the front curtain between the first and second positions. The rear curtain is movable between a first and second position to cover and uncover the opening. The second urging member is configured to move the rear curtain between the first and second positions. The drive unit is configured to resist the first and second urging members. The drive unit is also configured to hold the front curtain at the second position when resisting the first urging member and hold the rear curtain at the first position when resisting the second urging member.

18 Claims, 41 Drawing Sheets

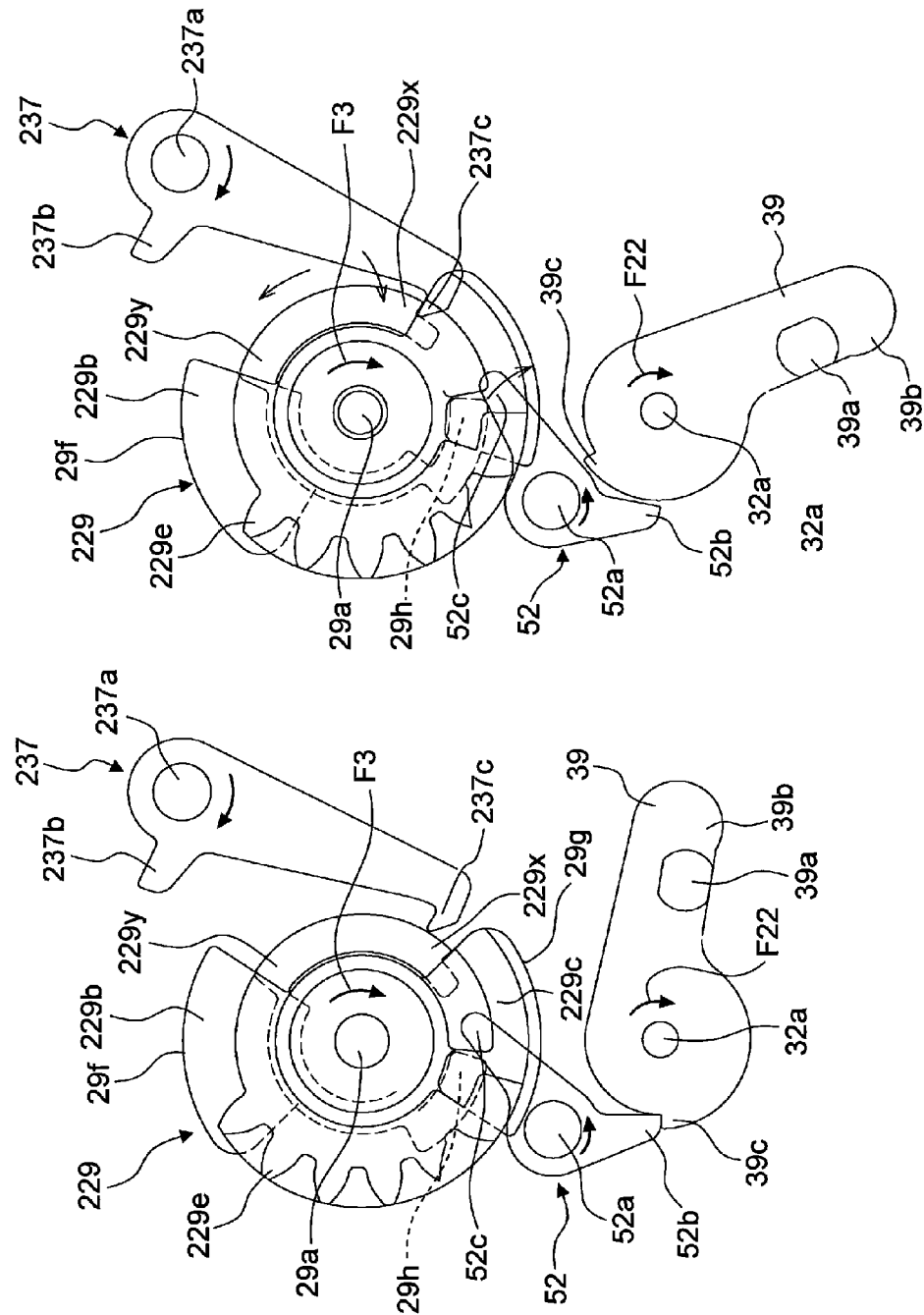

FOCAL PLANE SHUTTER DEVICE AND IMAGING DEVICE

CROSS-REFERENCE TO RELATED APPLICATIONS

This application claims priority under 35 U.S.C. §119 to Japanese Patent Application No. 2010-006593 filed on Jan. 15, 2010, Japanese Patent Application No. 2010-123986 filed on May 31, 2010, and Japanese Patent Application No. 2011-001299 filed on Jan. 6, 2011. The entire disclosures of Japanese Patent Applications No. 2010-006593, No. 2010-123986 and No. 2011-001299 are hereby incorporated herein by reference.

BACKGROUND

1. Technical Field

The technology disclosed herein relates to a focal plane shutter device used in an imaging device.

2. Background Information

Japanese Patent Laid-Open Publication No. 2004-061865 discloses a focal plane shutter device having a so-called normally open function.

Japanese Patent Laid-Open Publication No. 2007-316503 discloses a focal plane shutter device corresponding to electronic front curtain photography. This focal plane shutter device utilizes an electronic shutter function of an imaging element to realize a function of the front curtain, and thus, it is possible to photograph by merely running the rear curtain without using the front curtain.

However, there has not been proposed a focal plane shutter device capable to performing a slit exposure using a front curtain and a rear curtain and capable of maintaining a state where an opening part is shielded while retracting the front curtain at the time of charging the front curtain and the rear curtain.

SUMMARY

One object of a technology disclosed herein is to provide a focal plane shutter device capable of performing a slit exposure using a front curtain and a rear curtain and capable of maintaining a state where an opening part is shielded while retracting the front curtain at the time of charging the front curtain and the rear curtain.

In view of the objective above, a focal plane shutter device is provided that comprises a shutter base plate defining an opening, a front curtain, a first elastic member, a rear curtain, a second elastic member, and a drive unit. The front curtain is movably disposed between a first front curtain position to cover the opening and a second front curtain position to uncover the opening. The first urging member is configured to apply an urging force to the front curtain to move the front curtain from the first front curtain position to the second front curtain position. The rear curtain is movably disposed between the first rear curtain position to cover the opening and the second rear curtain position to uncover the opening. The second urging member is configured to apply an urging force to the rear curtain to move the rear curtain from the first rear curtain position to the second rear curtain position. The drive unit is configured to apply a first biasing force to the first urging member to resist the urging force of the first urging member and apply a second biasing force to the second urging member to resist the urging force of the second urging member. The drive unit is further configured to hold the front curtain at the second front curtain position when the first biasing force is being applied to the first urging member and hold the rear curtain at the first rear curtain position when the second biasing force is being applied to the second urging member.

These and other objects, features, aspects and advantages of the present invention will become apparent to those skilled in the art from the following detailed description, which, taken in conjunction with the annexed drawings, discloses embodiments of the present invention.

BRIEF DESCRIPTION OF DRAWINGS

Referring now to the attached drawings which form a part of this original disclosure:

FIG. 39A is a configuration diagram of the charge lever, the return lock lever, the rear-curtain drive lever and the rear-curtain lock lever, and FIG. 39B is a configuration diagram of the charge lever, the return lock lever, the rear-curtain drive lever and the rear-curtain lock lever;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Digital Camera

By using drawings, an overview of a digital camera 1 on which a focal plane shutter device 190 is mounted will be explained. It is noted that the focal plane shutter device 190 can be mounted on cameras other than the digital camera 1 of the embodiments.

Figure 1:
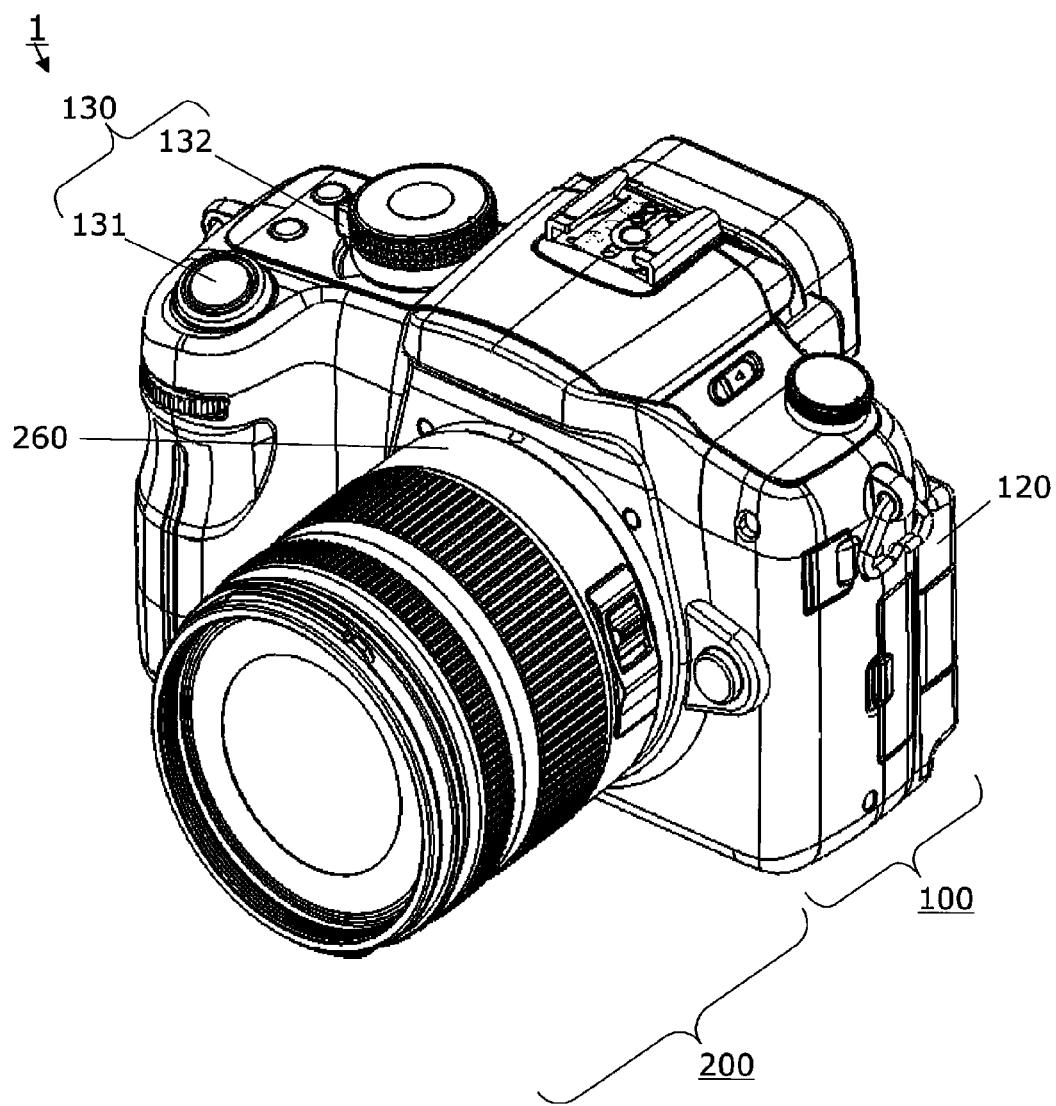
FIG. 1 is a perspective view of a digital camera 1.
Figure 2:
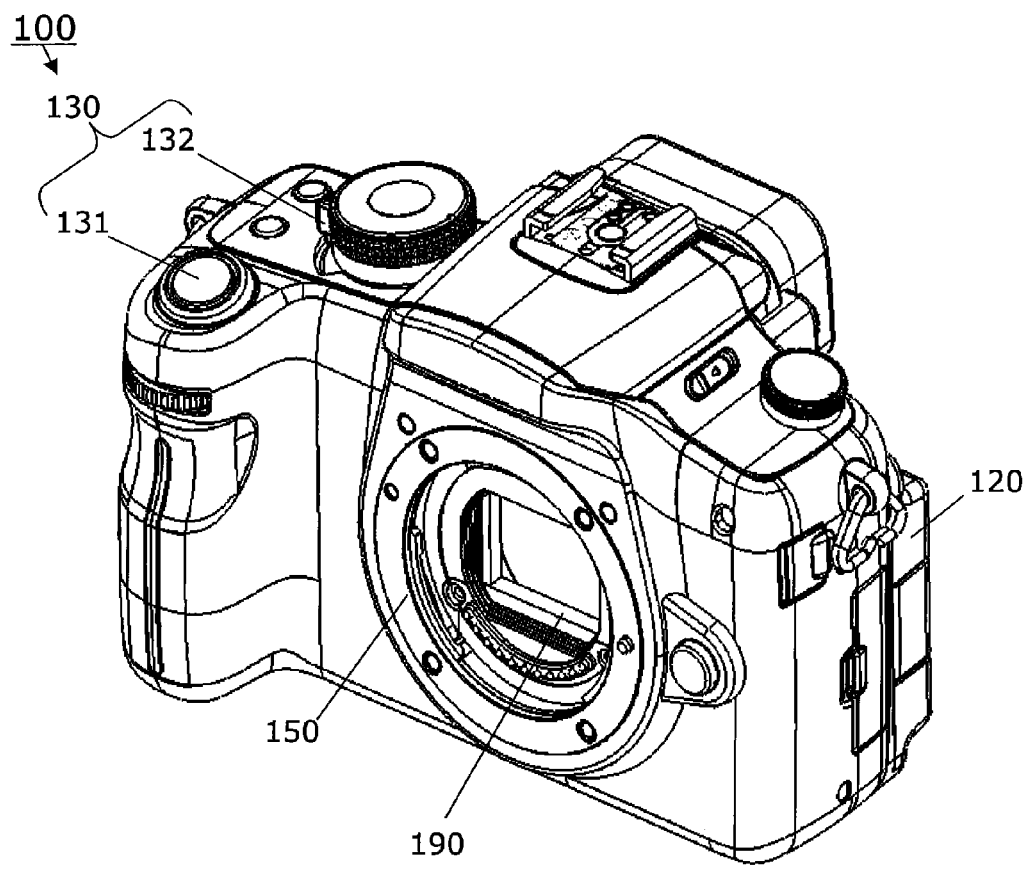
FIG. 2 is a perspective view of a camera body 100.
Figure 3:
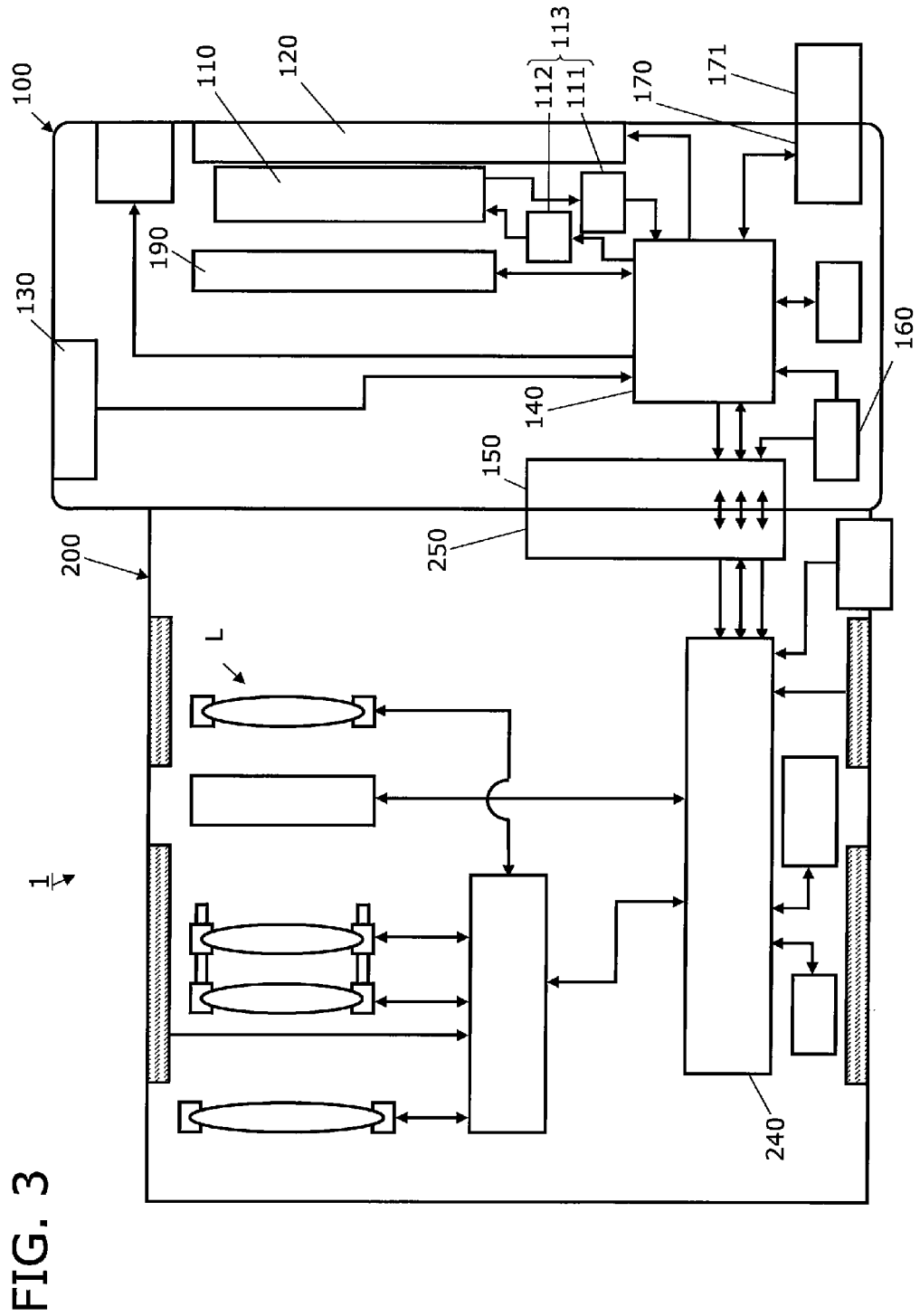
FIG. 3 is a block diagram of the digital camera 1.

FIG. 1 is a perspective view of the digital camera 1 according to the first embodiment. FIG. 2 is a perspective view of a camera body 100. FIG. 3 is a functional block diagram of the digital camera 1.

The digital camera 1 is an interchangeable-lens-type digital camera, and includes: the camera body 100 and a lens unit 200 attachable to the camera body 100.

Figure 4:
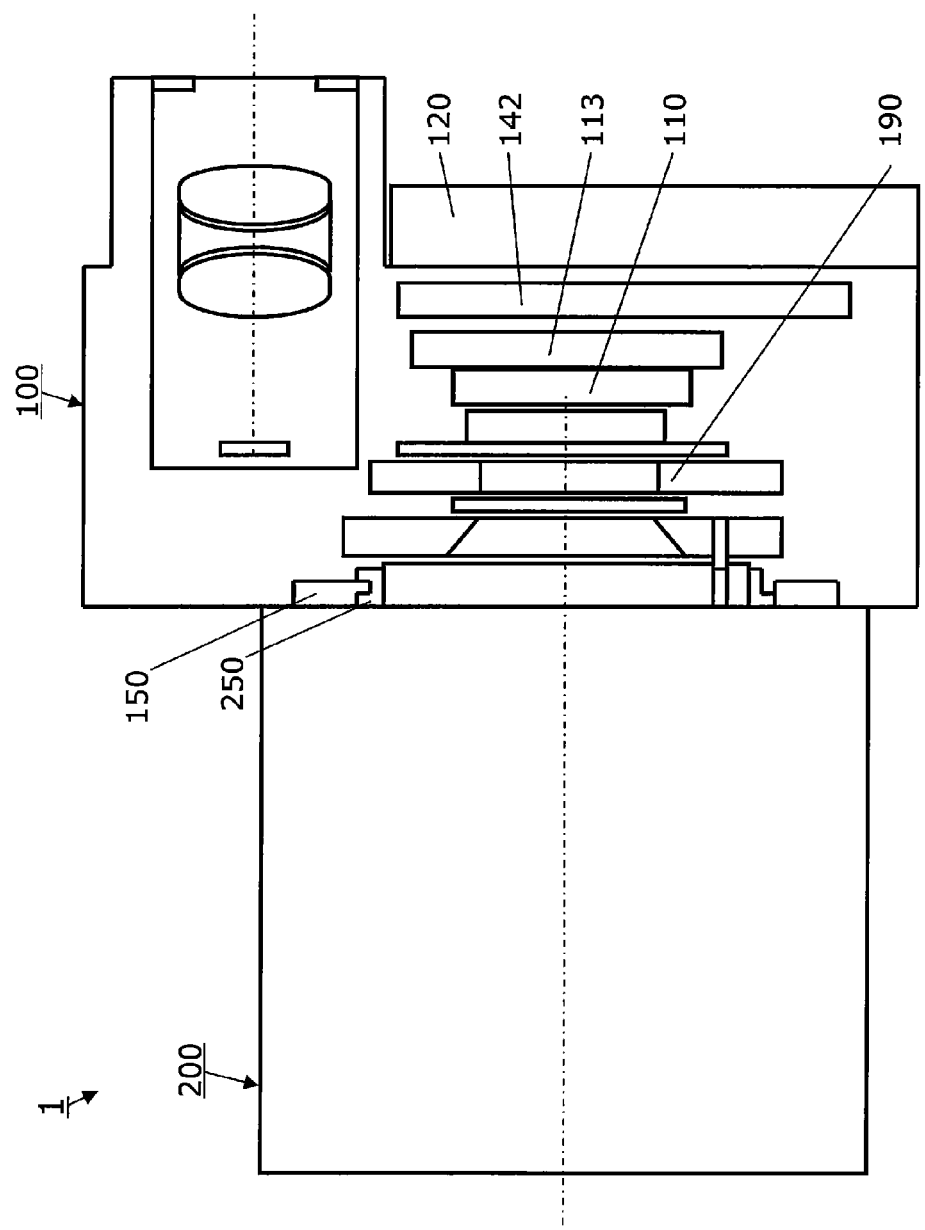
FIG. 4 is a simplified cross section of the digital camera 1.
Figure 5:
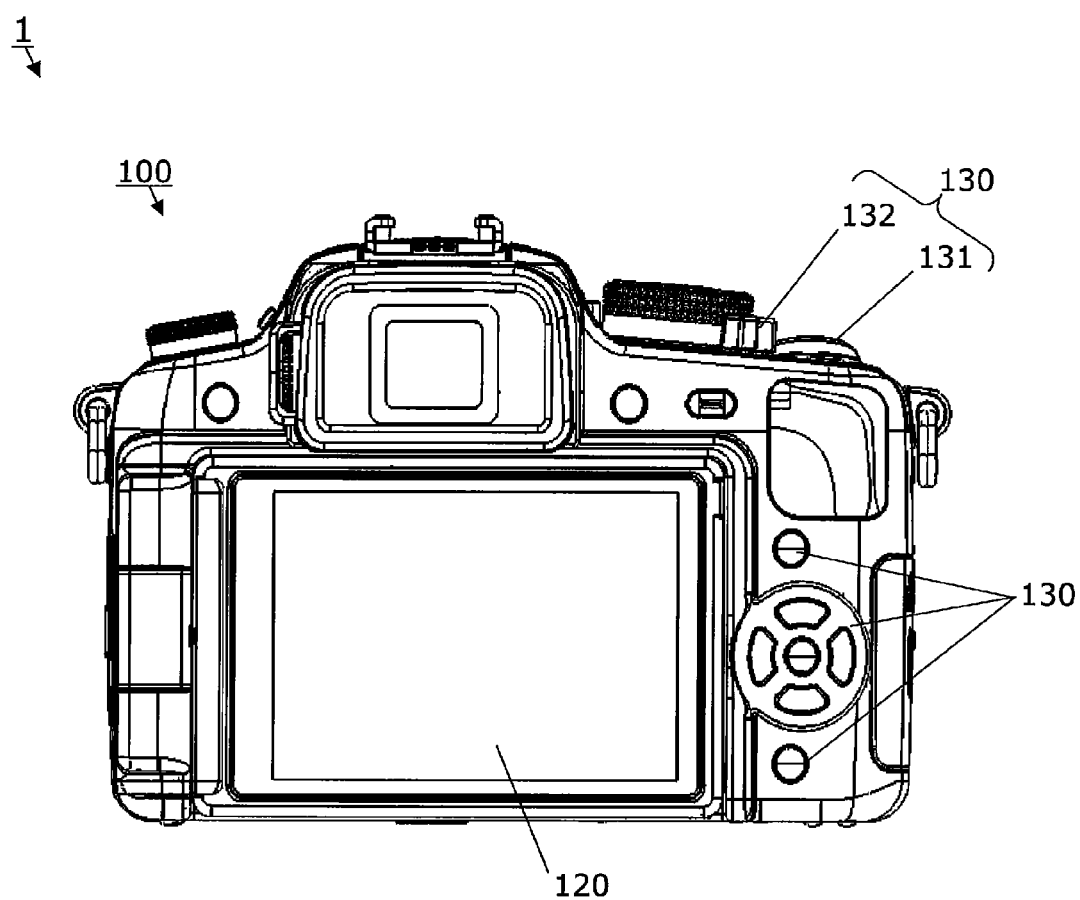
FIG. 5 is a rear view of the camera body 100.

FIG. 4 is a simplified cross section of the digital camera 1. FIG. 5 is a rear view of the camera body 100. The camera body 100 mainly includes: a Complementary Metal Oxide Semiconductor (CMOS) image sensor 110, a CMOS circuit board 113, a camera monitor 120, an operation part 130, a main circuit board 142 including a camera controller 140, a body mount 150, a power supply 160, a card slot 170, and a focal plane shutter device 190.

The CMOS image sensor 110 (an example of an imaging element) converts an optical image of a subject (hereinafter, may also be referred to as a subject image) incident via the lens unit 200, into image data. The produced image data is digitalized by an AD converter 111 of the CMOS circuit board 113. The image data digitalized by the AD converter 111 is subjected to various imaging processing in the camera controller 140. The various imaging processing referred to here include, for example, gamma correction processing, white balance correction processing, scratch correction processing, YC conversion processing, electronic zoom processing, and JPEG compression processing.

The CMOS image sensor 110 operates based on a timing signal generated by a timing generator 112. The CMOS image sensor 110 can obtain still picture data and moving picture data under control by the CMOS circuit board 113. The obtained moving picture data is also used for displaying through-images. It is noted that the still picture data and the moving picture data are examples of the image data.

A "through-image" here is an image out of the moving picture data that is not recorded on a memory card 171. Primarily, the through-image is a moving picture, and is displayed on the camera monitor 120 to decide the composition of a moving or a still picture.

The CMOS image sensor 110 can obtain a low-resolution moving picture used as the through-image and can obtain a high-resolution moving picture used for recording. The high-resolution moving picture may include a moving picture of an HD size (High-Definition size: 1920×1080 pixels), for example. It is noted that the CMOS image sensor 110 is an example of the imaging element for converting the optical image of the subject into an electric image signal. The imaging element is a concept encompassing not only the CMOS image sensor 110 but also an opto-electrical conversion element such as a CCD image sensor.

The CMOS image sensor 110 has an electronic front curtain function for sequentially resetting a pixel in a running direction of a front curtain 21 described later.

The CMOS circuit board 113 is a circuit board for controlling the CMOS image sensor 110. The CMOS circuit board 113 is a circuit board for performing predetermined processing on the image data outputted from the CMOS image sensor 110, and includes the timing generator 112 and the AD converter 111. The CMOS circuit board 113 is an example of an imaging element circuit board for controlling the drive of the imaging element and performing predetermined processing such as AD conversion on the image data outputted from the imaging element.

The camera monitor 120 is, for example, a liquid crystal display and displays, for example, an image represented by display-use image data. The display-use image data is produced by the camera controller 140. The display-use image data is data for displaying image data which undergoes imaging processing, a photography condition of the digital camera 1, and an operation menu, as an image, for example. The camera monitor 120 is capable of selectively displaying the moving picture and the still picture.

The camera monitor 120 is provided to the camera body 100. In the first embodiment, the camera monitor 120 is disposed on the rear face of the camera body 100, however, the camera monitor 120 may also be disposed on anywhere of the camera body 100.

It is noted that the camera monitor 120 is an example of a display part provided to the camera body 100. Other examples of the display part include means capable of displaying an image such as an organic electroluminescence, an inorganic electroluminescence, and a plasma display panel. Moreover, the display part need not be provided on the rear face of the camera body 100, and may be provided on a side face, a top face, or another such place.

Figure 6:
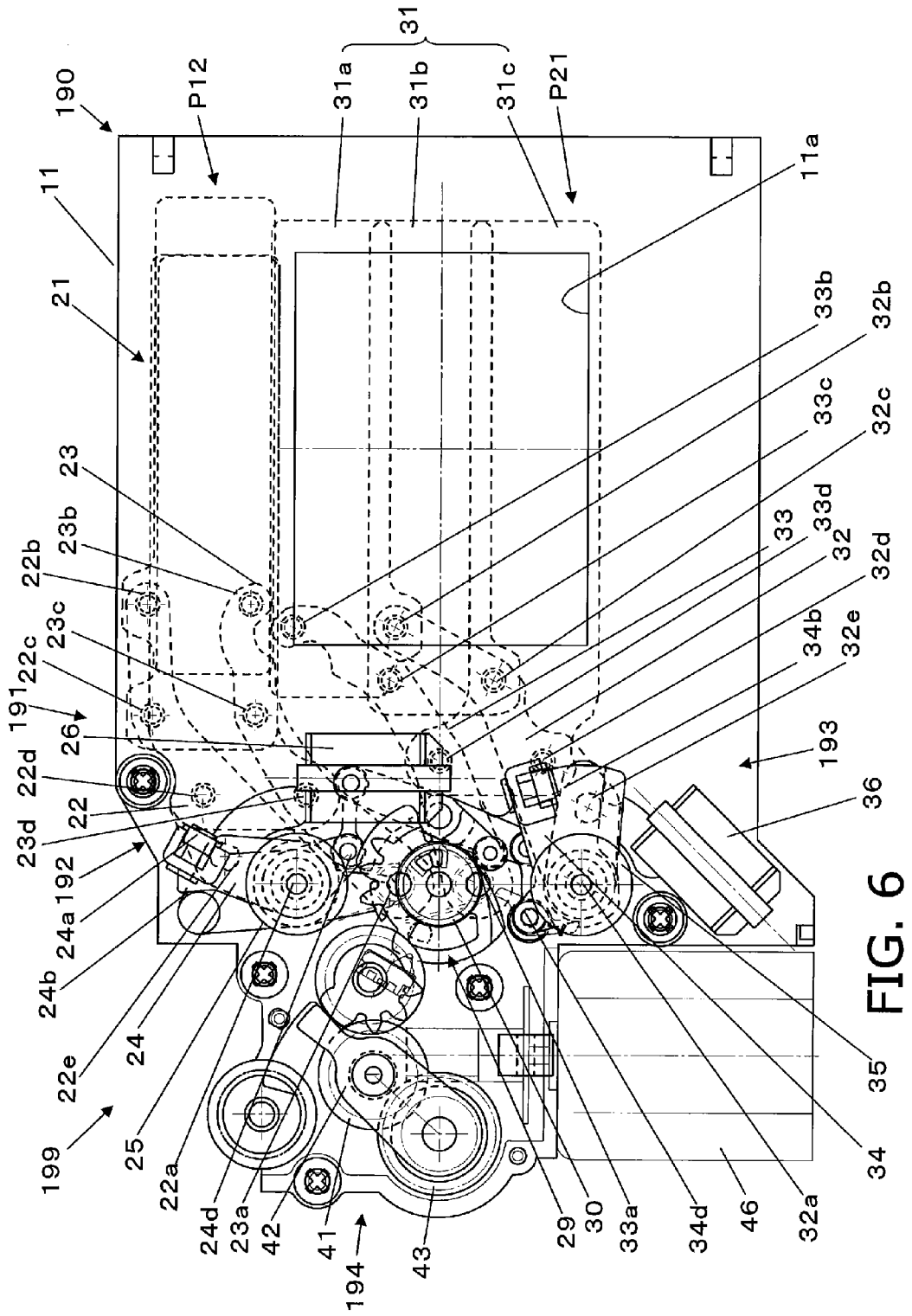
FIG. 6 is a state diagram of a focal plane shutter device 190 in a state where a rear curtain completes running.
Figure 7:
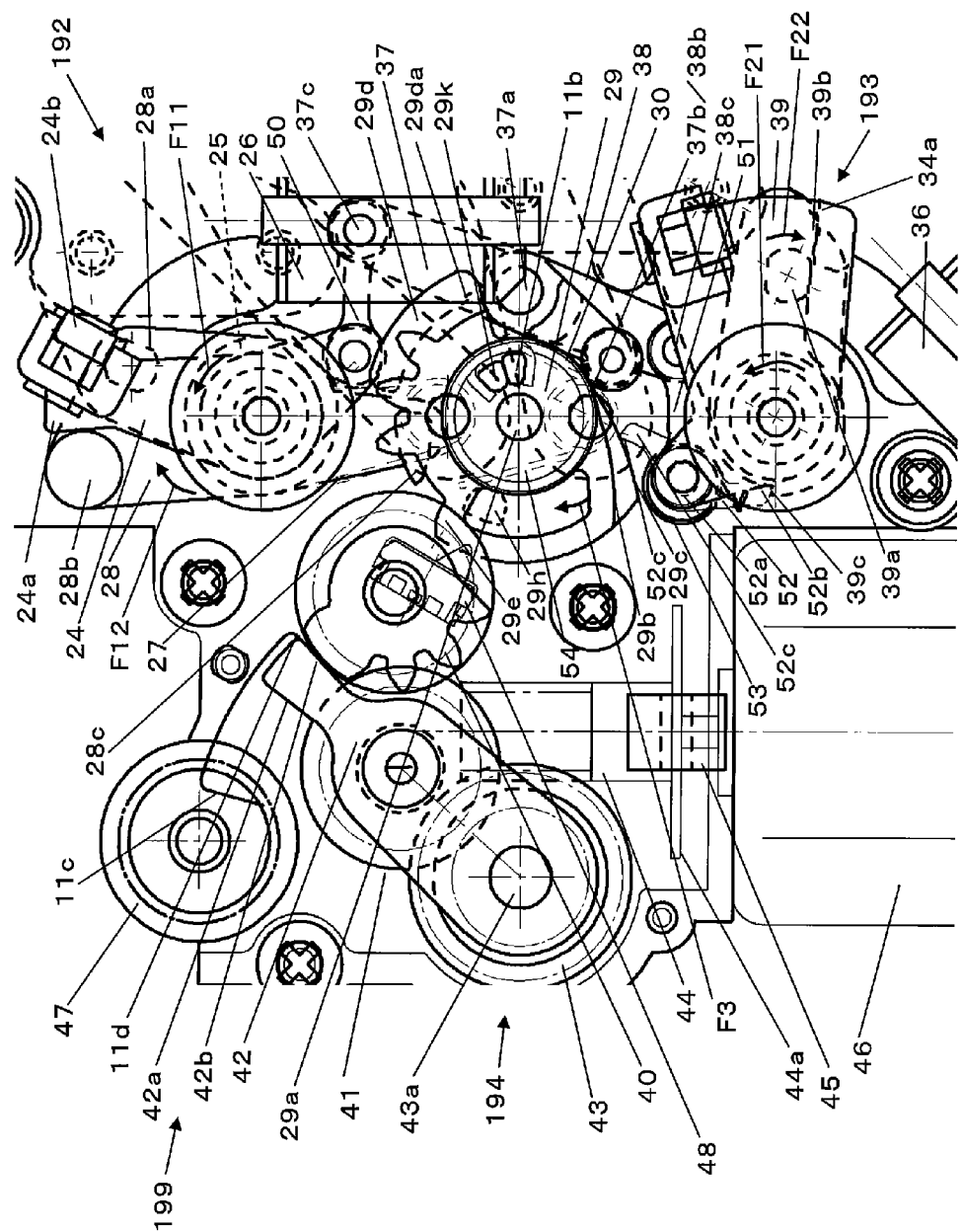
FIG. 7 is a detailed view of main parts in FIG. 6.

The operation part 130 receives operations by a user. Specifically, as shown in FIGS. 6 and 7, the operation part 130 includes a release button 131 for receiving a focal plane shutter operation by the user, and a power switch 132 that is a rotary dial switch provided on the top face of the camera body 100. The operation part 130 may suffice if it is possible to receive the operations by the user, and includes a button, a lever, a dial, a touch panel, etc.

The camera controller 140 (an example of a controller) controls each part of the camera body 100. The camera controller 140 receives commands from the operation part 130. The camera controller 140 transmits a signal used for controlling the lens unit 200 to a lens controller 240 via the body mount 150 and a lens mount 250, and indirectly controls each part of the lens unit 200. That is, the camera controller 140 controls the entire digital camera 1.

The camera controller 140 controls the CMOS circuit board 113. Specifically, the camera controller 140 transmits a control signal to the CMOS circuit board 113, and the CMOS circuit board 113 controls the CMOS image sensor 110 based on the received control signal. That is, the camera controller 140 controls the CMOS image sensor 110. Moreover, the camera controller 140 obtains the image data which is produced by the CMOS image sensor 110 and on which the predetermined processing such as AD conversion has been performed by the CMOS circuit board 113, and further performs processing on the obtained image data. For example, the camera controller 140 produces display-use image data, recording-use moving picture data, etc., from the image data processed by the CMOS circuit board 113.

Further, the camera controller 140 controls the focal plane shutter device 190 described later. Specifically, when photographing by using an electronic front curtain photography function, the camera controller 140 controls the motor 46 so that a charge lever 29 stops at a rear-curtain charge completion position. The camera controller 140 establishes an electronic front curtain photography standby state of the focal plane shutter device 190 when a charge mechanism 194 completes imparting a rear-curtain running spring 35 with a second bias force F23 (see FIG. 7) and the charge mechanism 194 does not complete the imparting a front-curtain running spring 25 with a first bias force F13 (see FIG. 13).

The memory card 171 is attachable to a card slot 170. The card slot 170 controls the memory card 171 based on the control signal transmitted from the camera controller 140. Specifically, the card slot 170 stores the image data on the memory card 171. The card slot 170 outputs the image data from the memory card 171. Moreover, the card slot 170 stores the moving picture data on the memory card 171. The card slot 170 outputs the moving picture data from the memory card 171.

The memory card 171 is capable of storing the image data that is produced through imaging processing by the camera controller 140. For example, the memory card 171 is capable of storing a non-compressed RAW image file, a compressed JPEG image file, etc. Moreover, the memory card 171 is also capable of outputting via the card slot 170 image data or image file that has been previously stored inside the memory card 171. The image data or the image file outputted from the memory card 171 is subjected to imaging processing by the camera controller 140. For example, the camera controller 140 decompresses the image data or the image file obtained from the memory card 171 so as to produce the display-use image data.

The memory card 171 is further capable of storing the moving picture data that is produced through imaging processing by the camera controller 140. For example, the memory card 171 is capable of storing the moving picture file compressed according to H.264/AVC that is a moving picture compression standard. Moreover, the memory card 171 is capable of outputting via the card slot 170 the moving picture data or moving picture file that has been previously stored inside the memory card 171. The moving picture data or the moving picture file outputted from the memory card 171 is subjected to imaging processing in the camera controller 140. For example, the camera controller 140 decompresses the moving picture data or the moving picture file obtained from the memory card 171 so as to produce the display-use image data.

It is noted that the memory card 171 is an example of a storage part. The storage part may be attachable to the camera body 100, as in the case of the memory card 171, and may also be fixed to the digital camera 1.

The power supply 160 supplies each part with power used in the digital camera 1. The power supply 160 may be a dry battery and a rechargeable battery, for example. Moreover, the power supply 160 may also be a unit that receives power from an external power supply via a power supply cord, etc., so as to supply the digital camera 1 with the power.

The body mount 150 engages with the lens mount 250. The body mount 150 supports the lens unit 200. Moreover, the body mount 150 and the lens mount 250 can be electrically connected. The camera body 100 can transmit and receive at least one of the data and the control signal to and from the lens unit 200 via the body mount 150 and the lens mount 250.

The focal plane shutter device 190 (an example of a focal plane shutter device) is disposed in front of the CMOS image sensor 110 (on a subject side), and controls an exposure time of the CMOS image sensor 110. In the focal plane shutter device 190, there are a state in which light toward the CMOS image sensor 110 from an optical system L is shielded (close state), and a state in which the light toward the CMOS image sensor 110 from the optical system L is transmitted (open state). The focal plane shutter device 190 will be explained in detail later.

The lens unit 200 may be attached to the camera body 100, and forms an optical image of the subject. Specifically, the lens unit 200 includes: the optical system L, a drive part 215, the lens mount 250, the lens controller 240, and a lens barrel 260.

The optical system L forms the optical image of the subject, on a light-receiving face of the CMOS image sensor 110.

The lens controller 240 controls the entire lens unit 200 based on the control signal transmitted from the camera controller 140.

2: Configuration of the Focal Plane Shutter Device

By using FIGS. 6 to 11, the focal plane shutter device 190 according to the first embodiment will be explained.

The focal plane shutter device 190 includes: an opening-part opening/closing mechanism 191, a front-curtain drive mechanism 192, a rear-curtain drive mechanism 193, and the charge mechanism 194.

2.1: Opening-Part Opening/Closing Mechanism 191

As shown in FIG. 6, the opening-part opening/closing mechanism 191 includes: a shutter base plate 11, a front curtain 21, a front-curtain drive arm 22, a front-curtain driven arm 23, a rear curtain 31, a rear-curtain drive arm 32, and a rear-curtain driven arm 33. The shutter base plate 11 has two plates. Between the two plates, there is formed a gap that is sufficient for the front curtain 21 and the rear curtain 31 to run. The shutter base plate 11 has an opening part (also referred to as an aperture) 11a for guiding the subject light from the optical system L to the CMOS image sensor 110.

Figure 12:
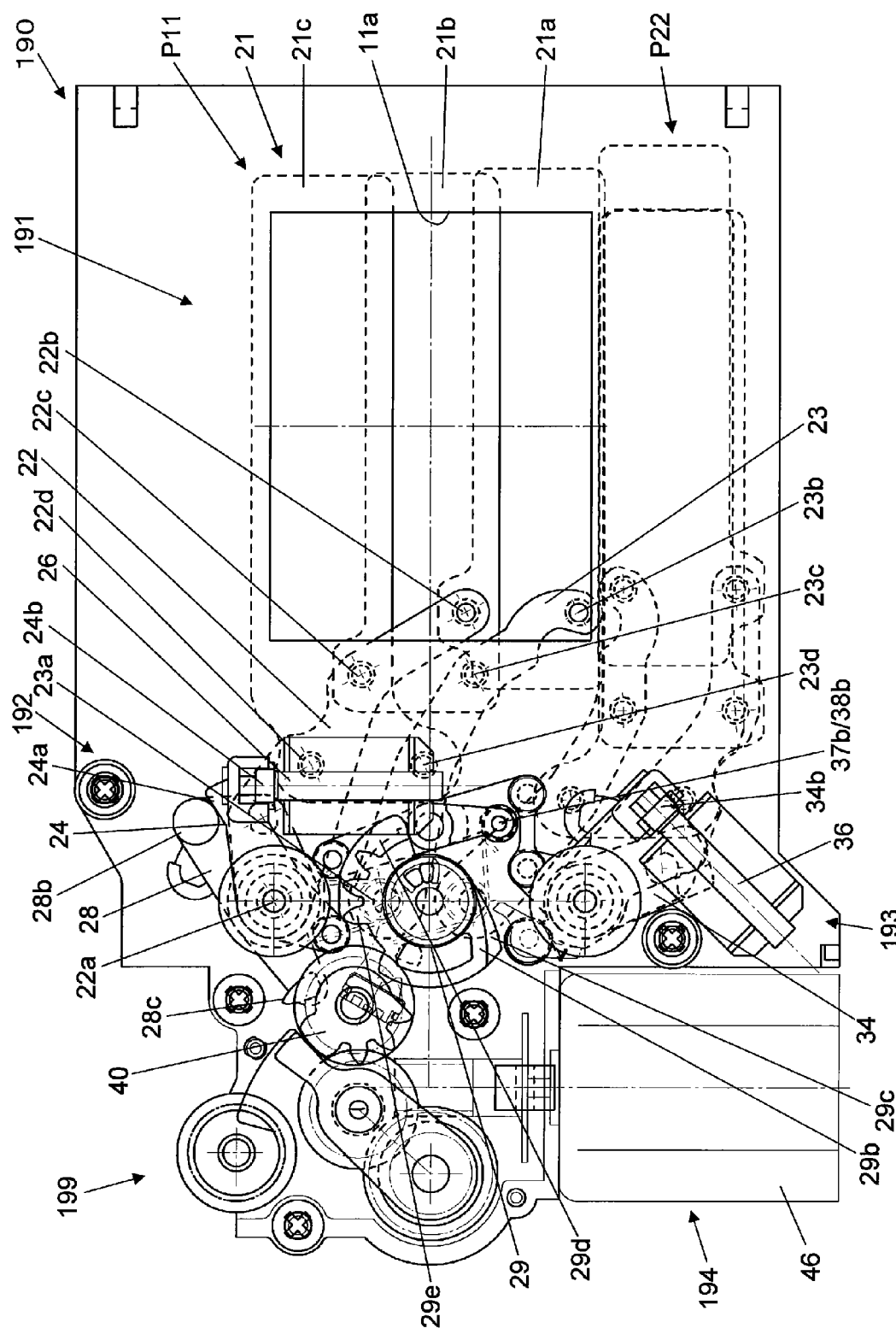
FIG. 12 is a state diagram of the focal plane shutter device 190 in a slit exposure standby state.

As shown in FIGS. 6 and 12, the front curtain 21 (an example of a front curtain) is disposed to be movable between a first front curtain position P11 (an example of a first front curtain position) and a second front curtain position P12 (an example of a second front curtain position). At the first front curtain position P11, the front curtain 21 covers the opening part 11a. As shown in FIG. 6, at the second front curtain position P12, the front curtain 21 is retracted from the opening part 11a. A state where the front curtain 21 covers the opening part 11a is also referred to as a photography standby state of the front curtain 21. As shown in FIG. 12, a state where the front curtain 21 is retracted from the opening part 11a is also referred to as a running completion state of the front curtain 21. By the front-curtain drive arm 22 and the front-curtain driven arm 23, the front curtain 21 is supported to be movable between the first front curtain position P11 and the second front curtain position P12.

The front-curtain drive arm 22 is rotatably disposed relative to the shutter base plate 11. As shown in FIG. 12, the front-curtain drive arm 22 includes a rotating shaft 22a, a shaft 22b, a shaft 22c, and a shaft 22d. The front curtain 21 includes a first front curtain blade 21a, a second front curtain blade 21b, and a third front curtain blade 21c. The front-curtain drive arm 22 is rotatably supported around the rotating shaft 22a by the shutter base plate 11. By the front-curtain drive arm 22, the first front curtain blade 21a is rotatably supported around the shaft 22b, the second front curtain blade 21b is rotatably supported around the shaft 22c, and the third front curtain blade 21c is rotatably supported around the shaft 22d, respectively.

Moreover, the front-curtain driven arm 23 is rotatably disposed relative to the shutter base plate 11. Specifically, the front-curtain driven arm 23 includes a rotating shaft 23a, a shaft 23b, a shaft 23c, and a shaft 23d. The front-curtain driven arm 23 is rotatably supported around the rotating shaft 23a by the shutter base plate 11. By the front-curtain driven arm 23, the first front curtain blade 21a is rotatably supported around the shaft 23b, the second front curtain blade 21b is rotatably supported around the shaft 23c, and the third front curtain blade 21c is rotatably supported around the shaft 23d, respectively.

In this way, the front curtain 21, the front-curtain drive arm 22, and the front-curtain driven arm 23 configure a so-called parallel link mechanism. Along with the rotation of the front-curtain drive arm 22 and the front-curtain driven arm 23, the first front curtain blade 21a, the second front curtain blade 21b, and the third front curtain blade 21c sequentially move in a shorter side direction of the opening part 11a while keeping a parallel state with respect to a longer side of the opening part 11a.

Figure 10:
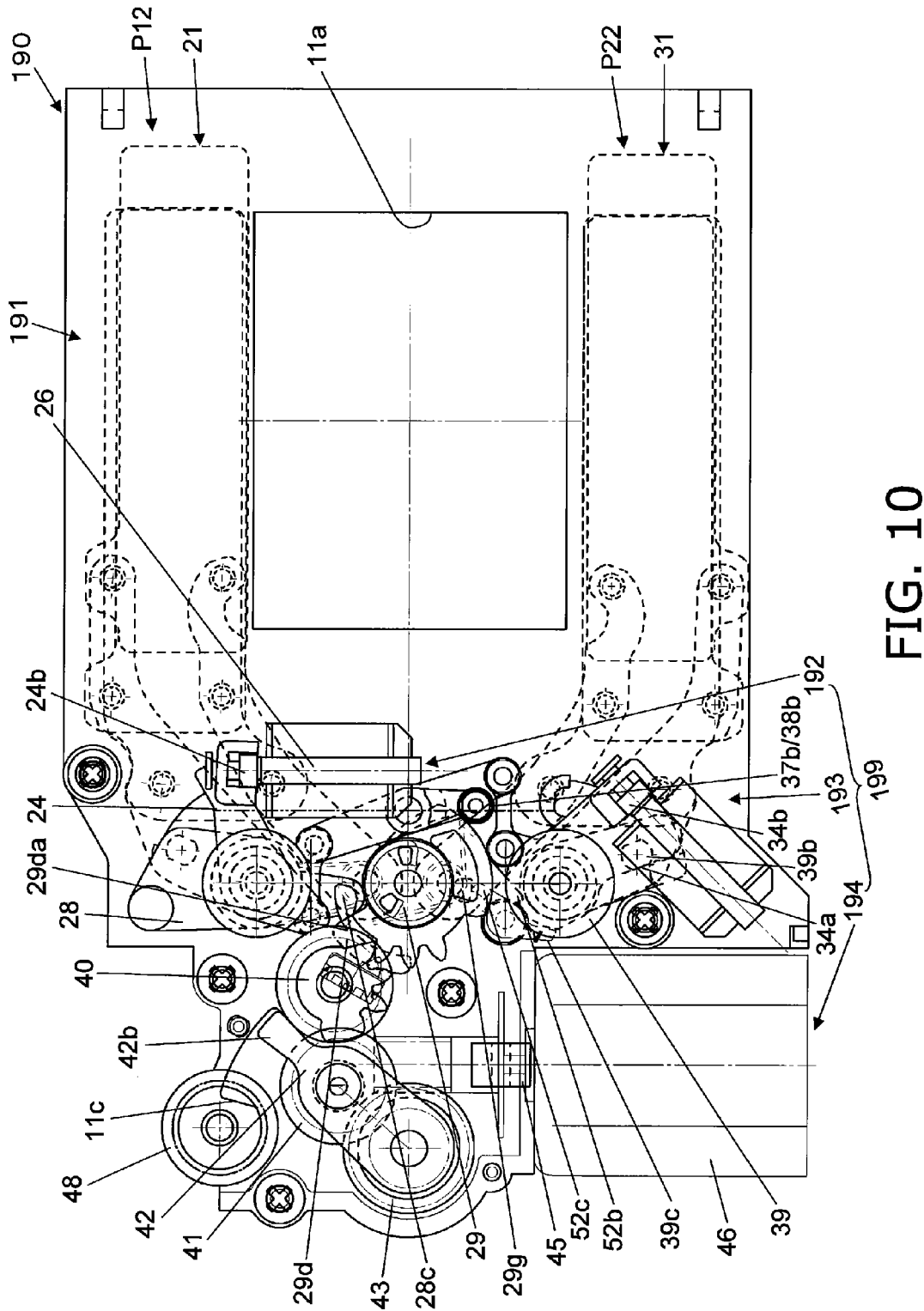
FIG. 10 is a state diagram of the focal plane shutter device 190 in front-curtain and rear-curtain charge completion states.

As shown in FIGS. 6 and 10, the rear curtain 31 (an example of a rear curtain) is disposed to be movable between a first rear curtain position P21 (an example of a first rear curtain position) and a second rear curtain position P22 (an example of a second rear curtain position). At the first rear curtain position P21, the rear curtain 31 covers the opening part 11a. As shown in FIG. 10, at the second rear curtain position P22, the rear curtain 31 is retracted from the opening part 11a. As shown in FIG. 6, a state where the rear curtain 31 covers the opening part 11a is also referred to as a running completion state of the rear curtain 31. As shown in FIG. 10, a state where the rear curtain 31 is retracted from the opening part 11a is also referred to as a photography standby state of the rear curtain 31. The rear curtain 31 is supported to be movable between the first rear curtain position P21 and the second rear curtain position P22 by the rear-curtain drive arm 32 and the rear-curtain driven arm 33.

The rear-curtain drive arm 32 is rotatably disposed relative to the shutter base plate 11. As shown in FIG. 6, the rear-curtain drive arm 32 includes a rotating shaft 32a, a shaft 32b, a shaft 32c, and a shaft 32d. The rear curtain 31 includes a first rear curtain blade 31a, a second rear curtain blade 31b, and a third rear curtain blade 31c. The rear-curtain drive arm 32 is rotatably supported around the rotating shaft 32a by the shutter base plate 11. By the rear-curtain drive arm 32, the first rear curtain blade 31a is rotatably supported around the shaft 32b, the second rear curtain blade 31b is rotatably supported around the shaft 32c, and the third rear curtain blade 31c is rotatably supported around the shaft 32d, respectively.

Moreover, the rear-curtain driven arm 33 is rotatably disposed relative to the shutter base plate 11. Specifically, the rear-curtain driven arm 33 includes a rotating shaft 33a, a shaft 33b, a shaft 33c, and a shaft 33d. The rear-curtain driven arm 33 is rotatably supported around the rotating shaft 33a by the shutter base plate 11. By the rear-curtain driven arm 33, the first rear curtain blade 31a is rotatably supported around the shaft 33b, the second rear curtain blade 31b is rotatably supported around the shaft 33c, and the third rear curtain blade 31c is rotatably supported around the shaft 33d, respectively.

In this way, the rear curtain 31, the rear-curtain drive arm 32, and the rear-curtain driven arm 33 configure a so-called parallel link mechanism. Along with the rotation of the rear-curtain drive arm 32 and the rear-curtain driven arm 33, the first rear curtain blade 31a, the second rear curtain blade 31b, and the third rear curtain blade 31c sequentially move in the shorter side direction of the opening part 11a while keeping a parallel state with respect to the longer side of the opening part 11a.

2.2: Drive Unit 199

A drive unit 199 is provided to charge the front curtain 21 and the rear curtain 31, and is arranged to impart the front-curtain running spring 25 and the rear-curtain running spring 35 with a first bias force (an example of a first biasing force) resisting an elastic force of the front-curtain running spring 25 and a second bias force (an example of a second biasing force) resisting an elastic force of the rear-curtain running spring 35.

Moreover, the drive unit 199 holds the front curtain 21 at a second front curtain position P12 at the time of imparting the front-curtain running spring 25 with the first bias force, and holds the front curtain 21 at the second front curtain position P12 in a state where the imparting the front-curtain running spring 25 with the first bias force is completed.

Further, the drive unit 199 holds the rear curtain 31 at a first rear curtain position P21 at the time of imparting the rear-curtain running spring 35 with the second bias force, and holds the rear curtain 31 at the first rear curtain position P21 in a state where the imparting the rear-curtain running spring 35 with the second bias force is completed.

To achieve the above-described function, the drive unit 199 includes: a front-curtain drive mechanism 192, a rear-curtain drive mechanism 193, and a charge mechanism 194.

2.2.1: Front-Curtain Drive Mechanism 192

As shown in FIGS. 6 and 7, the front-curtain drive mechanism 192 is provided to drive the front curtain 21, and includes: a front-curtain drive lever 28, a front-curtain set spring 27, a charge lever 29, a front-curtain set lever 24, a front-curtain running spring 25, and a front-curtain electromagnet 26.

Figure 16:
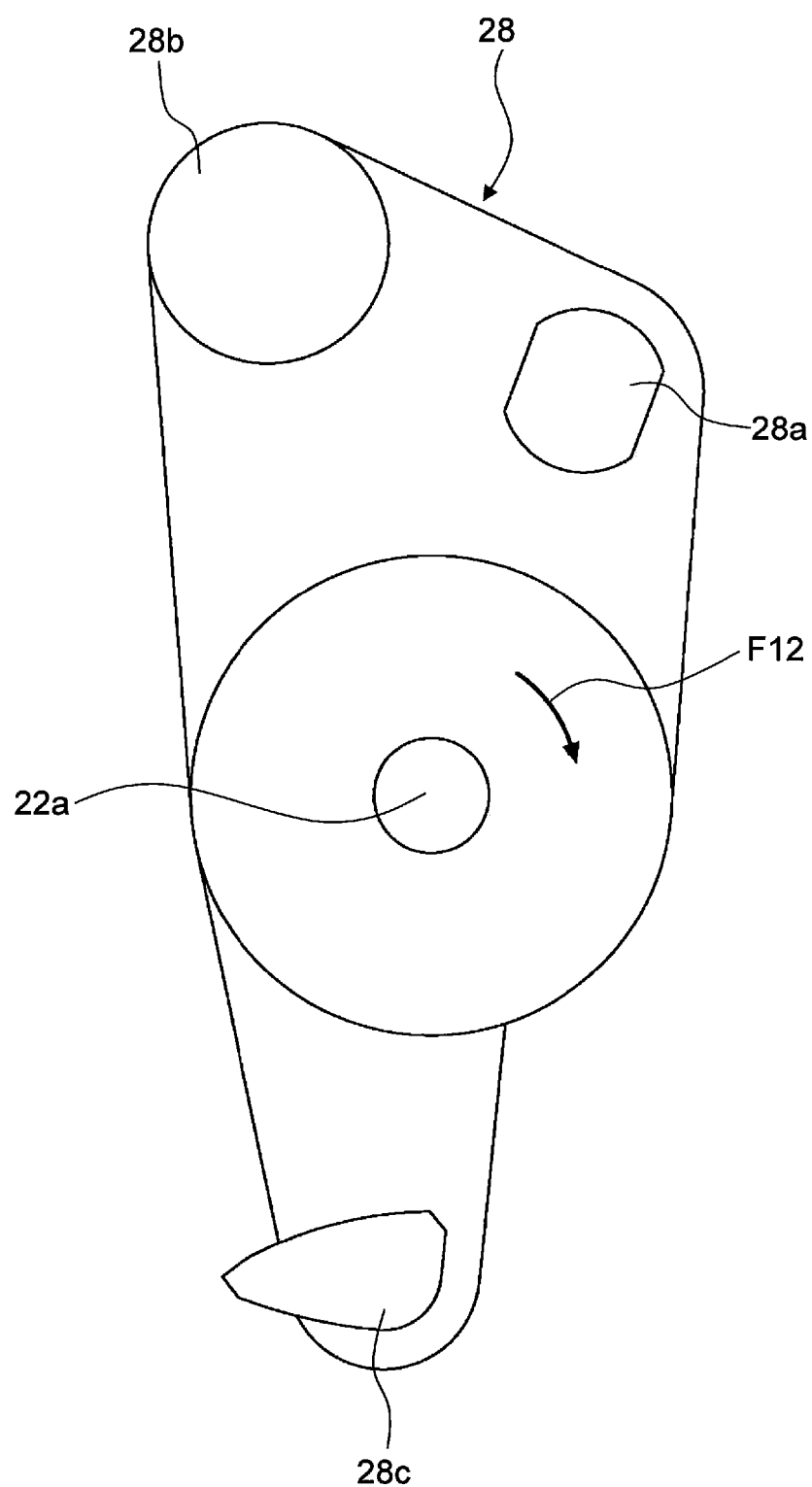
FIG. 16 is a configuration diagram of a front-curtain drive lever.

The front-curtain drive lever 28 (an example of a front curtain drive member) couples the front curtain 21 to the shutter base plate 11 to be movable between the first front curtain position P11 and the second front curtain position P12. As shown in FIG. 16, the front-curtain drive lever 28 includes a drive coupling pin 28a and a claw 28c. As shown in FIG. 6, the front-curtain drive arm 22 includes a coupling hole 22e. The drive coupling pin 28a is inserted into the coupling hole 22e. Similarly to the front-curtain drive arm 22, the front-curtain drive lever 28 is rotatably supported by the rotating shaft 22a around the rotating shaft 22a. The front-curtain drive arm 22 and the front-curtain drive lever 28 can integrally rotate around the rotating shaft 22a.

The front-curtain set spring 27 (an example of a third elastic member) biases the front-curtain drive lever 28 in a direction where the front curtain 21 covers the opening part 11a. Specifically, as shown in FIG. 7, the front-curtain set spring 27 imparts the front curtain 21 with an elastic force F12 so that the front curtain 21 moves from the first front curtain position P11 to the second front curtain position P12. The elastic force F12 of the front-curtain set spring 27 is smaller than the elastic force F11 of the front-curtain running spring 25. The front-curtain set spring 27 is hooked onto the front-curtain driven arm 23, and thus, the elastic force F12 of the front-curtain set spring 27 acts upon the front-curtain drive arm 22. In the first embodiment, the front-curtain set spring 27 applies a clockwise rotation force to the front-curtain drive lever 28.

As shown in FIG. 16, the front-curtain drive lever 28 includes a front-curtain-drive-lever contacting portion 28b. As show in FIG. 17A, the front-curtain set lever 24 includes a front-curtain-set-lever contacting portion 24a. As shown in FIG. 7, the front-curtain-drive-lever contacting portion 28b abuts the front-curtain-set-lever contacting portion 24a. Similarly to the front-curtain drive lever 28, the front-curtain set lever 24 is rotatably supported by the rotating shaft 22a around the rotating shaft 22a. When the front-curtain set lever 24 rotates counterclockwise, the front-curtain-drive-lever contacting portion 28b is pushed by the front-curtain-set-lever contacting portion 24a, which in turn rotates the front-curtain drive lever 28 counterclockwise. When the front curtain 21 moves from the first front curtain position P11 to the second front curtain position P12, the front-curtain set lever 24 transmits the elastic force F11 of the front-curtain running spring 25 to the front curtain 21 via the front-curtain drive lever 28. That is, at the time of imparting the front-curtain running spring 25 with the first bias force F13, the charge mechanism 194 imparts the front-curtain running spring 25 with the first bias force F13 via the front-curtain set lever 24.

Moreover, by the elastic force F12 of the front-curtain set spring 27, the front-curtain drive lever 28 is imparted with clockwise rotation force. This brings the front-curtain-set-lever contacting portion 24a and the front-curtain-drive-lever contacting portion 28b contact each other. The counterclockwise rotation of the front-curtain set lever 24 is restricted by a stopper (not shown) at a position shown in FIG. 6. Thus, when the front-curtain set lever 24 and the front-curtain drive lever 28 integrally rotate counterclockwise, the front-curtain set lever 24 and the front-curtain drive lever 28 stop at the position shown in FIG. 6. By the elastic force F11 of the front-curtain running spring 25, the front-curtain set lever 24 and the front-curtain drive lever 28 are kept at a position shown in FIG. 6. That is, the elastic force F11 of the front-curtain running spring 25 can be transmitted to the front curtain 21 by the front-curtain drive lever 28 via the front-curtain set lever 24.

On the other hand, even when the front-curtain set lever 24 rotates clockwise, the front-curtain-set-lever contacting portion 24a does not contact the front-curtain-drive-lever contacting portion 28b, and thus, when the front-curtain set lever 24 rotates clockwise, the front-curtain set lever 24 rotates independently of the front-curtain drive lever 28. Therefore, when the charge mechanism 194 imparts the front-curtain running spring 25 with the first bias force F13, the front-curtain set lever 24 imparts the front-curtain running spring 25 with the first bias force F13 without intervention of the front-curtain drive lever 28.

As shown in FIG. 7, the front-curtain running spring 25 (an example of a first elastic member) always imparts the front-curtain set lever 24 with the strong counterclockwise elastic force F11. Specifically, the front-curtain running spring 25 imparts the front-curtain 21 with the elastic force F11 so that the front curtain 21 moves from the first front curtain position P11 to the second front curtain position P12. By the elastic force F11 of the front-curtain running spring 25, the counterclockwise rotation force is acted upon the front-curtain set lever 24. The front-curtain set lever 24 is disposed so that the elastic force F11 of the front-curtain running spring 25 can be transmitted to the front-curtain drive lever 28. Therefore, in a state where the front-curtain-set-lever contacting portion 24a contacts the front-curtain-drive-lever contacting portion 28b, as shown in FIG. 6, for example, the elastic force F11 of the front-curtain running spring 25 is transmitted to the front-curtain drive lever 28. That is, when the front curtain 21 is disposed at the first front curtain position P11, the front-curtain running spring 25 imparts the front-curtain drive lever 28 with the strong counterclockwise elastic force F11. The elastic force F11 of the front-curtain running spring 25 also is transmitted to the front-curtain drive arm 22 and the front curtain 21 via the front-curtain drive lever 28. Therefore, the front-curtain running spring 25 biases the front curtain 21 in a direction where the front curtain 21 is retracted from the opening part 11a.

At this time, the counterclockwise elastic force F11 applied by the front-curtain running spring 25 to the front-curtain drive lever 28 is larger than the clockwise elastic force F12 applied via the front-curtain set spring 27 to the front-curtain drive lever 28. Therefore, even when the elastic force F12 of the front-curtain set spring 27 is acted upon the front curtain 21, the front curtain 21 can be run toward the direction where the front curtain 21 is retracted from the opening part 11a by the elastic force F11 of the front-curtain running spring 25. The force achieved when the front curtain 21 runs is equivalent to a total force of the elastic force F11 of the front-curtain running spring 25 and the elastic force F12 of the front-curtain set spring 27.

Further, as shown in FIG. 7, to the end of the front-curtain set lever 24, a front-curtain attracting piece 24b is fixed. The front-curtain attracting piece 24b is disposed to be attracted to the front-curtain electromagnet 26. When the front-curtain electromagnet 26 is supplied with power, the front-curtain electromagnet 26 generates a magnetic force. Thus, if the front-curtain electromagnet 26 is supplied with power when the front-curtain attracting piece 24b is disposed near the front-curtain electromagnet 26, then the front-curtain attracting piece 24b is attracted to the front-curtain electromagnet 26 by the magnetic power of the front-curtain electromagnet 26. The attracting force between the front-curtain attracting piece 24b and the front-curtain electromagnet 26 has a sufficient power to counteract the elastic force F11 of the front-curtain running spring 25. Therefore, when the front-curtain attracting piece 24b is attracted to the front-curtain electromagnet 26, the position of the front-curtain set lever 24 is kept at a charge position shown in FIG. 9 even if the elastic force F11 of the front-curtain running spring 25 acts upon the front-curtain set lever 24.

2.2.3: Rear-Curtain Drive Mechanism 193

As shown in FIGS. 6 and 7, a rear-curtain drive mechanism 193 is provided to drive the rear curtain 31, and includes: a rear-curtain drive lever 39 (an example of a rear-curtain drive member), a rear-curtain set lever 34 (an example of a rear-curtain set member), a rear-curtain running spring 35 (an example of a first urging member), and a rear-curtain locking lever 52 (an example of a rear-curtain lock member).

Figure 18:
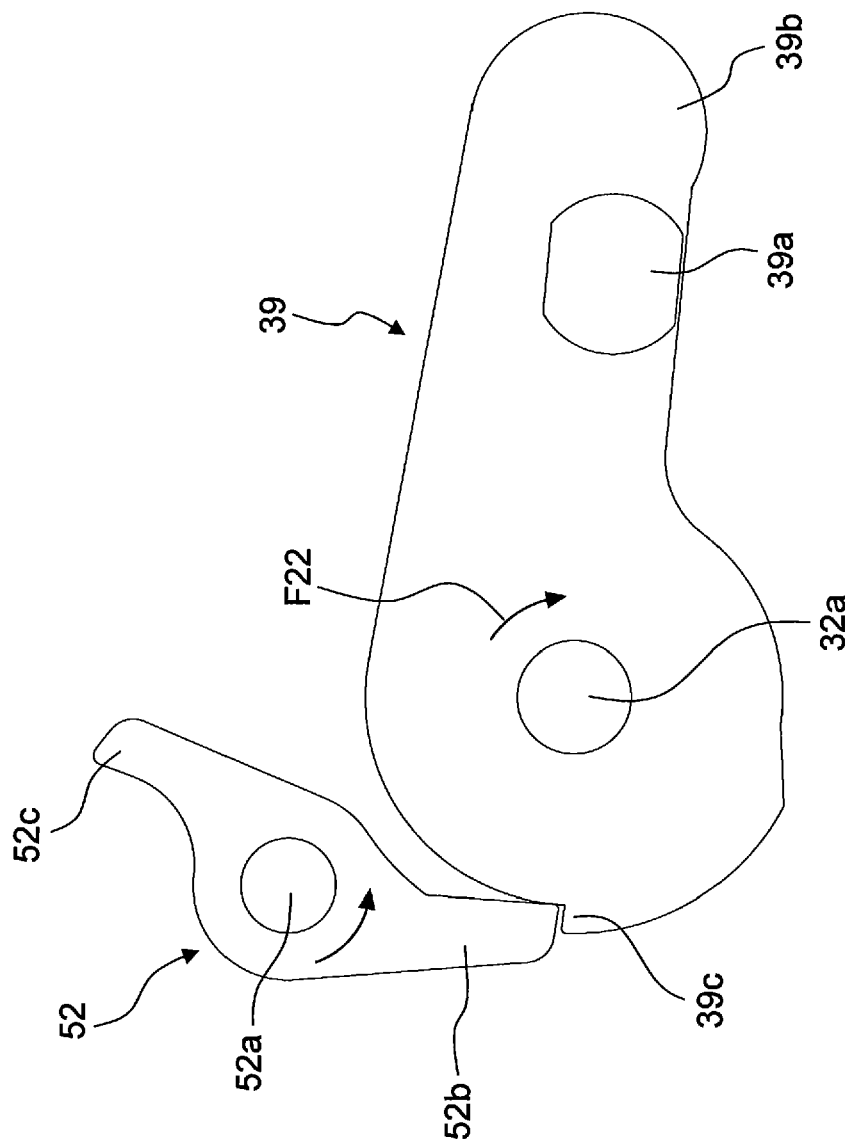
FIG. 18 is a configuration diagram of a rear-curtain drive lever and a rear-curtain lock lever.

As shown in FIGS. 7 and 18, the rear-curtain drive lever 39 couples the rear curtain 31 to the shutter base plate 11 to be movable between the first rear curtain position P21 and the second rear curtain position P22. The rear-curtain drive lever 39 includes a rear-curtain drive lever coupling pin 39a. The rear-curtain drive arm 32 includes a rear-curtain drive arm coupling hole 32e. The rear-curtain drive lever coupling pin 39a is inserted into the rear-curtain drive arm coupling hole 32e.

Moreover, the rear-curtain drive lever 39 and the rear-curtain drive arm 32 are rotatably supported by the rotation shaft 32a around the rotation shaft 32a. The rear-curtain drive arm 32 and the rear-curtain drive lever 39 can integrally rotate around the rotation shaft 32a.

A rear-curtain set spring 54 biases the rear-curtain drive lever 39 in a direction where the rear curtain 31 is retracted from the opening part 11a. Specifically, as shown in FIG. 7, the rear-curtain set spring 54 imparts the rear curtain 31 with the elastic force F22 so that the rear curtain 31 moves from the first rear curtain position P21 to the second rear curtain position P22. The elastic force F22 of the rear-curtain set spring 54 is smaller than the elastic force F21 of the rear-curtain running spring 35. The elastic force F22 of the rear-curtain set spring 54 is transmitted to the rear-curtain drive arm 32 and the rear-curtain driven arm 33. As a result, the rear-curtain set spring 54 applies the clockwise elastic force F22 to the rear-curtain drive lever 39.

Figure 17B:
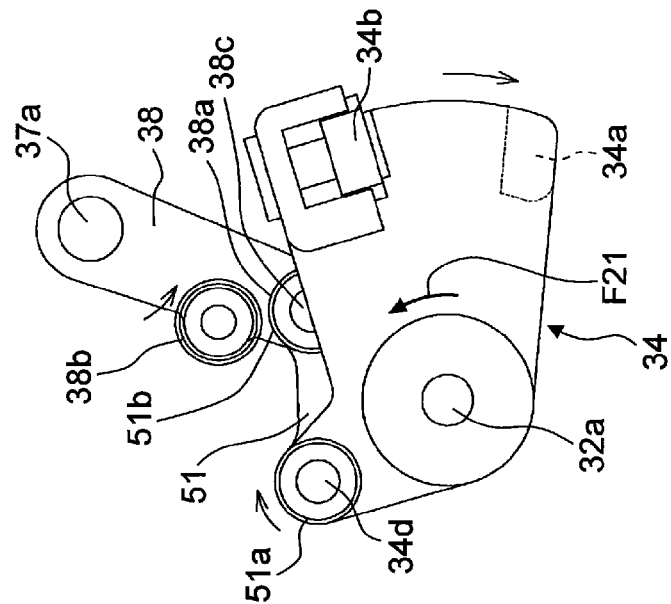
FIG. 17B is a configuration diagram of a rear-curtain set lever, a rear-curtain coupling arm and a rear-curtain link lever.

As shown in FIG. 18, the rear-curtain drive lever 39 includes a rear-curtain-drive-lever contacting portion 39b. As shown in FIG. 17B, the rear-curtain set lever 34 includes a rear-curtain-set-lever contacting portion 34a. As shown in FIG. 7, the rear-curtain-drive-lever contacting portion 39b abuts the rear-curtain-set-lever contacting portion 34a. Similarly to the rear-curtain drive lever 39, the rear-curtain set lever 34 is rotatably supported by the rotation shaft 32a around the rotation shaft 32a. When the rear-curtain set lever 34 rotates counterclockwise, the rear-curtain-drive-lever contacting portion 39b is pushed by the rear-curtain-set-lever contacting portion 34a, and as a result, the rear-curtain drive lever 39 rotates counterclockwise. When the rear curtain 31 moves from the first rear curtain position P21 to the second rear curtain position P22, the rear-curtain set lever 34 transmits the elastic force F21 of the rear-curtain running spring 35 to the rear curtain 31 via the rear-curtain drive lever 39. That is, at the time of imparting the rear-curtain running spring 35 with the second bias force F23, the charge mechanism 194 imparts the rear-curtain running spring 35 with the second bias force F23 via the rear-curtain set lever 34.

Moreover, by the elastic force F22 of the rear-curtain set spring 54, the clockwise rotation force is imparted to the rear-curtain drive lever 39. Because of this, the rear-curtain-set-lever contacting portion 34a and the rear-curtain-drive-lever contacting portion 39b contact each other. The counterclockwise rotation of the rear-curtain set lever 34 is restricted by a stopper (not shown) at a position shown in FIG. 6. Thus, when the rear-curtain set lever 34 and the rear-curtain drive lever 39 integrally rotate counterclockwise, the rear-curtain set lever 34 and the rear-curtain drive lever 39 stop at the position shown in FIG. 7. By the elastic force F21 of the rear-curtain running spring 35, the rear-curtain set lever 34 and the rear-curtain drive lever 39 keep at the position shown in FIG. 7. That is, the rear-curtain drive lever 39 is capable of transmitting the elastic force F21 of the rear-curtain running spring 35 to the rear curtain 31 via the rear-curtain set lever 34.

On the other hand, even when the rear-curtain set lever 34 rotates clockwise, the rear-curtain-set-lever contacting portion 34a does not contact the rear-curtain-drive-lever contacting portion 39b, and thus, when the rear-curtain set lever 34 rotates clockwise, the rear-curtain set lever 34 rotates independently of the rear-curtain drive lever 39. Therefore, when the charge mechanism 194 imparts the rear-curtain running spring 35 with the second bias force F23, the rear-curtain set lever 34 imparts the rear-curtain running spring 35 with the second bias force F23 without intervention of the rear-curtain drive lever 39 (see FIG. 19).

A rear-curtain locking lever 52 is arranged to restrict movement of the rear-curtain drive lever 39 when the rear curtain 31 moves from the first rear curtain position P21 to the second rear curtain position P22. Specifically, as shown in FIG. 18, the rear-curtain drive lever 39 further includes a rear-curtain locking part 39c, and the rear-curtain locking lever 52 includes a locking claw 52b. The rear-curtain locking part 39c is hooked onto the locking claw 52b in a state where the rear curtain 31 covers the opening part 11a. The rear-curtain locking lever 52 is rotatably supported by the rotation shaft 52a around the rotation shaft 52a. The rotation shaft 52a is fixed to the shutter base plate 11. To the rear-curtain locking lever 52, a counterclockwise rotation force is imparted by a rear-curtain locking spring 53 (an example of a rear-curtain lock elastic member). The rear-curtain locking spring 53 imparts the rear-curtain locking lever 52 with the elastic force so that the rear-curtain locking lever 52 keeps the state where the movement of the rear-curtain drive lever 39 is restricted. Therefore, the state where the rear-curtain locking part 39c is hooked onto the locking claw 52b is held by the elastic force of the rear-curtain locking spring 53.

Moreover, the rear-curtain locking lever 52 includes an unlocking claw 52c. The unlocking claw 52c is arranged to be contactable with a rear-curtain unlocking part 29h (described later) of the charge lever 229. When the charge lever 29 rotates counterclockwise, the rear-curtain unlocking part 29h of the charge lever 29 contacts the unlocking claw 52c of the rear-curtain locking lever 52, and the rear-curtain locking lever 52 is driven by the motor 46 via the charge lever 29 to resist the elastic force of the rear-curtain locking spring 53. Thus, the rear-curtain locking lever 52 rotates in a clockwise direction resisting the elastic force of the rear-curtain locking spring 53, and the locking claw 52b is removed from the rear-curtain locking part 39c. In this way, the locking of the rear-curtain drive lever 39 is released.

As shown in FIG. 7, the rear-curtain running spring 35 (an example of a second urging member) biases the rear curtain 31 in a direction where the rear curtain 31 covers the opening part 11a. Specifically, the rear-curtain running spring 35 imparts the rear curtain 31 with the elastic force F21 via the rear-curtain drive arm 32 so that the rear curtain 31 moves from the second rear curtain position P22 to the first rear curtain position P21. By the elastic force F21 of the rear-curtain running spring 35, the strong counterclockwise rotation force is acted upon the rear-curtain set lever 34. The rear-curtain set lever 34 is arranged to transmit the elastic force F21 of the rear-curtain running spring 35 to the rear-curtain drive lever 39. Therefore, as shown in FIG. 7, for example, in a state where the rear-curtain-set-lever contacting portion 34a contacts the rear-curtain-drive-lever contacting portion 39b, the elastic force F21 of the rear-curtain running spring 35 is transmitted to the rear-curtain drive lever 39 via the rear-curtain set lever 34. That is, when the rear curtain 31 is disposed at the second rear curtain position P22, the rear-curtain running spring 35 imparts the rear-curtain drive lever 39 with the strong counterclockwise elastic force F21. The elastic force F21 of the rear-curtain running spring 35 is transmitted to the rear-curtain drive arm 32 and the rear curtain 31 via the rear-curtain drive lever 39. Therefore, the rear-curtain running spring 35 biases the rear curtain 31 in a direction where the rear curtain 31 covers the opening part 11a.

In this case, the counterclockwise elastic force F21 applied by the rear-curtain running spring 35 to the rear-curtain drive lever 39 is larger than the clockwise elastic force F22 applied by the rear-curtain set spring 54 to the rear-curtain drive lever 39. Therefore, even in a state where the elastic force F22 of the rear-curtain set spring 54 is acted upon the rear curtain 31, the rear curtain 31 can be run in a direction where the rear curtain 31 covers the opening part 11a by the elastic force F21 of the rear-curtain running spring 35. The force achieved when the rear curtain 31 runs is equivalent to a total force of the elastic force F21 of the rear-curtain running spring 35 and the elastic force F22 of the rear-curtain set spring 54.

Further, as shown in FIG. 7, a rear-curtain attracting piece 34b is fixed to the end of the rear-curtain set lever 34. The rear-curtain attracting piece 34b is disposed to be attracted to the rear-curtain electromagnet 36. When the rear-curtain electromagnet 36 is supplied with power, the rear-curtain electromagnet 36 generates a magnetic force. Thus, if the rear-curtain electromagnet 36 is supplied with the power when the rear-curtain attracting piece 34b is disposed near the rear-curtain electromagnet 36, then the rear-curtain attracting piece 34b is attracted to the rear-curtain electromagnet 36 by the magnetic force of the rear-curtain electromagnet 36. The attracting force between the rear-curtain attracting piece 34b and the rear-curtain electromagnet 36 has a sufficient power to counteract the elastic force F21 of the rear-curtain running spring 35. Therefore, when the rear-curtain attracting piece 34b is attracted to the rear-curtain electromagnet 36, the position of the rear-curtain set lever 34 is kept at a charge position shown in FIG. 9 even when the elastic force F21 of the rear-curtain running spring 35 acts upon the rear-curtain set lever 34.

2.2.4: Charge Mechanism 194

Next, the charge mechanism 194 will be explained.

The charge mechanism 194 (an example of a charge mechanism) is arranged to impart the front-curtain running spring 25 and the rear-curtain running spring 35 with a first bias force F13 resisting the elastic force F11 of the front-curtain running spring 25 and a second bias force F23 resisting the elastic force F21 of the rear-curtain running spring 35. Specifically, as shown in FIG. 7, the charge mechanism 194 includes: a front-curtain link lever 37, a front-curtain coupling arm 50, a rear-curtain link lever 38, a rear-curtain coupling arm 51, a charge lever 29, a partly tooth-missing gear part 29e, a charge-lever return spring 30, a partly tooth-missing gear 40, a planet gear 41, a planet carrier 42, a sun gear 43, a worm gear 44, and a charge-lever detection switch 48.

Figure 17A:
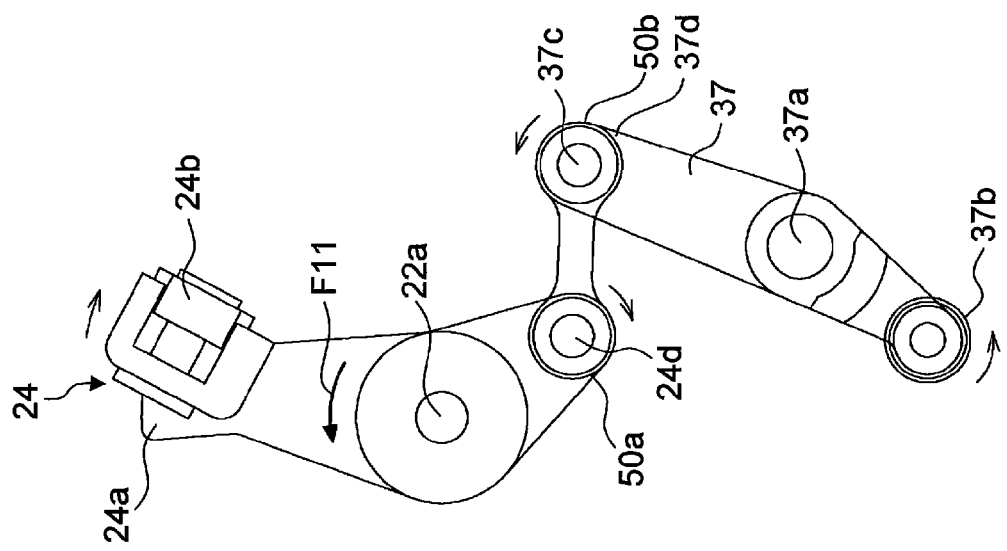
FIG. 17A is a configuration diagram of a front-curtain set lever, a front-curtain coupling arm and a front-curtain link lever.

As shown in FIG. 17A, a first end 50a of the front-curtain coupling arm 50 is rotatably coupled to the front-curtain set lever 24 via a shaft 24d. The shaft 24d is fixed to the first end 50a of the front-curtain coupling arm 50 or the front-curtain set lever 24. As shown in FIG. 17B, a first end 51a of the rear-curtain coupling arm 51 is rotatably coupled to the rear-curtain set lever 34 via a shaft 34d. The shaft 34d is fixed to the first end 51a of the rear-curtain coupling arm 51 or the rear-curtain set lever 34.

As shown in FIG. 17A, a second end 50b of the front-curtain coupling arm 50 is rotatably coupled to the first end 37d of the front-curtain link lever 37 via a shaft 37c. The shaft 37c is fixed to the second end 50b of the front-curtain coupling arm 50 or the first end 37d of the front-curtain link lever 37. As shown in FIG. 17B, a second end 51b of the rear-curtain coupling arm 51 is rotatably coupled to a first end 38a of the rear-curtain link lever 38 via a shaft 38c. The shaft 38c is fixed to the second end 51b of the rear-curtain coupling arm 51 or the first end 38a of the rear-curtain link lever 38. The front-curtain link lever 37 and the rear-curtain link lever 38 are rotatably supported by the rotation shaft 37a. The rotation shaft 37a is provided to the shutter base plate 11.

Further, as shown in FIG. 17A, to the second end of the front-curtain link lever 37, a front-curtain charge lever roller 37b that abuts the front-curtain set cam 29b of the charge lever 29 is rotatably attached. As shown in FIG. 17B, to the rear-curtain link lever 38, the rear-curtain charge lever roller 38b that abuts the rear-curtain set cam 29c of the charge lever 29 is rotatably attached.

A motor 46 (an example of an actuator) generates the first bias force F13 imparted to the front-curtain running spring 25 and the second bias force F23 imparted to the rear-curtain running spring 35. Specifically, the motor 46 is configured to drive the charge lever 29 to a front-curtain charge start position at which imparting the front-curtain running spring 25 with the first bias force F13 is started and a rear-curtain charge start position, a position different from or the same as the front-curtain charge start position at which imparting the rear-curtain running spring 35 with the second bias force F23 is started. Further, the motor 46 is configured to drive the charge lever 29 to a front-curtain charge completion position at which imparting the front-curtain running spring 25 with the first bias force F13 is completed and a rear-curtain charge completion position, a position different from the front-curtain charge completion position at which imparting the rear-curtain running spring 35 with the second bias force F23 is completed.

Figure 11:
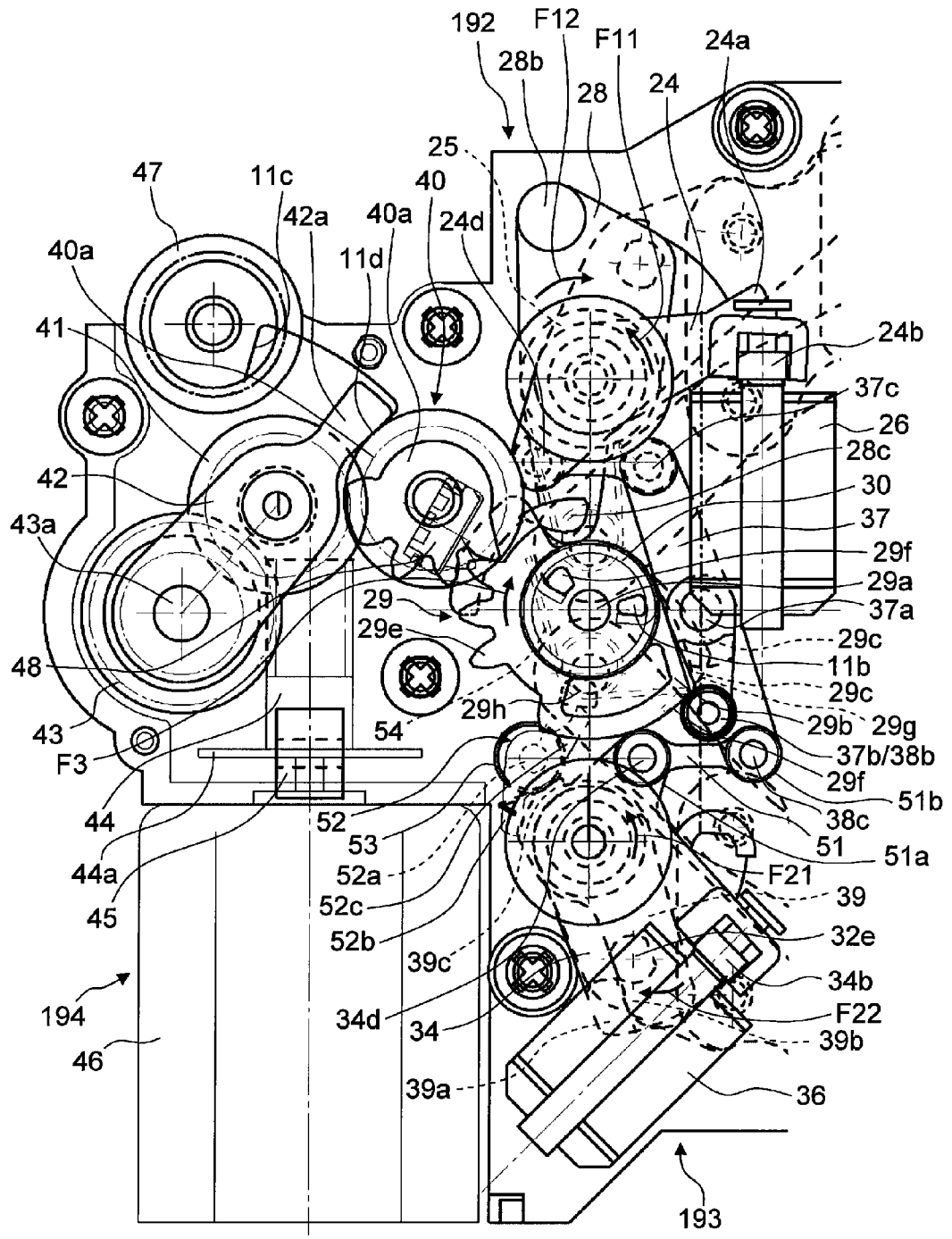
FIG. 11 is a detailed view of main parts in FIG. 10.

The rear-curtain charge completion position (the position shown in FIGS. 8 and 9) is disposed between the rear-curtain charge start position (the position shown in FIGS. 6 and 7) and the front-curtain charge completion position (the position shown in FIGS. 10 and 11). The motor 46 is configured to drive the charge lever 29 to a release position (the position shown in FIGS. 12 and 13) arranged on the opposite side of the first charge start position (the position arranged between the position shown in FIG. 7 and the position shown in FIG. 9) relative to the front-curtain charge completion position. Moreover, the motor 46 is configured to drive the charge lever 29 to a restriction position of the charge lever 29. In this embodiment, the restriction position of the charge lever 29 is the same position as the front-curtain completion position (the position shown in FIGS. 10 and 11). An original position at which the charge lever 29 is in contact with the stopper 11b is the same position as the rear-curtain charge start position.

Figure 19:
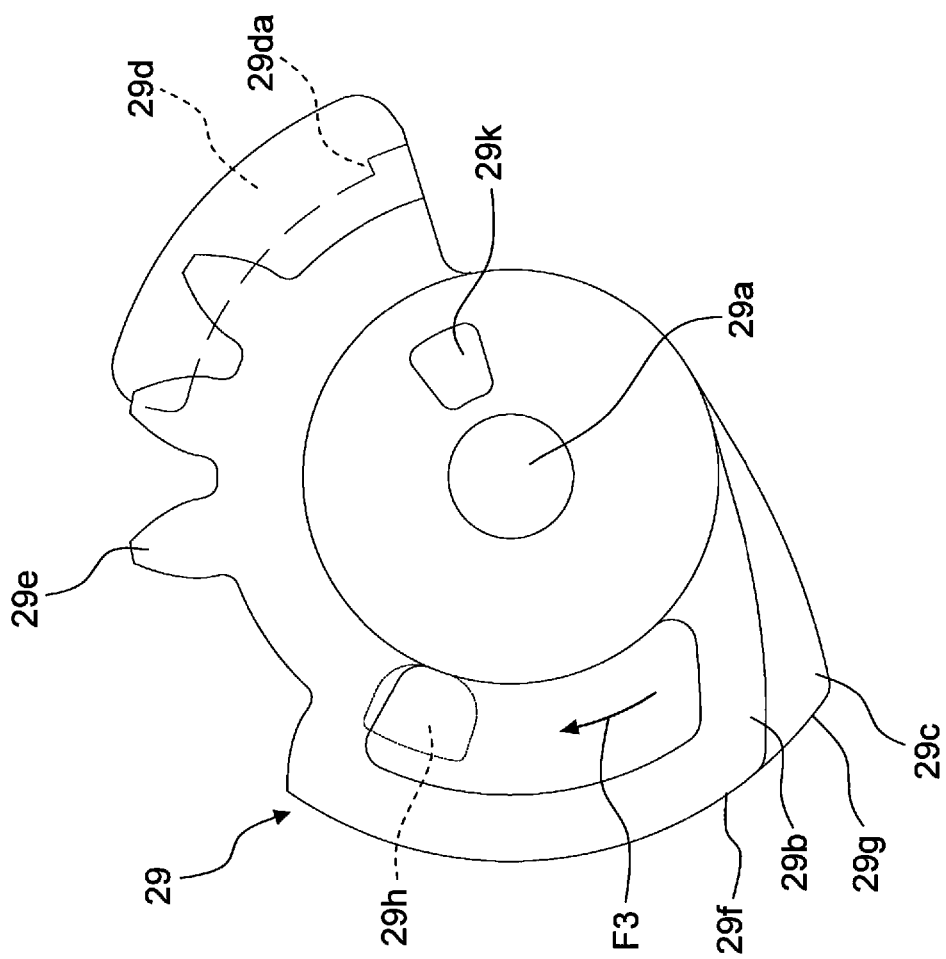
FIG. 19 is a configuration diagram of a charge lever.

The charge lever 29 (an example of a charge member) is arranged to transmit the first bias force F13 to the front-curtain running spring 25 via the front-curtain set lever 24, and arranged to transmit the second bias force F23 to the rear-curtain running spring 35 via the rear-curtain set lever 34. Specifically, as shown in FIG. 19, the charge lever 29 is provided in order to drive the front-curtain drive lever 28, the front-curtain set lever 24, and the rear-curtain set lever 34, and includes: a rotation shaft 29a, a front-curtain set cam 29b, a rear-curtain set cam 29c, a front-curtain holding part 29d, an reverse preventive part 29da, and a rear-curtain unlocking part 29h (an example of a rear-curtain unlocking part). The charge lever 29 is rotatably arranged relative to the shutter base plate 11 around the rotation shaft 29a.

As shown in FIG. 7, the front-curtain set cam 29b (an example of a front-curtain cam part) and a front-curtain set lever 24 are disposed to abut each other, and drive to rotate the front-curtain set lever 24 clockwise. More particularly, the front-curtain set cam 29b is disposed to abut the front-curtain charge lever roller 37b of the front-curtain link lever 37. If the charge lever 29 rotates counterclockwise when the front-curtain set cam 29b abuts the front-curtain charge lever roller 37b, the front-curtain link lever 37 rotates counterclockwise around the rotation shaft 37a while resisting the elastic force F11 of the front-curtain running spring 25, and along therewith, the front-curtain set lever 24 rotates clockwise. When the front-curtain charge lever roller 37b reaches the outer peripheral face 29f of the front-curtain set cam 29b, the front-curtain attracting piece 24b and the front-curtain electromagnet 26 contact with each other. In this way, the elastic force required for running the front curtain 21 can be charged to the front-curtain running spring 25 by the charge lever 29. If the charge lever 29 is at the front-curtain charge completion position, the front-curtain set cam 29b abuts the front-curtain charge lever roller 37b.

Figure 9:
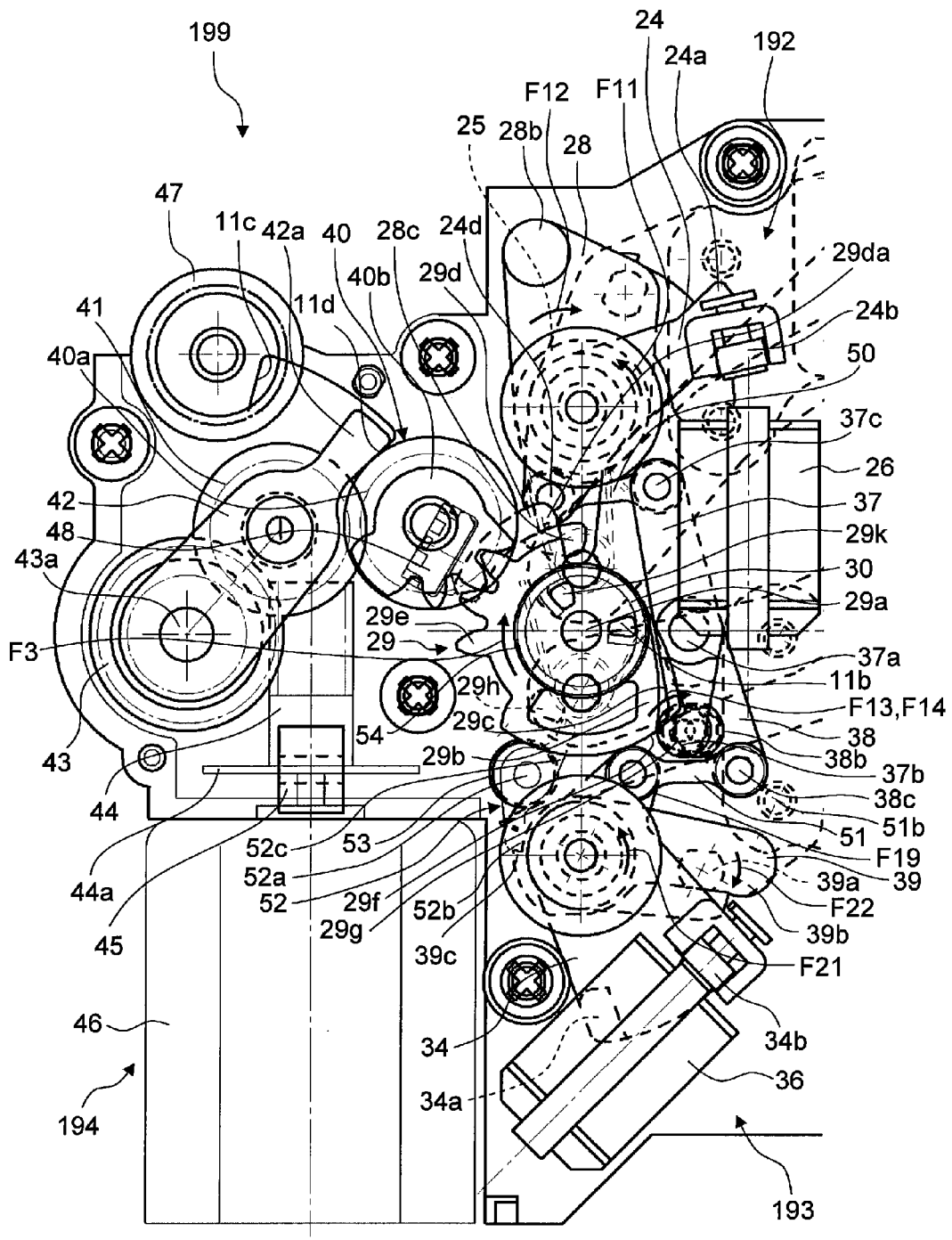
FIG. 9 is a detailed view of main parts in FIG. 8.

Moreover, the rear-curtain set cam 29c is disposed to abut the rear-curtain link lever 38, and drives to rotate the rear-curtain set lever 34 clockwise. The rear-curtain set cam 29c is disposed to abut the rear-curtain charge lever roller 38b of the rear-curtain link lever 38. When the charge lever 29 rotates counterclockwise in a state where the rear-curtain set cam 29c abuts the rear-curtain charge lever roller 38b, the rear-curtain link lever 38 rotates counterclockwise while resisting the elastic force F21 of the rear-curtain running spring 35, and along therewith, the rear-curtain set lever 34 rotates clockwise. When the rear-curtain charge lever roller 38b reaches the outer peripheral face 29g of the rear-curtain set cam 29c, the rear-curtain attracting piece 34b and the rear-curtain electromagnet 36 contact with each other. In this way, the bias force required for running the rear curtain 31 can be charged to the rear-curtain running spring 35 by the charge lever 29. As shown in FIG. 9, when the charge lever 29 is at the rear-curtain charge completion position, the rear-curtain charge lever 38b is in contact with the rear-curtain charge lever roller 38b, and the rear-curtain link lever 38 is held at a position shown in FIG. 9 by the rear-curtain set cam 29c.

The front-curtain charge lever roller 37b and the rear-curtain charge lever roller 38b are disposed in line in a direction vertical to the paper of FIG. 6 and FIG. 7, and thus, in FIG. 6 and FIG. 7, it looks as if the front-curtain charge lever roller 37b and the rear-curtain charge lever roller 38b were disposed at the approximately same location.

At this time, as shown in FIG. 11, a state where the front-curtain attracting piece 24b is at the position to be attracted to the front-curtain electromagnet 26 is also referred to as "charge completion state of the front curtain 21". Moreover, a state where the rear-curtain attracting piece 34b is at the position to be attracted to the rear-curtain electromagnet 36 is also referred to as "charge completion state of the rear curtain 31". Bringing the front curtain 21 into the charge completion state is also referred to as "charging the front curtain 21". Further, bringing the rear curtain 31 into the charge completion state is also referred to as "charging the rear curtain 31".

Figure 20A:
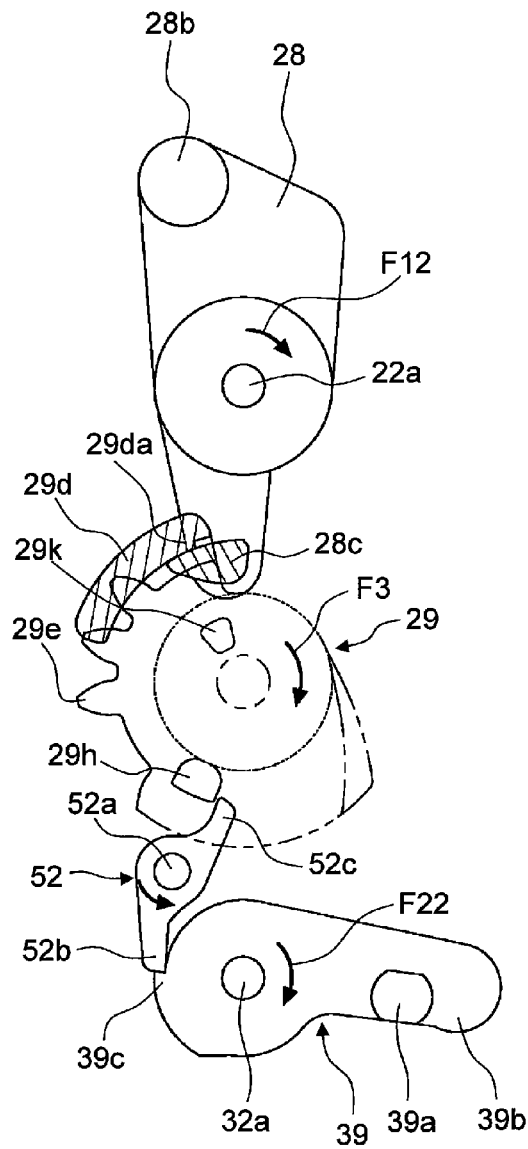
FIGS. 20A and 20B are operation diagrams of the charge lever.
Figure 20B:
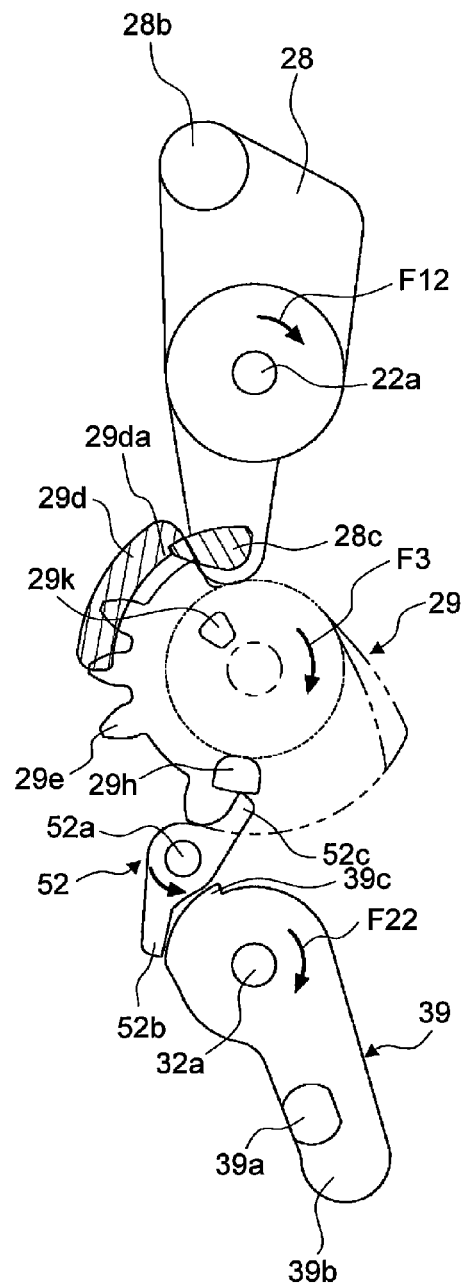

The charge lever 29 is capable of holding the front curtain 21 via the front-curtain drive lever 28 at the second front curtain position P12. When the charge lever 29 is at the front-curtain charge completion position, the charge lever 29 holds the front curtain 21 via the front-curtain drive lever 28 at the second front curtain position P12. Specifically, the front-curtain holding part 29d (an example of a front-curtain holding part) holds the front curtain 21 via the front-curtain drive lever 28 at the second front curtain position P12. The front-curtain drive lever 28 includes a claw 28c (an example of a contact portion) provided to abut the front-curtain holding part 29d. While the charge lever 29 rotates from the front-curtain charge start position to the front-curtain charge completion position, the front-curtain holding part 29d enters in a region where the claw 28c moves when the front curtain 21 moves from the second front curtain position P12 to the first front curtain position P11. Therefore, during a time between the charge start and the charge end of the front curtain 21, the front-curtain holding part 29d becomes able to abut the claw 28c, and the clockwise rotation of the front-curtain drive lever 28 is restricted by the charge lever 29 (see FIGS. 11 and 20B, for example). As a result, the state where the front curtain 21 is retracted from the opening part 11a is maintained by the charge lever 29. That is, while the first bias force F13 is imparted to the front-curtain running spring 25, the charge mechanism 194 can hold the front curtain 21 at the second front curtain position P12.

Figure 13:
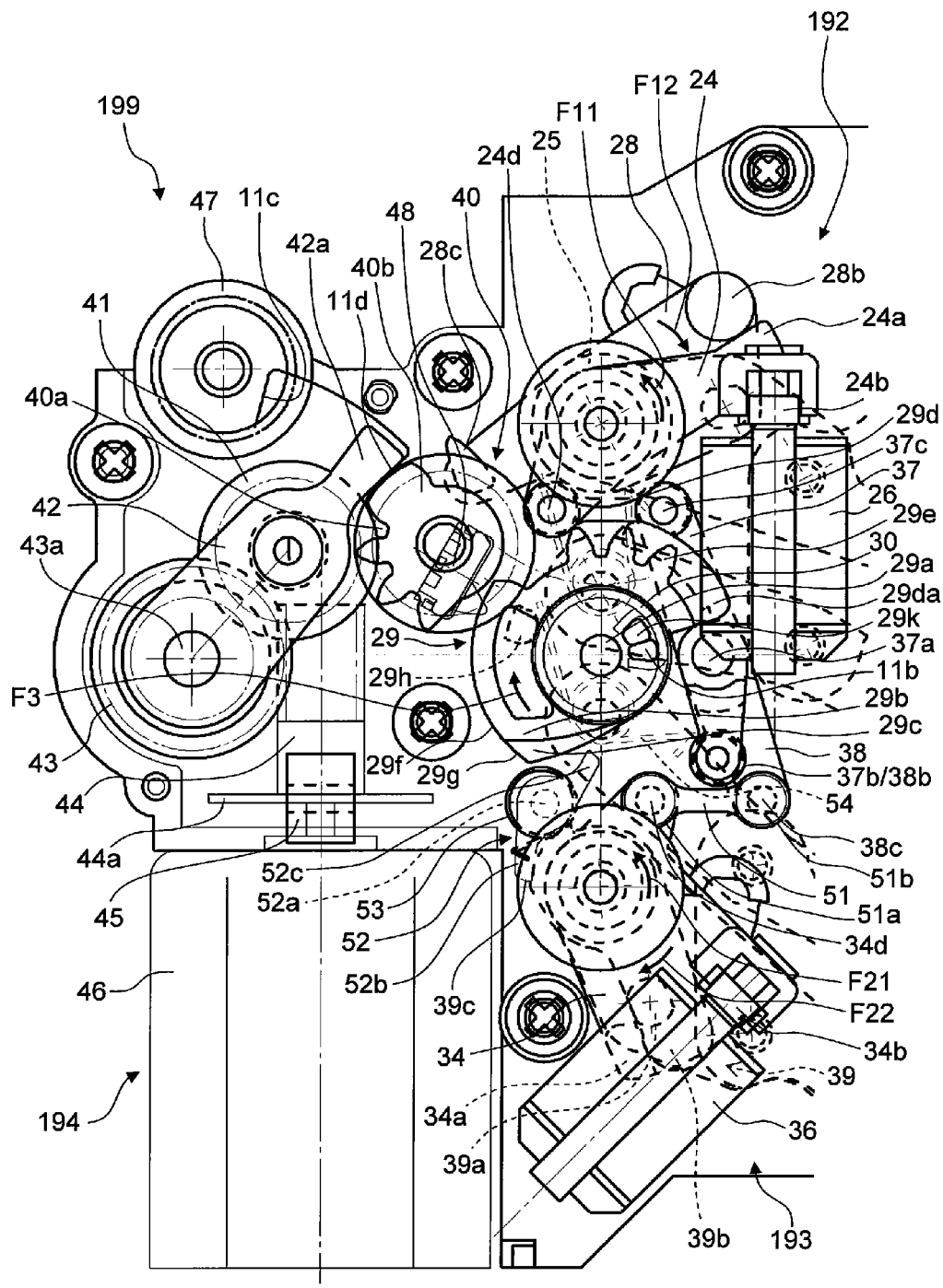
FIG. 13 is a detailed view of main parts in FIG. 12.

On the other hand, when the charge lever 29 is at the release position, the charge lever 29 releases the holding of the front curtain 21 at the second front curtain position P12. Specifically, as shown in FIGS. 12 and 13, when the charge lever 29 is at the release position, the front-curtain holding part 29d is retracted from the moving region of the claw 28c. In this state, the front-curtain holding part 29d does not abut the claw 28c, and thus, the clockwise rotation of the front-curtain drive lever 28 is not restricted by the front-curtain holding part 29d.

Moreover, when the charge lever 29 is at the restriction position (the position shown in FIGS. 10 and 11), the front-curtain drive lever 28 restricts returning of the charge lever 29 to an original position (the position shown in FIGS. 6 and 7). Specifically, the front-curtain holding part 29d includes an reverse preventive part 29da. The reverse preventive part 29da has a step. In a state where the distal end of the claw 28c is hooked onto the reverse preventive part 29da, the clockwise rotation of the charge lever 29 is restricted by the claw 28c. When the charge lever 29 is at the restriction position, the claw 28c comes hooked onto the reverse preventive part 29da.

The rear-curtain unlocking part 29h is provided to release the restriction of the rear-curtain drive lever 39 imposed by the rear-curtain locking lever 52. The rear-curtain unlocking part 29h is arranged to be contactable with the unlocking claw 52c of the rear-curtain locking lever 52. When the unlocking claw 52c is pushed by the rear-curtain unlocking part 29h, the rear-curtain locking lever 52 rotates in a clockwise direction resisting the elastic force of the rear-curtain locking spring 53 (see FIGS. 39A and 39B). This releases the locking of the front curtain 21 by the rear-curtain locking lever 52.

The partly tooth-missing gear part 29e is rotatably arranged, together with the charge lever 29. The charge lever 29 and the partly tooth-missing gear part 29e are rotatably supported by the rotation shaft 29a. The charge lever 29 is biased clockwise by the charge-lever return spring 30. The charge-lever return spring 30 (an example of a return elastic member) imparts the charge lever 29 with the elastic force F3 so that the charge lever 29 returns to the original position obtained before imparting the first bias force F13 and the second bias force F23 is started. The stopper 11b provided on the shutter base plate 11 abuts the charge lever 29 so as to restrict the rotation of the charge lever 29 by the charge-lever return spring 30. As shown in FIGS. 6 and 7, in a state where no force other than the bias force of the charge-lever return spring 30 acts upon the charge lever 29, the charge lever 29 is held at the original position where the charge lever 29 abuts the stopper 11b.

The partly tooth-missing gear part 29e can be meshed with the partly tooth-missing gear 40. The partly tooth-missing gear 40 is rotatably supported by the shutter base plate 11. The partly tooth-missing gear 40 is configured by a stepped gear, and includes a gear part 40*a* having teeth extending over the length. The gear part 40*a* can be meshed with the planet gear 41.

The planet gear 41 is rotatably supported by the planet carrier 42. The planet carrier 42 is rotatably supported by the shutter base plate 11 around the same shaft 43*b* as the sun gear 43. The sun gear 43 is meshed with the planet gear 41. At this time, when an appropriate rotation load is applied to the sun gear 43, the planet carrier 42 and the planet gear 41 rotate around the shaft 43*b* according to a rotation direction of the sun gear 43. When the planet gear 41 rotates around the shaft 43*b*, a gear with which the planet gear 41 is meshed can be switched to the partly tooth-missing gear 40 or a coupling gear 47.

The planet carrier 42 includes a first rotation restriction part 42*a* and a second rotation restriction part 42*b*. The first rotation restriction part 42*a* and the second rotation restriction part 42*b* abut a first stopper 11*c* and a second stopper 11*d* provided on the shutter base plate 11, respectively. Thereby, the rotation of the planet carrier 42 relative to the shutter base plate 11 is restricted within a predetermined range.

The sun gear 43 is configured by a stepped gear, and includes a worm wheel 43*a* meshed with the worm gear 44. The worm gear 44 is fixed to the rotation shaft 46*a* of the motor 46. The worm gear 44 includes an encoder vane 44*a*. As a result of the encoder vane 44*a* blocking light of a photo interrupter 45, it becomes possible to measure a rotation amount (drive amount) or a speed of the motor 46.

The charge-lever detection switch 48 is fixed to the shutter base plate 11, and detects a rotation position of the charge lever 29. More particularly, the charge-lever detection switch 48 detects whether or not the charge lever 29 is in proximity.

3: Operation of Slit Exposure Photography

Figure 21:
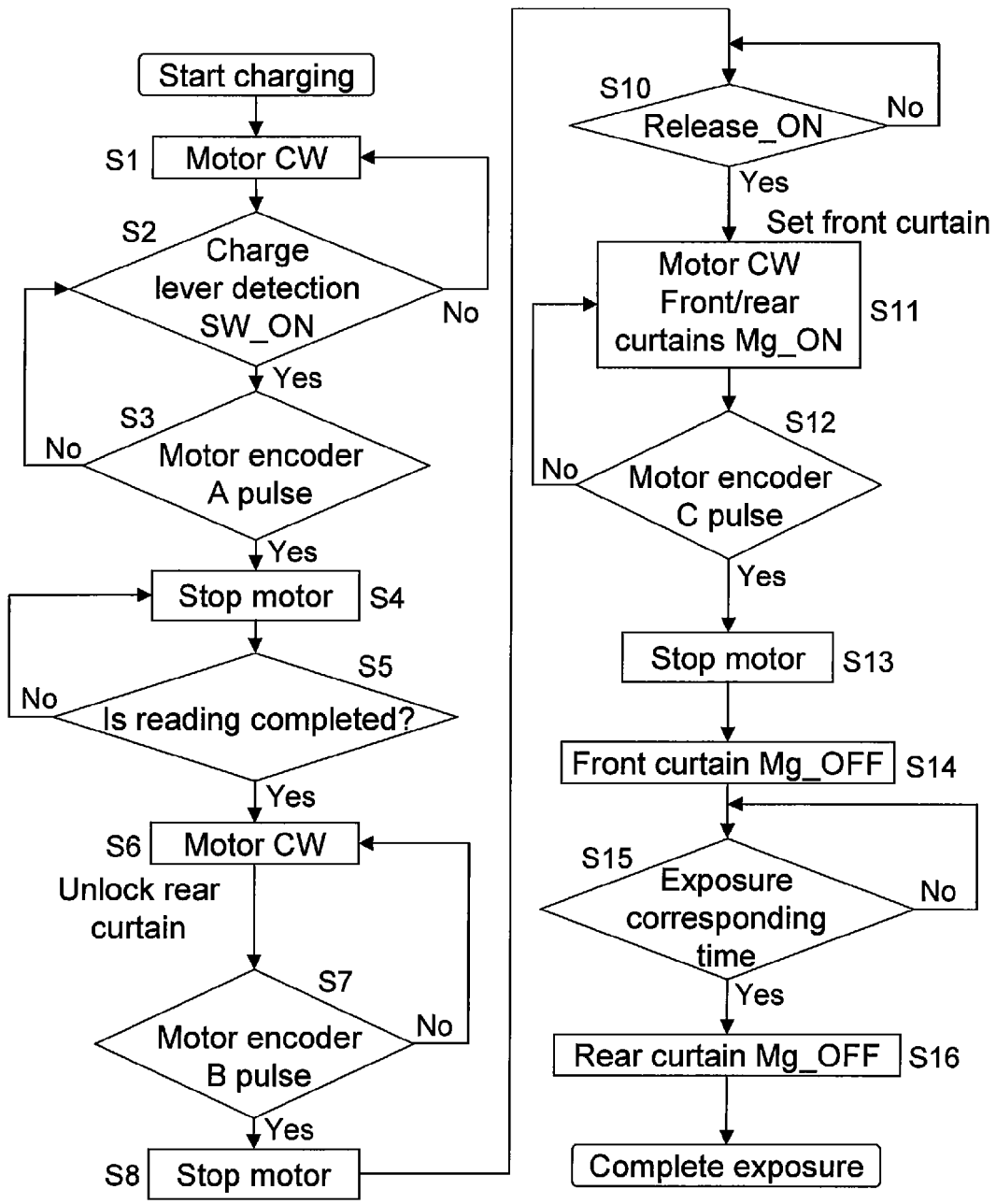
FIG. 21 is a flowchart of slit exposure photography.
Figure 22:
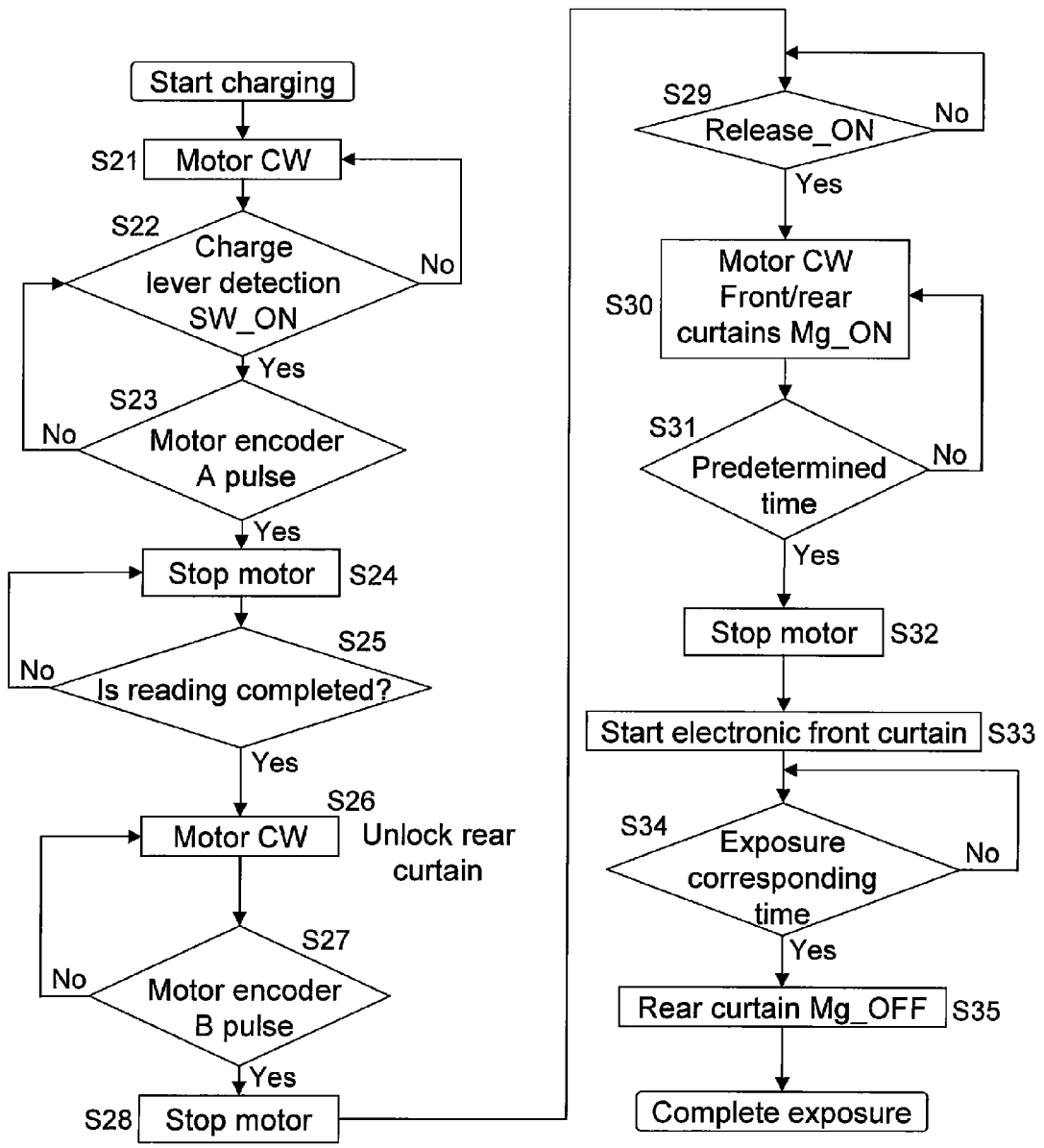
FIG. 22 is a flowchart of slit exposure photography.
Figure 23:
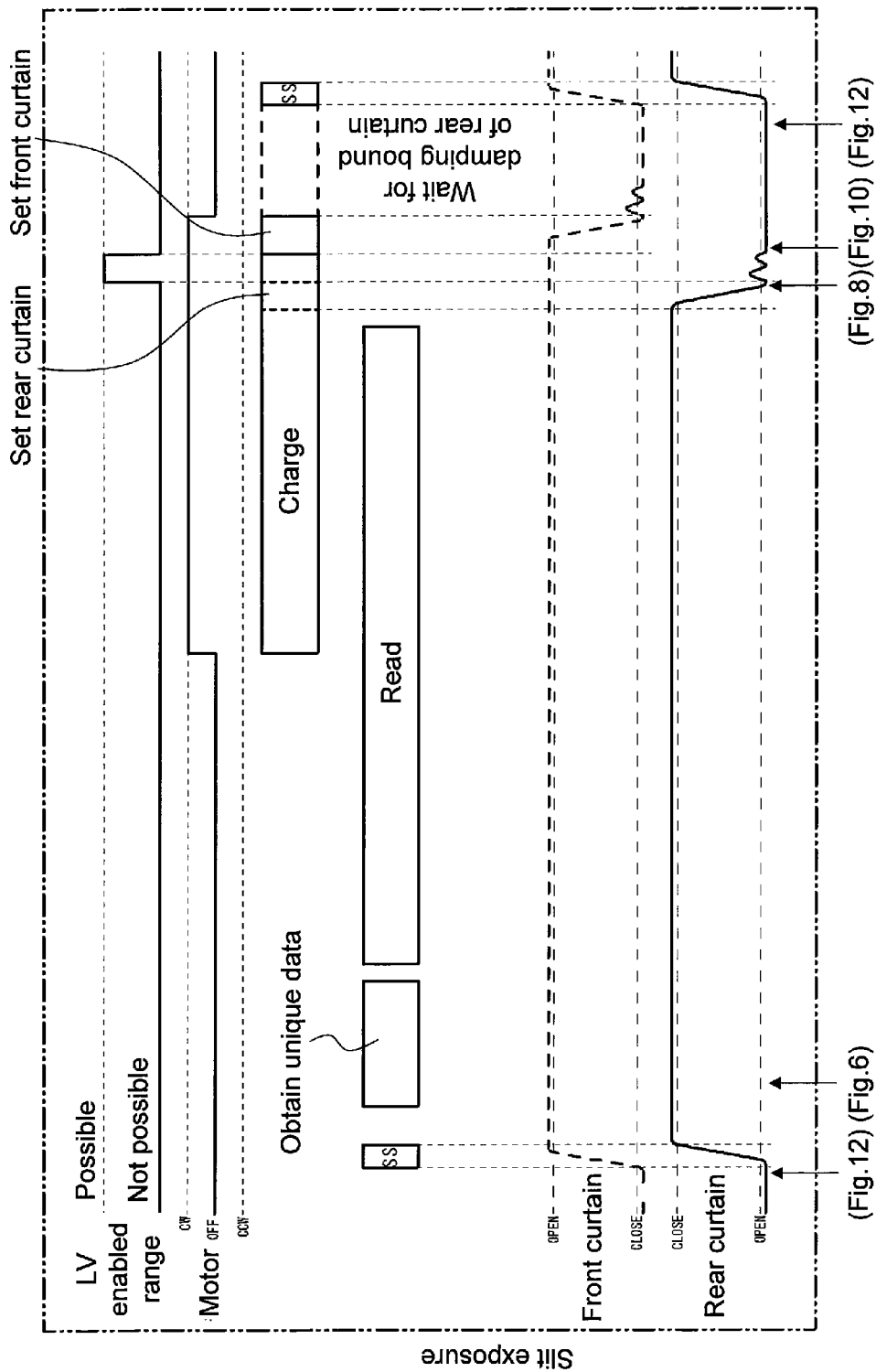
FIG. 23 is a time chart of the slit exposure photography.
Figure 24:
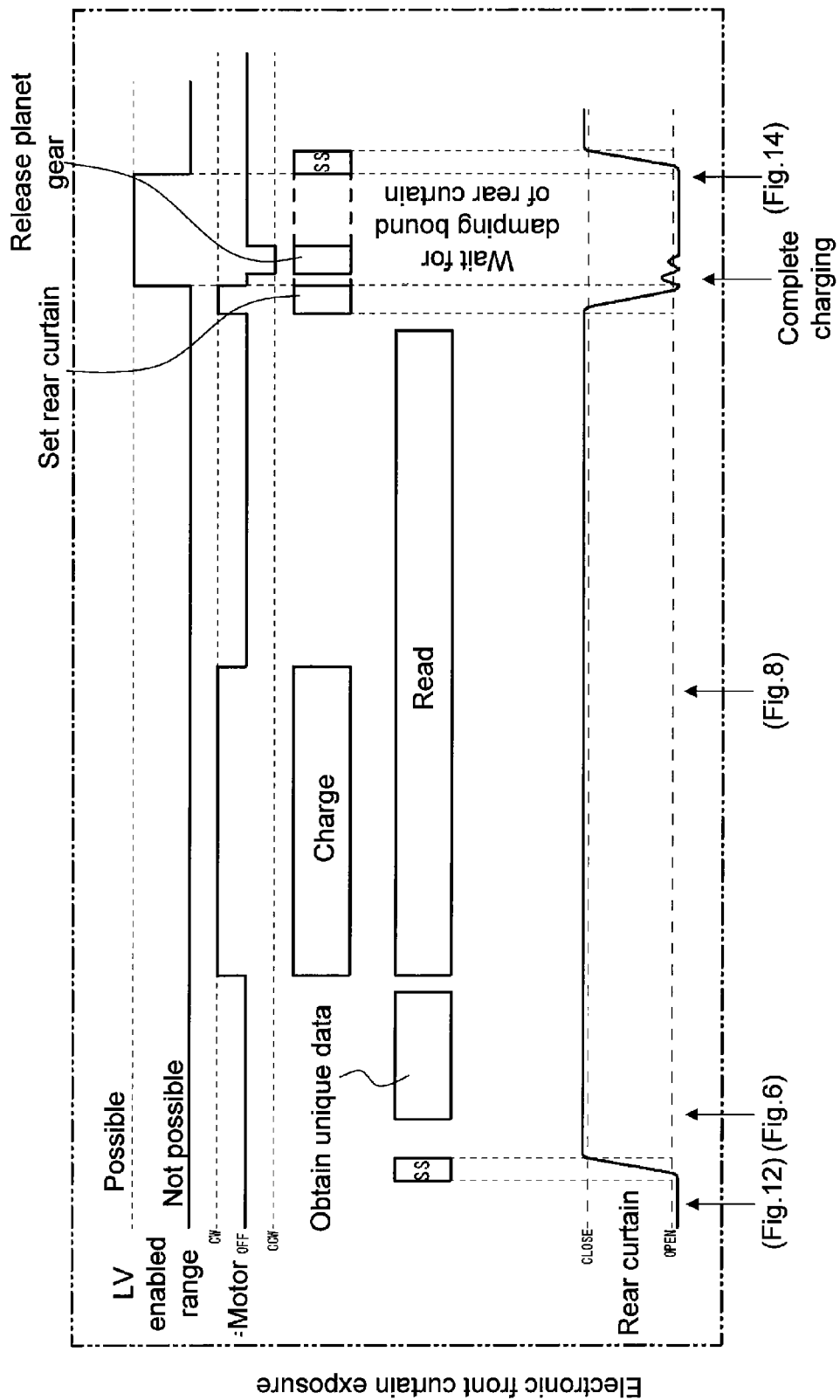
FIG. 24 is a time chart of electronic front curtain photography.

Subsequently, an operation of slit exposure photography will be explained. FIG. 21 is a flowchart of the slit exposure photography. A time chart shown in FIG. 23 shows a timing of an operation of the slit exposure photography.

3.1: Running Completion State

FIG. 6 shows a photography end state of the focal plane shutter device 190, i.e., a state where running of the front curtain 21 and the rear curtain 31 is completed. FIG. 7 is an enlarged view of main parts of FIG. 6.

In the running completion state shown in FIG. 6, the front curtain 21 is retracted to the upstream side of the opening part 11*a* by the elastic force F11 of the front-curtain running spring 25. In a state where the front curtain 21 is disposed at the second front curtain position P12, by the elastic force F12 of the front-curtain set spring 27 and the elastic force F11 of the front-curtain running spring 25, the front-curtain set lever 24 and the front-curtain drive lever 28 keep rotating counterclockwise while the front-curtain-set-lever contacting portion 24*a* and the front-curtain-drive-lever contacting portion 28*b* abut each other. Moreover, the rear curtain 31 keeps covering the opening part 11*a* by the elastic force F21 of the rear-curtain running spring 35. The rear-curtain set lever 34 and the rear-curtain drive lever 39 keep rotating counterclockwise by the elastic force F21 of the rear-curtain running spring 35 while the rear-curtain-set-lever contacting portion 34*a* and the rear-curtain-drive-lever contacting portion 39*b* abut each other.

3.2: Charge Operation

Figure 8:
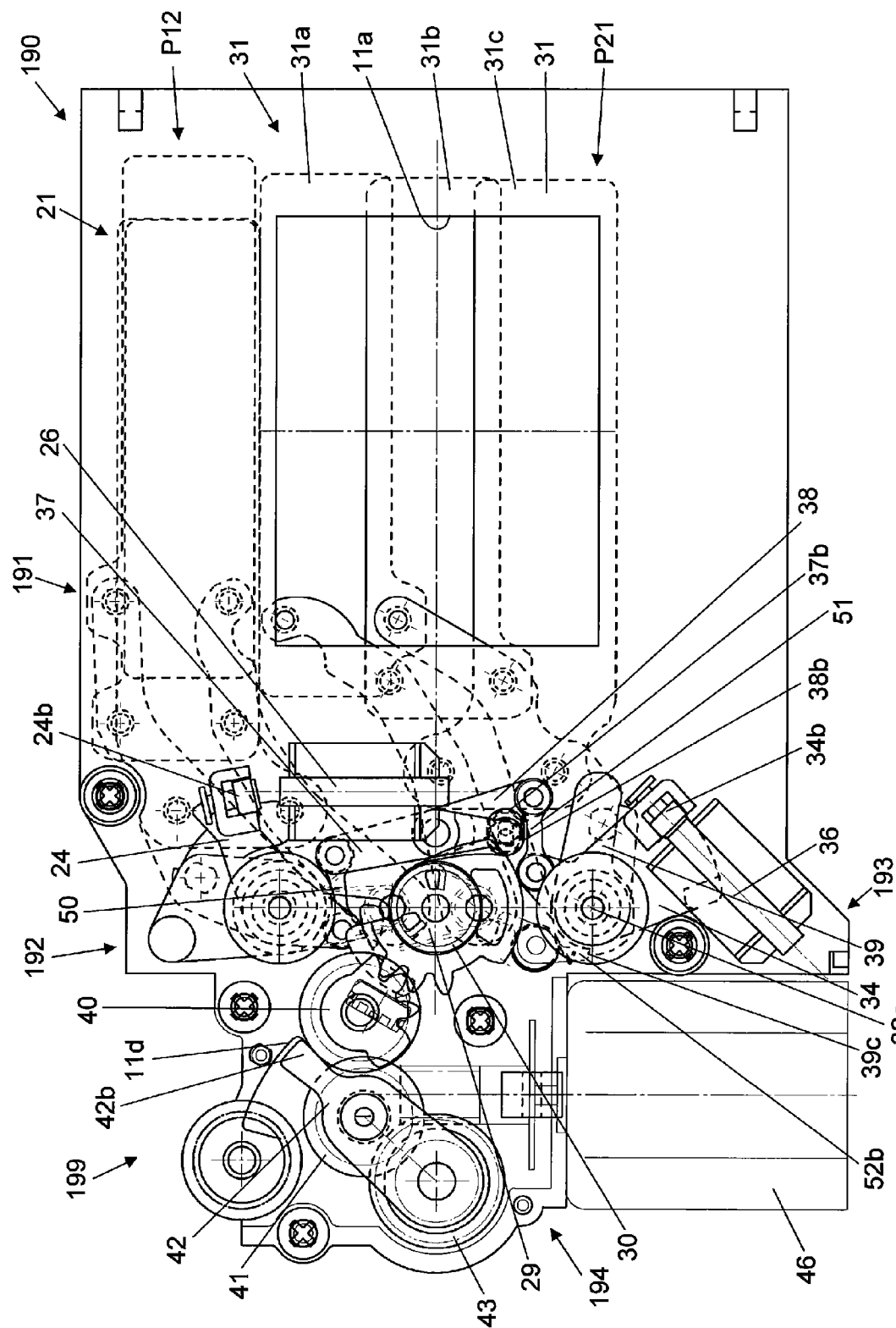
FIG. 8 is a state diagram of the focal plane shutter device 190 in a rear-curtain charge completion state.

FIG. 8 shows a state where the rear curtain 31 completes charging. In the running completion state shown in FIG. 6, the motor 46 is energized, and the sun gear 43 rotates clockwise by the motor 46 (step S1). As a result, the planet carrier 42 rotates clockwise by a rotation load, resulting in the second rotation restriction part 42*b* and a second stopper 11*d* abutting each other. Thereafter, the planet gear 41 rotates counterclockwise, which in turns rotates the partly tooth-missing gear 40 clockwise. The partly tooth-missing part 40*b* provided to the partly tooth-missing gear 40 is meshed with the partly tooth-missing gear part 29*e* provided to the charge lever 29, and the partly tooth-missing gear part 29*e* is rotated counterclockwise. The charge lever 29 provided integrally with the partly tooth-missing gear part 29*e* rotates counterclockwise resisting the elastic force F23 of the charge-lever return spring 30.

At this time, at the same time that the motor 46 is energized, the charge-lever detection switch 48 starts detecting whether or not the charge lever 29 is in proximity (step S2). When the charge lever 29 is detected by the charge-lever detection switch 48 as a result of advancement of the rotation of the charge lever 29, detection of the drive amount of the motor 46 is started by using the photo interrupter 45 and the encoder vane 44*a* (step S3). It is noted that the driving by the motor 46 in step S1 is continued until the state of the focal plane shutter device 190 changes from the state shown in FIG. 8 to a state shown in FIG. 10.

When the charge lever 29 rotates counterclockwise in states shown in FIG. 6 and FIG. 7, the rear-curtain charge lever roller 38*b* is pressed by the rear-curtain set cam 29*c*, resulting in the rear-curtain link lever 38 rotating counterclockwise. When the rear-curtain link lever 38 rotates counterclockwise, the rear-curtain set lever 34 rotates clockwise via the rear-curtain coupling arm 51. When the rear-curtain set lever 34 rotates clockwise, the rear curtain 31 moves from the first rear curtain position P21 toward the second rear curtain position P22, and the rear curtain 31 is retracted from the opening part 11*a*. When the rear-curtain charge lever roller 38*b* reaches an outer peripheral face 29*g* of the rear-curtain set cam 29*c*, the rear curtain 31 reaches the second rear curtain position P22, and the rear-curtain attracting piece 34*b* is pushed against the rear-curtain electromagnet 36 (see FIG. 8 and FIG. 9). The position of the rear-curtain set lever 34 is held by the outer peripheral face 29*g* of the rear-curtain set cam 29*c*, and thus, the elastic force F21 of the rear-curtain running spring 35 does not act, as the rotation force, upon the charge lever 29.

Likewise, when the charge lever 29 rotates counterclockwise, the front-curtain charge lever roller 37*b* is pressed by the front-curtain set cam 29*b*, resulting in the front-curtain link lever 37 rotating counterclockwise. When the front-curtain link lever 37 rotates counterclockwise, the front-curtain set lever 24 rotates clockwise via the front-curtain coupling arm 50. When the front-curtain set lever 24 rotates clockwise, the front curtain 21 moves from the first front curtain position P11 toward the second front curtain position P12, and the front curtain 21 is retracted from the opening part 11*a*.

However, in the states shown in FIG. 8 and FIG. 9, the front-curtain charge lever roller 37*b* has not reached the outer peripheral face 29*f* of the front-curtain set cam 29*b*, and thus, the front-curtain attracting piece 24*b* is not yet pressed against the front-curtain electromagnet 26 and the front-curtain attracting piece 24*b* has not rotated to a position at which the front-curtain electromagnet 26 can attract the front-curtain attracting piece 24*b*. In this way, shapes of the front-curtain set cam 29*b* and the rear-curtain set cam 29*c* are formed so that the contact between the rear-curtain attracting piece 34*b* and the rear-curtain electromagnet 36 is performed before the contact between the front-curtain attracting piece 24*b* and the front-curtain electromagnet 26.

While the rear-curtain set lever 34 rotates clockwise, the rear-curtain drive lever 39 similarly attempts to rotate clockwise by the elastic force F23 of the rear-curtain set spring 54.

However, the locking claw 52b of the rear-curtain locking lever 52 is hooked onto the rear-curtain locking part 39c, and thus, the clockwise rotation of the rear-curtain drive lever 39 is restricted by the rear-curtain locking lever 52. Therefore, the rear-curtain set lever 34 only rotates clockwise. The rear-curtain drive lever 39 does not rotate, and thus, during the above-described charge operation, the rear curtain 31 is held at the second rear curtain position P22 and the rear curtain 31 keeps shielding the opening part 11a. It is thus possible to read out the image data from the CMOS image sensor 110, in parallel with charging the rear curtain 31. It is noted that in the first embodiment, the state where the rear curtain 31 shields the opening part 11a is maintained until the charge operation of the rear curtain 31 is completed.

Upon completion of reading from the CMOS image sensor 110, the motor 46 further drives to rotate the sun gear 43, and as a result, the charge lever 29 further rotates counterclockwise. When the charge lever 29 rotates counterclockwise, the rear-curtain unlocking part 29h of the charge lever 29 contacts the unlocking claw 52c of the rear-curtain locking lever 52, and the rear-curtain locking lever 52 rotates in a clockwise direction resisting the elastic force of the rear-curtain locking spring 53. As a result, the locking claw 52b is removed from the rear-curtain locking part 39c, and the locking of the rear-curtain drive lever 39 is released (see FIGS. 39A and 39B).

When the locking of the rear-curtain drive lever 39 is released, the rear-curtain drive lever 39 rotates clockwise by the elastic force F22 of the rear-curtain set spring 54 until the rear-curtain-set-lever contacting portion 34a and the rear-curtain-drive-lever contacting portion 39b abut each other, and the rear curtain 31 is retracted from the opening part 11a. Even after the charge operation, the rear-curtain set cam 29c and the rear-curtain charge lever roller 38b abut each other, and the rear curtain 31 keeps being retracted from the opening part 11a. In this way, the focal plane shutter device 190 reaches a rear-curtain charge completion state shown in FIG. 10 and FIG. 11.

On the other hand, when the charge lever 29 rotates counterclockwise, the front-curtain charge lever roller 37b reaches the outer peripheral face 29f of the front-curtain set cam 29b in the end, and the rotation drive of the charge lever 29 by the motor 46 is stopped (step S4). While the front-curtain charge lever roller 37b abuts the outer peripheral face 29f of the front-curtain set cam 29b, the front-curtain attracting piece 24b is pushed against the front-curtain electromagnet 26.

When the front-curtain set lever 24 rotates clockwise, the front-curtain drive lever 28 similarly attempts to rotate clockwise by the elastic force F22 of the front-curtain set spring 27. However, when the charge lever 29 rotates counterclockwise, the front-curtain holding part 29d enters into a rotation trail (movement region) of the claw 28c and the front-curtain holding part 29d restricts the clockwise rotation of the front-curtain drive lever 28. Therefore, the front-curtain set lever 24 only rotates clockwise. The front-curtain drive lever 28 does not rotate, and thus, during the above-described charge operation, the state where the front curtain 21 is retracted from the opening part 11a is maintained. Even after the charge operation, the claw 28c abuts the front-curtain holding part 29d, and thus, the state where the front curtain 21 is retracted from the opening part 11a is maintained. In this way, the focal plane shutter device 190 can automatically maintain the state where the opening part 11a is opened during the charge operation and after the completion of the charge.

In a state shown in FIG. 10, the light from the subject is guided to the CMOS image sensor 110. This state is effective particularly when the user wishes to maintain a state where the CMOS image sensor 110 is exposed. For example, this state is particularly effective when by using a live view function by the camera body 100, the subject is observed, framing is performed, or moving picture photography is performed.

It is noted that the camera controller 140 can comprehend the rotation position of the charge lever 29 based on the drive amount of the motor 46. The camera controller 140 can comprehend the rotation amount of the motor 46 by the encoder vane 44a and the photo interrupter 45, and further, can comprehend the original position of the charge lever 29 based on the detected result of the charge-lever detection switch 48. Therefore, the camera controller 140 can comprehend the rotation position (rear curtain charge completion position, restriction position, and release position) of the charge lever 29 where the original position is used as a reference.

3.3: Reverse of Motor

When the motor 46 is inverted in states shown in FIG. 10 and FIG. 11, the sun gear 43 rotates counterclockwise, and along therewith, the planet carrier 42 rotates counterclockwise around the shaft 43b. As a result, the first rotation restriction part 42a of the planet carrier 42 abuts the first stopper 11c. The planet gear 41 is meshed not with the partly tooth-missing gear 40 but with the coupling gear 47 at the position where the first rotation restriction part 42a abuts the first stopper 11c, and thus, the rotation of the sun gear 43 is transmitted to the coupling gear 47 via the planet gear 41. As a result of the coupling gear 47 being coupled to another drive member, the other drive member can also be driven by taking advantage of the rotation of the coupling gear 47. Examples of the other drive member include a flash pop-up.

When the planet gear 41 is meshed with the partly tooth-missing gear 40, because of a self lock function of the worm gear 44, the sun gear 43 and the planet gear 41 do not rotate, and the partly tooth-missing gear 40 meshed with the planet gear 41 does not rotate, either. Therefore, if the partly tooth-missing gear 40 is meshed with the partly tooth-missing gear part 29e, then the charge lever 29 does not rotate.

However, when the planet gear 41 rotates counterclockwise around the shaft 43b, the meshing between the planet gear 41 and the partly tooth-missing gear 40 is released. Therefore, the self lock function of the worm gear 44 does not act upon the partly tooth-missing gear 40 and the charge lever 29, resulting in the charge lever 29 being rotated clockwise by the elastic force F22 of the charge-lever return spring 30. When the charge lever 29 rotates clockwise, the front-curtain set lever 24 and the rear-curtain set lever 34 also rotate clockwise, and the charging of the front curtain 21 and the rear curtain 31 is also released.

Therefore, as shown in FIG. 10 and FIG. 11, the distal end of the claw 28c is hooked onto the reverse preventive part 29da provided to the front-curtain holding part 29d of the charge lever 29. Thereby, the clockwise rotation of the charge lever 29 can be restricted, and it becomes possible to freely utilize the inverted rotation of the motor 46 to drive another member while maintaining the charge completion state.

3.4: Slit Exposure Standby State

When the release button 131 is operated by the user in the state shown in FIG. 10, necessary photography information such as photometry is obtained by the camera controller 140. After completing obtaining the photography information, the release operation is started.

Specifically, when the release button 131 is depressed, as shown in FIG. 16, in order to maintain the charge completion state of the front curtain 21 and the rear curtain 31, power feeding to the front-curtain electromagnet 26 and the rear-curtain electromagnet 36 is started before the motor 46 is driven (steps S5 and S6). As a result, the front-curtain attracting piece 24b is attracted to the front-curtain electromagnet 26, and the rear-curtain attracting piece 34b is attracted to the rear-curtain electromagnet 36. Therefore, even when the front-curtain set lever 24 and the rear-curtain set lever 34 become able to rotate counterclockwise, the front-curtain set lever 24 and the rear-curtain set lever 34 are held at the charge position.

After the power feeding to the front-curtain electromagnet 26 and the rear-curtain electromagnet 36 is started, the motor 46 is driven by a predetermined drive amount by the camera controller 140 (steps S7, S8, and S9). Specifically, when the sun gear 43 is driven to rotate clockwise by the motor 46, the charge lever 29 rotates counterclockwise. When the charge lever 29 rotates counterclockwise, the front-curtain holding part 29d of the charge lever 29 is retracted from the moving region of the claw 28c of the front-curtain drive lever 28 before the meshing between the partly tooth-missing gear 40 and the partly tooth-missing gear part 29e is released, and the contacting portion between the front-curtain holding part 29d and the claw 28c is released. Thus, the front-curtain drive lever 28 rotates clockwise by the elastic force F12 of the front-curtain set spring 27, and the front curtain 21 runs from the second front curtain position P12 to the first front curtain position P11. When the front-curtain-drive-lever contacting portion 28b abuts the front-curtain-set-lever contacting portion 24a, the rotation of the front-curtain drive lever 28 stops and the front curtain 21 stops at the first front curtain position P11. Therefore, as shown in FIG. 10, the opening part 11a is shielded by the front curtain 21.

When the charge lever 29 rotates counterclockwise, the meshing between the partly tooth-missing gear 40 and the partly tooth-missing gear part 29e of the charge lever 29 is released. When the meshing between the partly tooth-missing gear 40 and the partly tooth-missing gear part 29e is released, the charge lever 29 rotates clockwise by the elastic force F23 of the charge-lever return spring 30, resulting in the contact between the front-curtain charge lever roller 37b and the front-curtain set cam 29b being released. When the contact between the front-curtain charge lever roller 37b and the front-curtain set cam 29b is released, the front-curtain set lever 24 becomes able to rotate counterclockwise by the elastic force F11 of the front-curtain running spring 25. Moreover, when the charge lever 29 rotates clockwise by the elastic force F23 of the charge-lever return spring 30, the contact between the rear-curtain charge lever roller 38b and the rear-curtain set cam 29c is released. When the contact between the rear-curtain charge lever roller 38b and the rear-curtain set cam 29c is released, the rear-curtain set lever 34 becomes able to rotate counterclockwise by the elastic force F21 of the rear-curtain running spring 35.

However, as described above, the power feeding to the front-curtain electromagnet 26 and the rear-curtain electromagnet 36 is started before the driving of the motor 46 is started, and thus, even when the front-curtain set lever 24 and the rear-curtain set lever 34 become able to rotate counterclockwise, the front-curtain set lever 24 and the rear-curtain set lever 34 are held at the charge position. That is, it is possible to maintain the charge completion state of the front curtain 21 and the rear curtain 31.

In this way, the state of the focal plane shutter device 190 proceeds from the state shown in FIG. 10 to a slit exposure standby state shown in FIG. 12. In the state shown in FIG. 12, the opening part 11a is shielded by the front curtain 21 while the charge completion state of the front curtain 21 and the rear curtain 31 is maintained.

3.5: Slit Exposure

Thereafter, based on a release command from the camera controller 140, the power feeding to the front-curtain electromagnet 26 is stopped (step S10). Then, the front-curtain set lever 24 rotates counterclockwise by the elastic force F11 of the front-curtain running spring 25. At this time, the front-curtain-drive-lever contacting portion 28b is pushed by the front-curtain-set-lever contacting portion 24a, and thus, the front-curtain drive lever 28 rotates counterclockwise together with the front-curtain set lever 24, and the front curtain 21 runs from the first front curtain position P11 to the second front curtain position P12. As a result, light is incident upon the CMOS image sensor 110 through the opening part 11a, and exposing the CMOS image sensor 110 is started.

On the other hand, after a previously-set exposure time elapses from the stop of the power feeding to the front-curtain electromagnet 26, the power feeding to the rear-curtain electromagnet 36 is stopped (steps S11 and S12). The exposure time is set based on exposure information, etc., by the camera controller 140. Once the power feeding to the rear-curtain electromagnet 36 is stopped, the rear-curtain set lever 34 rotates counterclockwise by the elastic force F21 of the rear-curtain running spring 35, and the rear curtain 31 runs from the second rear curtain position P22 to the first rear curtain position P21. As a result, the opening part 11a is shielded by the rear curtain 31 sequentially from a lower portion of the opening part 11a. At this time, a slit is formed between the front curtain 21 and the rear curtain 31, and the slit moves from the downstream side to the upstream side of the opening part 11a. Thus, the CMOS image sensor 110 is exposed by light incident through the slit. The exposure operation by such a slit is called slit exposure photography. When the front curtain 21 and the rear curtain 31 complete running, the state of the focal plane shutter device 190 is changed to the state shown in FIG. 6. When the charge operation is performed, the state of the focal plane shutter device 190 is changed to the state shown in FIG. 8, and then, the process prepares for next photography.

In this way, when the charging and the reading are performed in parallel, a preparation time for next photography can be shortened. This makes intervals of continuous photography small, enabling high-speed continuous shooting, for example.

It is noted that when the rear curtain 31 completes running, as shown in FIG. 6, the locking claw 52b of the rear-curtain locking lever 52 is hooked onto the rear-curtain locking part 39c, and the rear curtain 31 is locked at the first rear curtain position P21 by the rear-curtain locking lever 52.

4: Operation of Electronic Front Curtain Photography

Next, the operation of electronic front curtain photography will be explained. FIG. 17 is a flowchart of the electronic front curtain photography. A time chart shown in FIG. 19 shows a timing of the operation of the electronic front curtain photography.

4.1: Running Completion State

An end state of the operation of the electronic front curtain photography is the same as the end state of the above-described slit exposure photography. That is, FIG. 6 shows a state where the running of the rear curtain 31 is completed by the electronic front curtain photography.

4.2: Charge Operation

Figure 14:
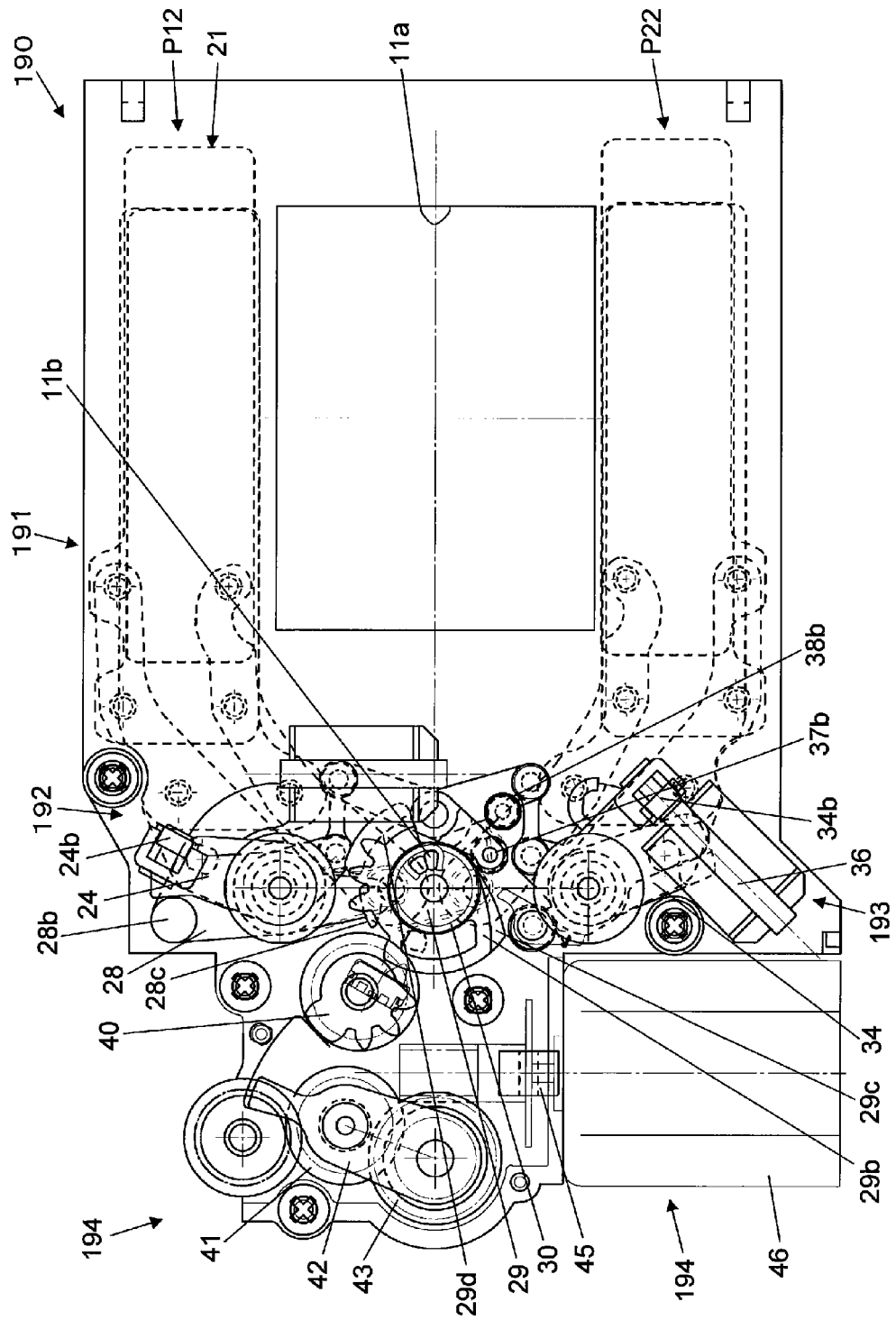
FIG. 14 is a state diagram of the focal plane shutter device 190 in an electronic front curtain photography standby state.
Figure 15:
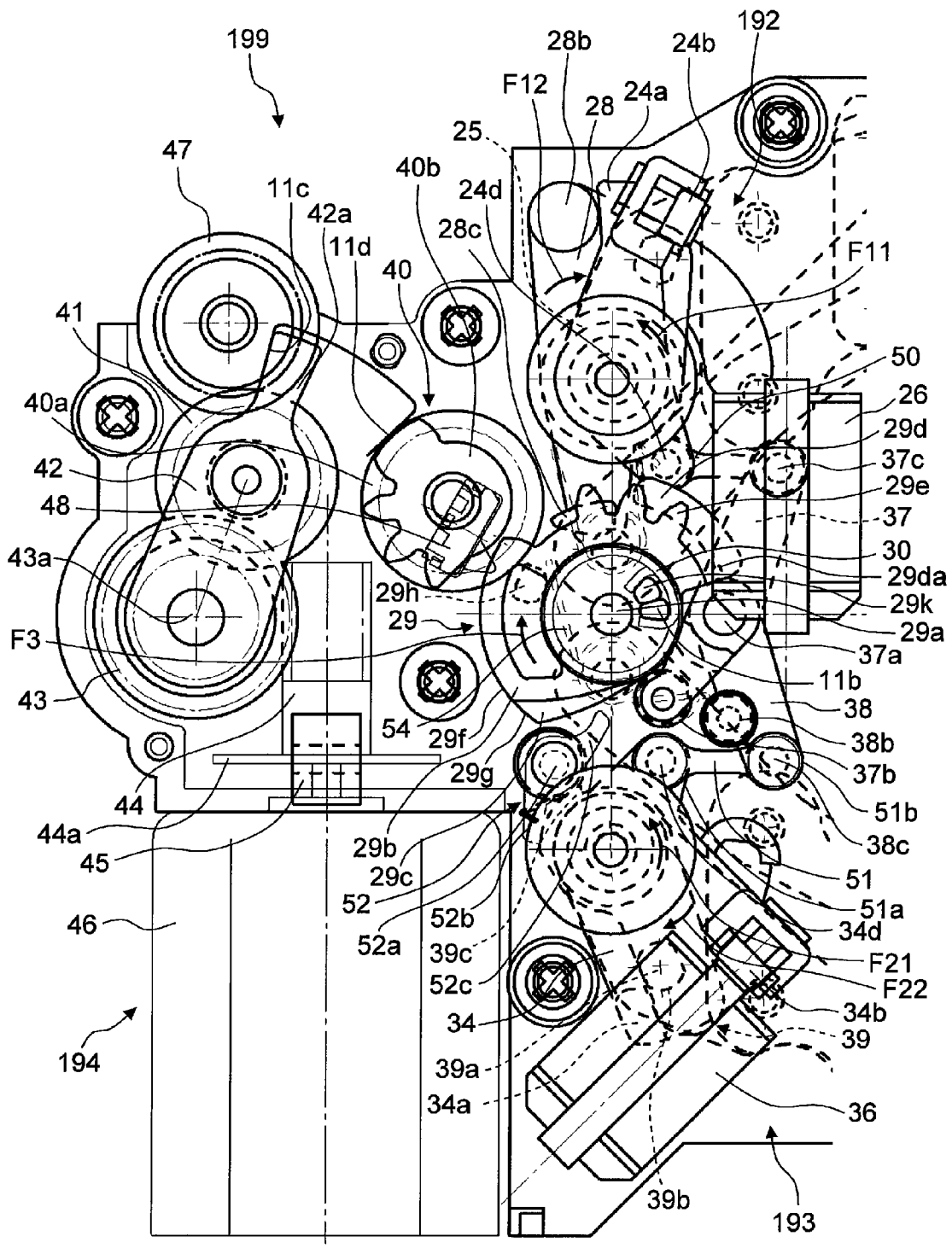
FIG. 15 is a detailed view of main parts in FIG. 14.

FIG. 14 and FIG. 15 show a state where only the rear curtain 31 completes charging for the electronic front curtain photography. Similarly to the charge operation at the time of the slit exposure photography, the motor 46 is energized in the running completion state shown in FIG. 6, and the sun gear 43 rotates clockwise (step S21). When the sun gear 43 rotates clockwise, the charge lever 29 rotates counterclockwise.

The operation of the focal plane shutter device 190 from the state shown in FIG. 6 to the state shown in FIG. 8 is similar to that at the time of the slit exposure photography. Specifically, simultaneously of energization to the motor 46, detection of whether or not the charge lever 29 is in proximity is started by the charge-lever detection switch 48 (step S22). When the charge lever 29 is detected by the charge-lever detection switch 48 as a result of advancement of the rotation of the charge lever 29, detection of the drive amount of the motor 46 is started by using the photo interrupter 45 and the encoder vane 44a (step S23). When the charge lever 29 is driven to rotate counterclockwise by the motor 46, the charging of the rear curtain 31 is started, and then, the charging of the front curtain 21 is started. Similarly to the slit exposure photography, the image data is read from the CMOS image sensor 110, and in parallel therewith, the rear curtain 31 is charged. When the charge lever 29 is driven by the motor 46 to a position shown in FIG. 8, the camera controller 140 stops the motor 46 (step S24). In the state shown in FIG. 8, the rear-curtain unlocking part 29h of the charge lever 29 does not contact the unlocking claw 52c of the rear-curtain locking lever 52, and thus, the locking state of the rear curtain 31 is maintained.

Upon completion of reading the image data from the CMOS image sensor 110, the drive of the charge lever 29 by the motor 46 is started again, and the charge lever 29 further rotates counterclockwise (steps S25 and S26). When the charge lever 29 rotates counterclockwise from a position shown in FIG. 8, the rear-curtain unlocking part 29h of the charge lever 29 contacts the unlocking claw 52c of the rear-curtain locking lever 52. When the unlocking claw 52c is pushed by the rear-curtain unlocking part 29h, the rear-curtain locking lever 52 rotates in a clockwise direction resisting the elastic force F24 of the rear-curtain locking spring 53. As a result, the locking claw 52b is released from the rear-curtain locking part 39c, and the locking of the rear-curtain drive lever 39 is released. When the locking of the rear-curtain drive lever 39 is released, the rear curtain 31 moves from the first rear curtain position P21 to the second rear curtain position P22 by the elastic force F22 of the rear-curtain set spring 54, and the state where the rear curtain 31 is retracted from the opening part 11a is maintained. This state is also referred to as "charge completion state of the electronic front curtain photography".

After releasing the locking of the rear curtain 31, the charge lever 29 stops just shortly of the position shown in FIG. 10 (steps S27 and S28). When the charge lever 29 stops just shortly of the position shown in FIG. 10, the distal end of the claw 28c is not hooked onto the reverse preventive part 29da provided to the front-curtain holding part 29 unlike the state shown in FIG. 10. In this state, only by the self lock function of the worm gear 44, the clockwise rotation of the charge lever 29 by the elastic force F23 of the charge-lever return spring 30 is restricted.

It is noted that the charge lever 29 stops just shortly of the position shown in FIG. 10, and thus, the focal plane shutter device 190 does not reach the state shown in FIG. 10 during the charge operation of the electronic front curtain photography.

In the charge completion state of the electronic front curtain photography, the front-curtain holding part 29d enters into the rotation trail (moving region) of the claw 28c, and thus, the claw 28c abuts the front-curtain holding part 29d. As a result, the state where the front curtain 21 is retracted from the opening part 11a is maintained. Thus, in the focal plane shutter device 190, the state where the opening part 11a is opened can be automatically maintained. That is, the focal plane shutter device 190 has a so-called normally open function.

The state where the front curtain 21 is retracted from the opening part 11a is maintained, and thus, in the charge completion state of the electronic front curtain photography, light from a subject is guided to the CMOS image sensor 110. This state is effective particularly when the user wishes to maintain a state where the CMOS image sensor 110 is exposed. For example, this state is particularly effective when by using a live view function by the camera body 100, the subject is observed, framing is performed, or moving picture photography is performed.

4.3: Electronic Front Curtain Photography Standby State

When the release button 131 is operated by the user, the necessary photography information such as photometry is obtained by the camera controller 140. After completing obtaining the photography information, the release operation is started. When the release operation is started, the focal plane shutter device 190 proceeds to an electronic front curtain photography standby state shown in FIG. 14.

Specifically, when the release button 131 is operated by the user, the motor 46 is driven and inverted by the camera controller 140, resulting in release of the meshing between the planet gear 41 and the partly tooth-missing gear 40 (steps S29 and S30). As a result, the self lock function of the worm gear 44 does not act on the charge lever 29, and by the elastic force F23 of the charge-lever return spring 30, the contacting portion 29k of the charge lever 29 rotates clockwise until it abuts the stopper 11b.

In a state where the contacting portion 29k of the charge lever 29 abuts the stopper 11b, the contacting portion between the front-curtain holding part 29d of the charge lever 29 and the claw 28c of the front-curtain drive lever 28 is released, and thus, the front curtain 21 attempts to move from the second front curtain position P12 to the first front curtain position P11. However, also the contacting portion between the front-curtain charge lever roller 37b and the front-curtain set cam 29b is released, and thus, the front-curtain set lever 24 rotates counterclockwise by the elastic force F11 of the front-curtain running spring 25. As a result, the front-curtain drive lever 28 is pushed counterclockwise by the front-curtain set lever 24, the state where the front curtain 21 is retracted from the opening part 11a is maintained.

On the other hand, in the state where the contacting portion 29k of the charge lever 29 abuts the stopper 11b, the contacting portion between the rear-curtain charge lever roller 38b and the rear-curtain set cam 29c is released; however, the power feeding to the rear-curtain electromagnet 36 is started before the contacting portion between the rear-curtain charge lever roller 38b and the rear-curtain set cam 29c is released (step S30). As a result, the rear-curtain attracting piece 34b is attracted by the rear-curtain electromagnet 36, and as shown in FIG. 14, the charge state of the rear-curtain set lever 34 is maintained. In the electronic front curtain photography, the front curtain 21 is not used, and thus, it is not necessary to feed power to the front-curtain electromagnet 26, and as a result, it is possible to expect a power-saving effect.

After a predetermined time elapses from the operation of the release button 131, the motor 46 stops (steps S31 and S32).

As described above, from the charge operation to the electronic front curtain photography standby state, the front curtain 21 hardly moves while maintaining the state where the front curtain 21 is retracted from the opening part 11a. This eliminates a need such as the front curtain 21 waits for a drive time and waits for a convergence of bounds, and as a result, at the approximately same time as feeding the power to the motor 46 and the rear-curtain electromagnet 36, the electronic front curtain photography by the CMOS image sensor 110 can be started. Thereby, it becomes possible to significantly shorten a release time lag.

4.4: Electronic Front Curtain Exposure

Thereafter, by the release command from the camera controller 140, resetting electric charges and accumulating the electric charges are started from pixels on lower lines of the CMOS image sensor 110 (step S33). The electric charges are sequentially reset from lower lines to upper lines. Subsequently, after resetting the electric charges and accumulating the electric charges are started, after a set exposure time elapses, the power feeding to the rear-curtain electromagnet 36 is stopped (steps S34 and S35). The exposure time is set based on the exposure information by the camera controller 140.

When the power feeding to the rear-curtain electromagnet 36 is stopped, the rear-curtain set lever 34 becomes able to rotate counterclockwise, and thus, the rear-curtain set lever 34 rotates counterclockwise by the elastic force F21 of the rear-curtain running spring 35. Since the rear-curtain-set-lever contacting portion 34a abuts the rear-curtain drive lever 39, if the rear-curtain set lever 34 rotates counterclockwise, then the rear-curtain drive lever 39 also integrally rotates together with the rear-curtain set lever 34. As a result, the rear curtain 31 runs from the second rear curtain position P22 to the first rear curtain position P21, the opening part 11a is shielded from the lower portion of the opening part 11a. During a time while the electric charges are reset and the incident light is shielded by the rear curtain 31, the CMOS image sensor 110 is exposed. An exposure operation in which the CMOS image sensor 110 is thus driven in tune with the running of the rear curtain 31 so as to scan the exposure region is called the electronic front curtain photography. When the rear curtain 31 completes running, the focal plane shutter device 190 is changed again to the state shown in FIG. 6. When the charge operation is performed again, the focal plane shutter device 190 is changed to a state shown in FIG. 8. In parallel with the charge operation of the rear curtain 31, the camera controller 140 controls the CMOS image sensor 110 so as to read the obtained image data. After completion of reading the image data, the current state is changed to the charge completion state of the electronic front curtain photography, and the process prepares for next photography.

In this way, when the charging and the reading are performed in parallel, a preparation time for next photography can be shortened. This makes intervals of continuous photography small, enabling high-speed continuous shooting.

Second Embodiment

In the first embodiment, the locking mechanism of the front curtain 21 is realized by the front-curtain holding part 29d of the charge lever 29 and the claw 28c of the front-curtain drive lever 28; however, similarly to the rear curtain 31, the locking mechanism of the front curtain 21 may be realized by using member different from the charge lever 29.

It is noted that in the following explanation, the same reference numerals are assigned to a configuration having the substantially same function as that in the first embodiment, and the detailed explanation may be omitted.

1: Configuration of a Focal Plane Shutter Device 290

By using FIG. 25 through FIG. 38B, a focal plane shutter device 290 according to the second embodiment will be explained.

The focal plane shutter device 290 includes: an opening-part opening/closing mechanism 191, and a drive unit 299.

The drive unit 299 includes: a front-curtain drive mechanism 292, a rear-curtain drive mechanism 293, and the charge mechanism 194.

1.1: Opening-Part Opening/Closing Mechanism 191

Figure 25:
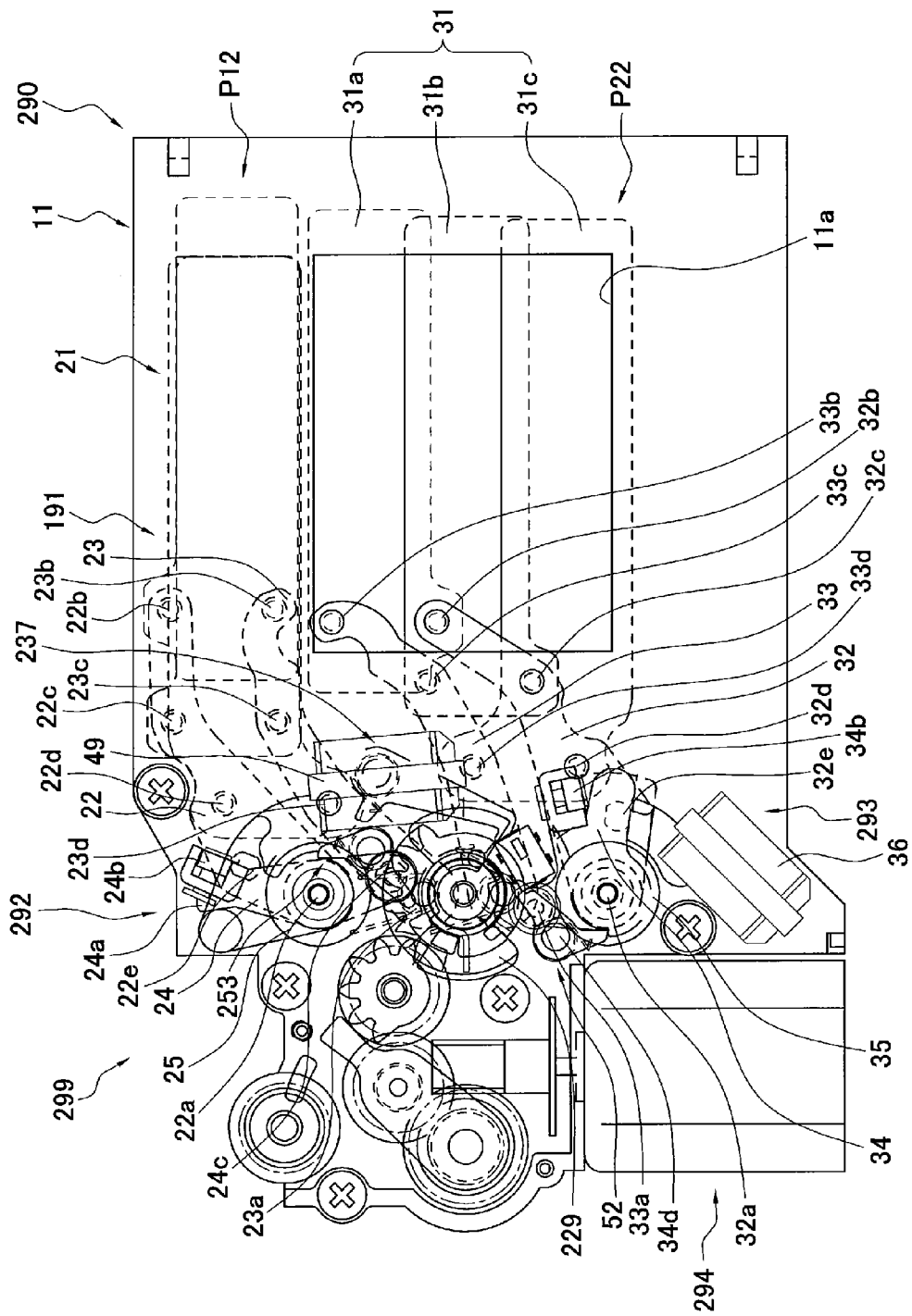
FIG. 25 is a state diagram of a focal plane shutter device 190 in a state where a rear curtain completes running.

As shown in FIG. 25, the opening-part opening/closing mechanism 191 according to the second embodiment has the substantially same configuration as that of the opening-part opening/closing mechanism 191 according to the first embodiment, and thus, the detailed explanation is omitted.

1.2: Front-Curtain Drive Mechanism 292

Subsequently, the front-curtain drive mechanism 292 for driving the front curtain 21 will be explained.

Figure 26:
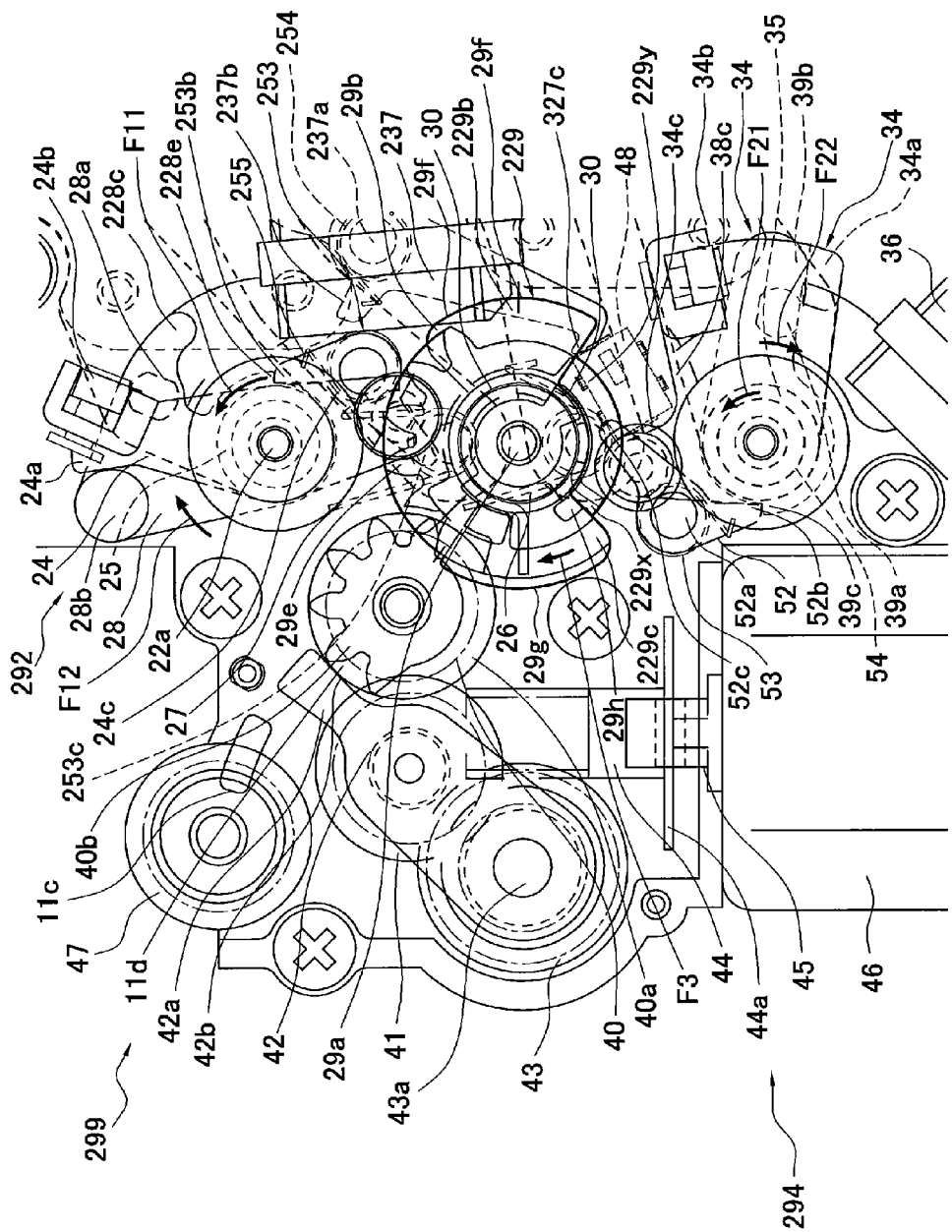
FIG. 26 is a detailed view of main parts in FIG. 25.

As shown in FIGS. 25 and 26, the front-curtain drive mechanism 292 includes: a front-curtain drive lever 28, a front-curtain set spring 27, a charge lever 29, a front-curtain set lever 24, a front-curtain running spring 25, a front-curtain electromagnet 26, and a return locking lever 137.

Figures 35A, 35B:
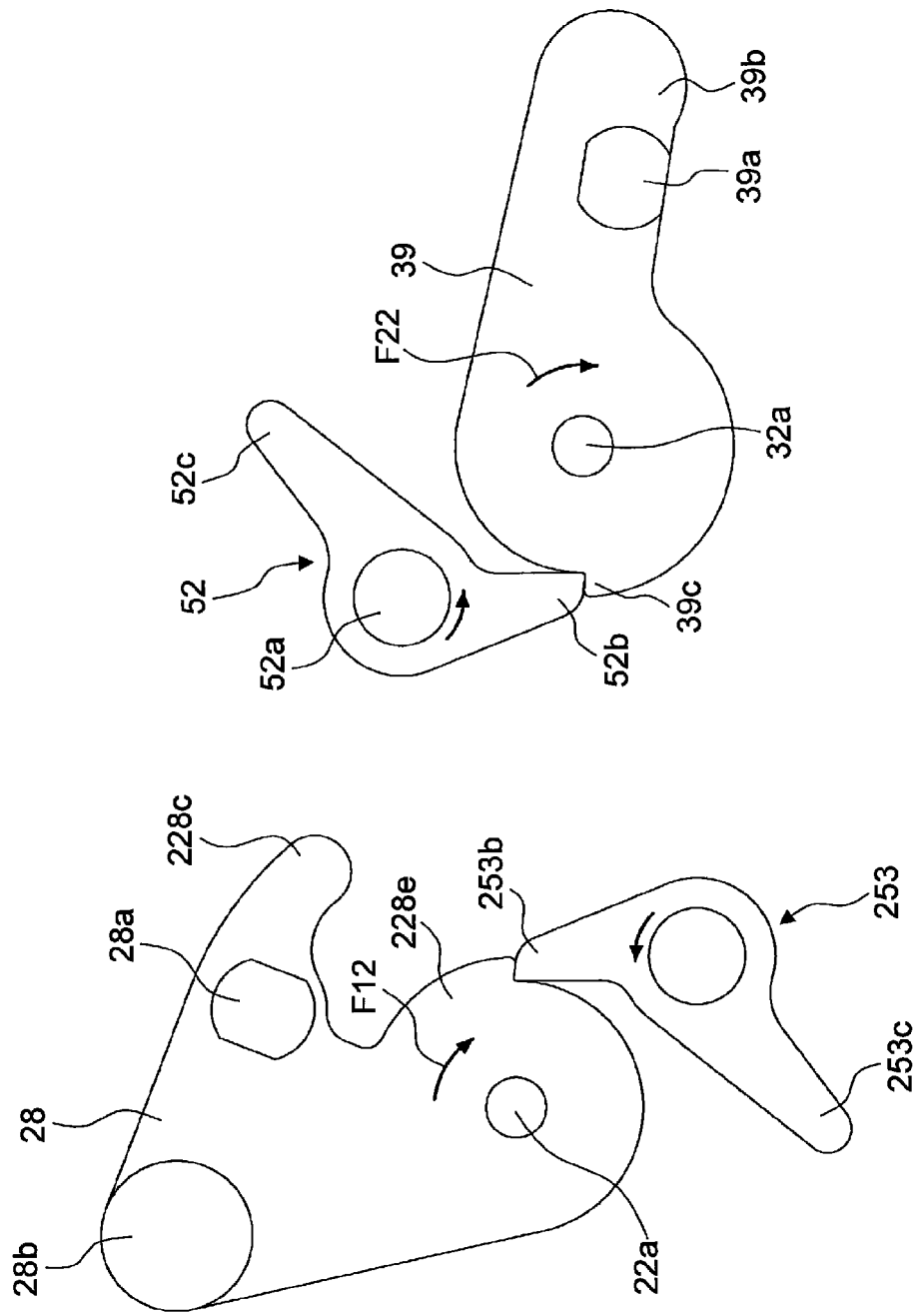
FIG. 35A is a configuration diagram of a front-curtain drive lever and a front-curtain lock lever.
FIG. 35B is a configuration diagram of a rear-curtain drive lever and a rear-curtain lock lever.

The front-curtain drive lever 28 (an example of a front-curtain drive member) couples the front curtain 21 to the shutter base plate 11 to be movable between the first front curtain position P11 and the second front curtain position P12. As shown in FIG. 35A, the front-curtain drive lever 28 includes a drive coupling pin 28a. As shown in FIG. 25, the front-curtain drive arm 22 includes a coupling hole 22e. The drive coupling pin 28a is inserted into the coupling hole 22e. Similarly to the front-curtain drive arm 22, the front-curtain drive lever 28 is rotatably supported by the rotating shaft 22a around the rotating shaft 22a. The front-curtain drive arm 22 and the front-curtain drive lever 28 can rotate integrally around the rotating shaft 22a.

The front-curtain set spring 27 (an example of a third elastic member) biases the front-curtain drive lever 28 in a direction where the front curtain 21 covers the opening part 11a. Specifically, as shown in FIG. 26, the front-curtain set spring 27 imparts an elastic force F12 to the front curtain 21 so that the front curtain 21 moves from the first front curtain position P11 to the second front curtain position P12. The elastic force F12 of the front-curtain set spring 27 is smaller than the elastic force F 11 of the front-curtain running spring 25. The front-curtain set spring 27 is hooked onto the front-curtain driven arm 23, and thus, the elastic force F12 of the front-curtain set spring 27 acts upon the front-curtain drive arm 22. In the first embodiment, the front-curtain set spring 27 applies a clockwise rotation force to the front-curtain drive lever 28.

Figure 36B:
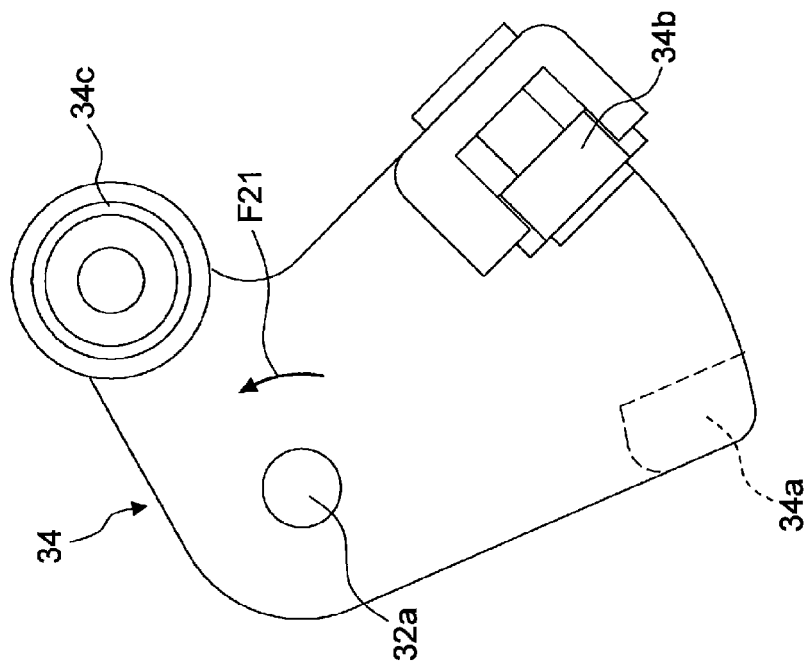
FIG. 36B is a configuration diagram of a rear-curtain set lever.
Figure 36A:
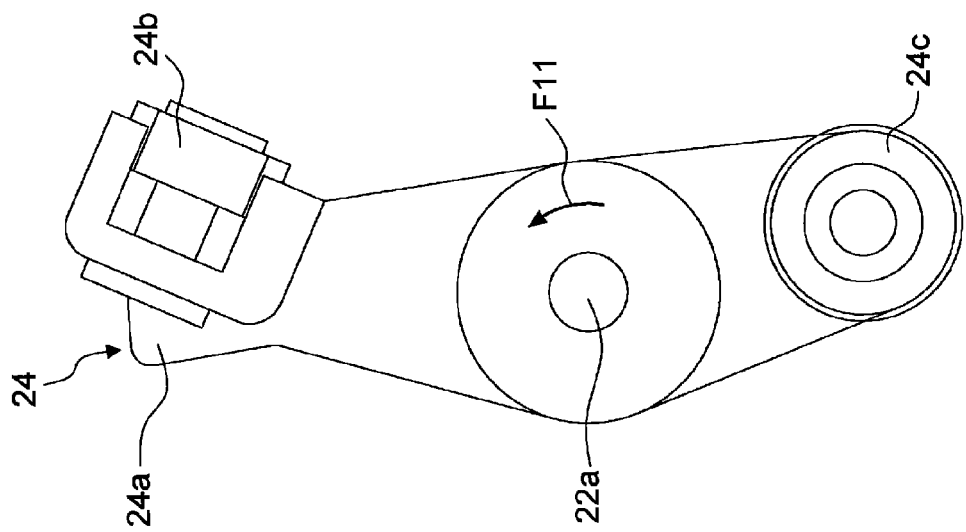
FIG. 36A is a configuration diagram of a front-curtain set lever.

As shown in FIG. 35A, the front-curtain drive lever 28 includes a front-curtain-drive-lever contacting portion 28b. As shown in FIG. 36A, the front-curtain set lever 24 includes a front-curtain-set-lever contacting portion 24a. As shown in FIG. 26, the front-curtain-drive-lever contacting portion 28b abuts the front-curtain-set-lever contacting portion 24a. Similarly to the front-curtain drive lever 28, the front-curtain set lever 24 is rotatably supported by the rotating shaft 22a around the rotating shaft 22a. When the front-curtain set lever 24 rotates counterclockwise, the front-curtain-drive-lever contacting portion 28b is pushed by the front-curtain-set-lever contacting portion 24a, which in turn rotates the front-curtain drive lever 28 counterclockwise. When the front curtain 21 moves from the first front curtain position P11 to the second front curtain position P12, the front-curtain set lever 24 transmits the elastic force F11 of the front-curtain running spring 25 to the front curtain 21 via the front-curtain drive lever 28. That is, at the time of imparting the front-curtain running spring 25 with the first bias force F13, the charge mechanism 194 imparts the front-curtain running spring 25 with the first bias force F13 via the front-curtain set lever 24.

Moreover, by the elastic force F12 of the front-curtain set spring 27, the front-curtain drive lever 28 is imparted with clockwise rotation force. This brings the front-curtain-set-lever contacting portion 24a and the front-curtain-drive-lever contacting portion 28b contact each other. The counterclockwise rotation of the front-curtain set lever 24 is restricted by a stopper (not shown) at a position shown in FIG. 6. Thus, when the front-curtain set lever 24 and the front-curtain drive lever 28 integrally rotate counterclockwise, the front-curtain set lever 24 and the front-curtain drive lever 28 stop at the position shown in FIG. 6. By the elastic force F11 of the front-curtain running spring 25, the front-curtain set lever 24 and the front-curtain drive lever 28 are kept at a position shown in FIG. 6. That is, the elastic force F11 of the front-curtain running spring 25 can be transmitted to the front curtain 21 by the front-curtain drive lever 28 via the front-curtain set lever 24.

On the other hand, even when the front-curtain set lever 24 rotates clockwise, the front-curtain-set-lever contacting portion 24a does not contact the front-curtain-drive-lever contacting portion 28b, and thus, when the front-curtain set lever 24 rotates clockwise, the front-curtain set lever 24 rotates independently of the front-curtain drive lever 28. Therefore, when the charge mechanism 194 imparts the front-curtain running spring 25 with the first bias force F13, the front-curtain set lever 24 imparts the front-curtain running spring 25 with the first bias force F13 without intervention of the front-curtain drive lever 28.

As shown in FIG. 26, the front-curtain running spring 25 (an example of a first elastic member) always imparts the front-curtain set lever 24 with the strong counterclockwise elastic force F11. Specifically, the rear-curtain running spring 35 imparts the front curtain 21 with the elastic force F11 so that the front curtain 21 moves from the first front curtain position P11 to the second front curtain position P12. By the elastic force F11 of the front-curtain running spring 25, the counterclockwise rotation force is acted upon the front-curtain set lever 24. The front-curtain set lever 24 is disposed so that the elastic force F11 of the front-curtain running spring 25 can be transmitted to the front-curtain drive lever 28. Therefore, as shown in FIG. 6, for example, the elastic force F11 of the front-curtain running spring 25 is transmitted to the front-curtain drive lever 28. That is, when the front curtain 21 is disposed at the first front curtain position P11, the front-curtain running spring 25 imparts the front-curtain drive lever 28 with the strong counterclockwise elastic force F11. The elastic force F11 of the front-curtain running spring 25 also is transmitted to the front-curtain drive arm 22 and the front curtain 21 via the front-curtain drive lever 28. Therefore, the front-curtain running spring 25 biases the front curtain 21 in a direction where the front curtain 21 is retracted from the opening part 11a.

At this time, the counterclockwise elastic force F11 applied by the front-curtain running spring 25 to the front-curtain drive lever 28 is larger than the clockwise elastic force F12 applied by the front-curtain set spring 27 to the front-curtain drive lever 28. Therefore, even when the elastic force F12 of the front-curtain set spring 27 is acted upon the front curtain 21, the front curtain 21 can be run toward the direction where the front curtain 21 is retracted from the opening part 11a by the elastic force F11 of the front-curtain running spring 25. The force achieved when the front curtain 21 runs is equivalent to a total force of the elastic force F11 of the front-curtain running spring 25 and the elastic force F12 of the front-curtain set spring 27.

Further, as shown in FIG. 26, a front-curtain attracting piece 24b is fixed to the end of the front-curtain set lever 24. The front-curtain attracting piece 24b is disposed to be attracted to the front-curtain electromagnet 26. When the front-curtain electromagnet 26 is supplied with power, the front-curtain electromagnet 26 generates a magnetic force. Thus, if the front-curtain electromagnet 26 is supplied with power when the front-curtain attracting piece 24b is disposed near the rear-curtain electromagnet 36, then the front-curtain attracting piece 24b is attracted to the front-curtain electromagnet 26 by the magnetic force of the front-curtain electromagnet 26. The attracting force between the front-curtain attracting piece 24b and the front-curtain electromagnet 26 has a sufficient power to counteract the elastic force F11 of the front-curtain running spring 25. Therefore, when the front-curtain attracting piece 24b is attracted to the front-curtain electromagnet 26, the position of the front-curtain set lever 24 is kept at a charge position shown in FIG. 9 even when the elastic force F11 of the front-curtain running spring 25 acts upon the front-curtain set lever 24.

Figures 37A, 37B:
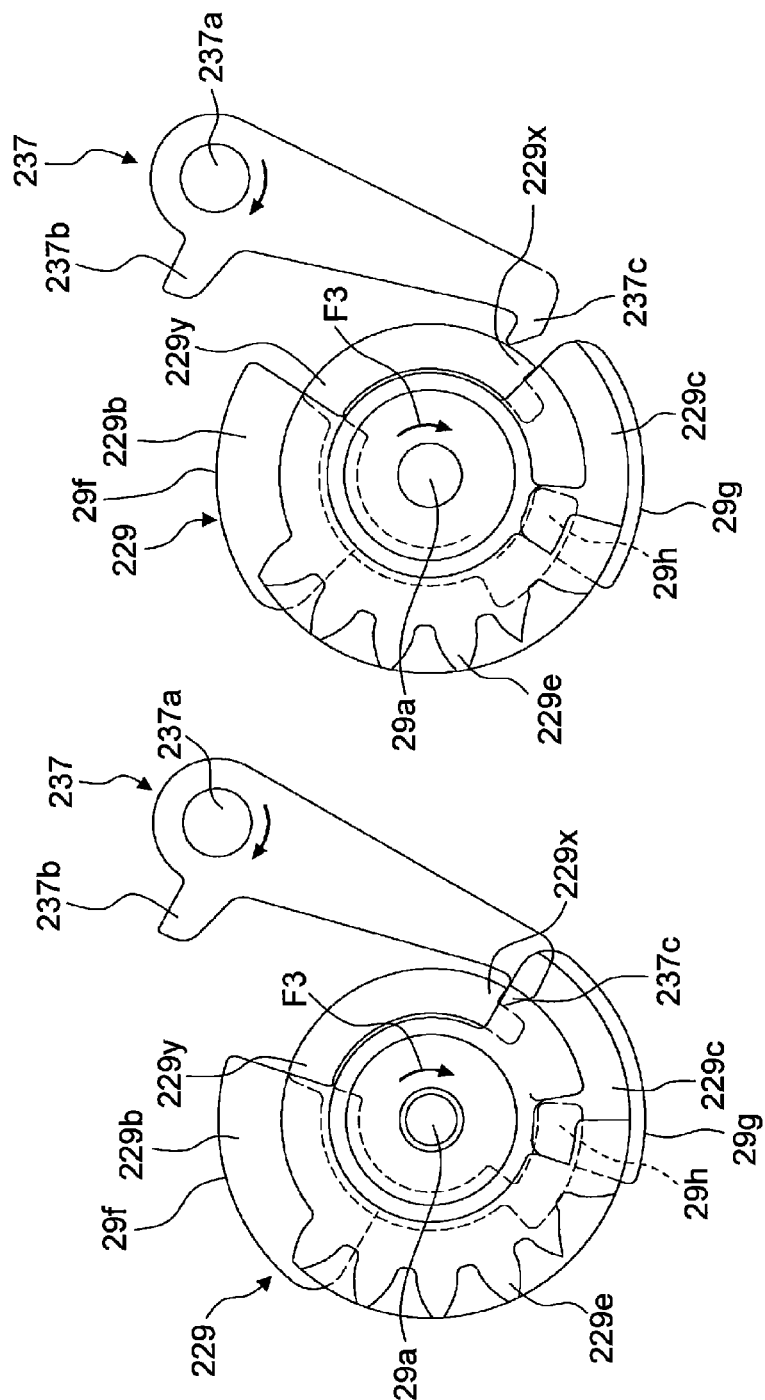
FIG. 37A is a configuration diagram of a charge lever and a return lock lever (when locked)
FIG. 37B is a configuration diagram of the charge lever and the return lock lever (when unlocked)

As shown in FIG. 36A, the front-curtain set lever 24 rotatably supports a front-curtain set lever roller 24c. As shown in FIGS. 37A and 37B, the charge lever 29 includes a front-curtain set cam 229b (an example of a front-curtain cam part). As shown in FIG. 26, the front-curtain set lever roller 24c is disposed to abut the front-curtain set cam 229b.

In the focal plane shutter device 290, the state where the front curtain 21 is retracted from the opening part 11a is held by a front-curtain locking lever 253. Specifically, the front-curtain locking lever 253 is arranged to restrict the movement of the front-curtain drive lever 28 when the front curtain 21 moves from the second front curtain position P12 to the first front curtain position P11, and is rotatably supported by the shutter base plate 11. A front-curtain locking spring 255 (an example of a front-curtain lock elastic member) imparts the front-curtain locking lever 253 with elastic force so that the front-curtain locking lever 253 keeps a state of restricting the movement of the front-curtain drive lever 28, and imparts the front-curtain locking lever 253 with a counterclockwise rotation force. The front-curtain locking lever 253 includes a front-curtain locking claw 253b. In a state where the front curtain 21 is disposed at the second front curtain position P12, the front-curtain locking claw 253b is hooked onto a front-curtain locking part 228e of the front-curtain drive lever 28. The front-curtain locking part 228e has a step, and the front-curtain locking claw 253b is hooked onto this step.

Further, in the focal plane shutter device 290, the locking of the front curtain 21 by the front-curtain locking lever 253 can also be released. Specifically, as shown in FIG. 35A, the front-curtain locking lever 253 includes an unlocking claw 253c. The front-curtain locking lever 253 is disposed to be contactable with a front-curtain unlocking part 229y of the charge lever 229. When the charge lever 229 rotates counterclockwise, the front-curtain unlocking part 229y contacts the unlocking claw 253c, and the front-curtain locking lever 253 is driven by the motor 46 via the charge lever 29 to resist the elastic force of the front-curtain locking spring 255. As a result, the front-curtain locking lever 253 rotates clockwise, and the front-curtain locking claw 253b is released from the front-curtain locking part 228e of the front-curtain drive lever 28. When the front-curtain locking claw 253b is released from the front-curtain locking part 228e, the front-curtain drive lever 28 rotates clockwise by the elastic force F12 of the front-curtain set spring 27, and the front curtain 21 runs from the second front curtain position P12 to the first front curtain position P11.

In this way, the front curtain 21 can be automatically held at the second front curtain position P12, and further, the locking of the front curtain 21 can be released by using the charge lever 229.

Moreover, in the focal plane shutter device 290, it is possible to restrict the rotation of the charge lever 229. Specifically, the front-curtain drive lever 28 includes a return unlocking protrusion 228c. The return unlocking protrusion 228c is arranged to be contactable with a driven protrusion 237b of the return locking lever 237. More particularly, when the front curtain 21 runs from the second front curtain position P12 to the first front curtain position P11, the return unlocking protrusion 228c contacts the driven protrusion 237b. When the driven protrusion 237b is pushed by the return unlocking protrusion 228c, the return locking lever 237 rotates counterclockwise (see FIGS. 38A and 38B).

As shown in FIG. 26, the return locking lever 237 is rotatably supported by the shutter base plate 11 via the shaft 237a. A return locking spring 254 imparts the return locking lever 237 with a clockwise rotation force. As shown in FIGS. 37A and 37B, the return locking lever 237 includes a locking claw 237c. The locking claw 237c restricts the clockwise rotation of the charge lever 229. The locking claw 237c is configured to be hooked onto an reverse preventive part 229x of the charge lever 229. In a state shown in FIG. 30, the locking claw 237c fits into the reverse preventive part 229x by the elastic force of the return locking spring 254 (see FIGS. 30 and 38A). In this state, if the driven protrusion 237b is pushed by the return unlocking protrusion 228c, then the return locking lever 237 rotates counterclockwise, and the locking claw 237c is released from the reverse preventive part 229x (see FIGS. 32 and 38B). Thereby, the charge lever 229 becomes able to rotate clockwise.

Figure 28:
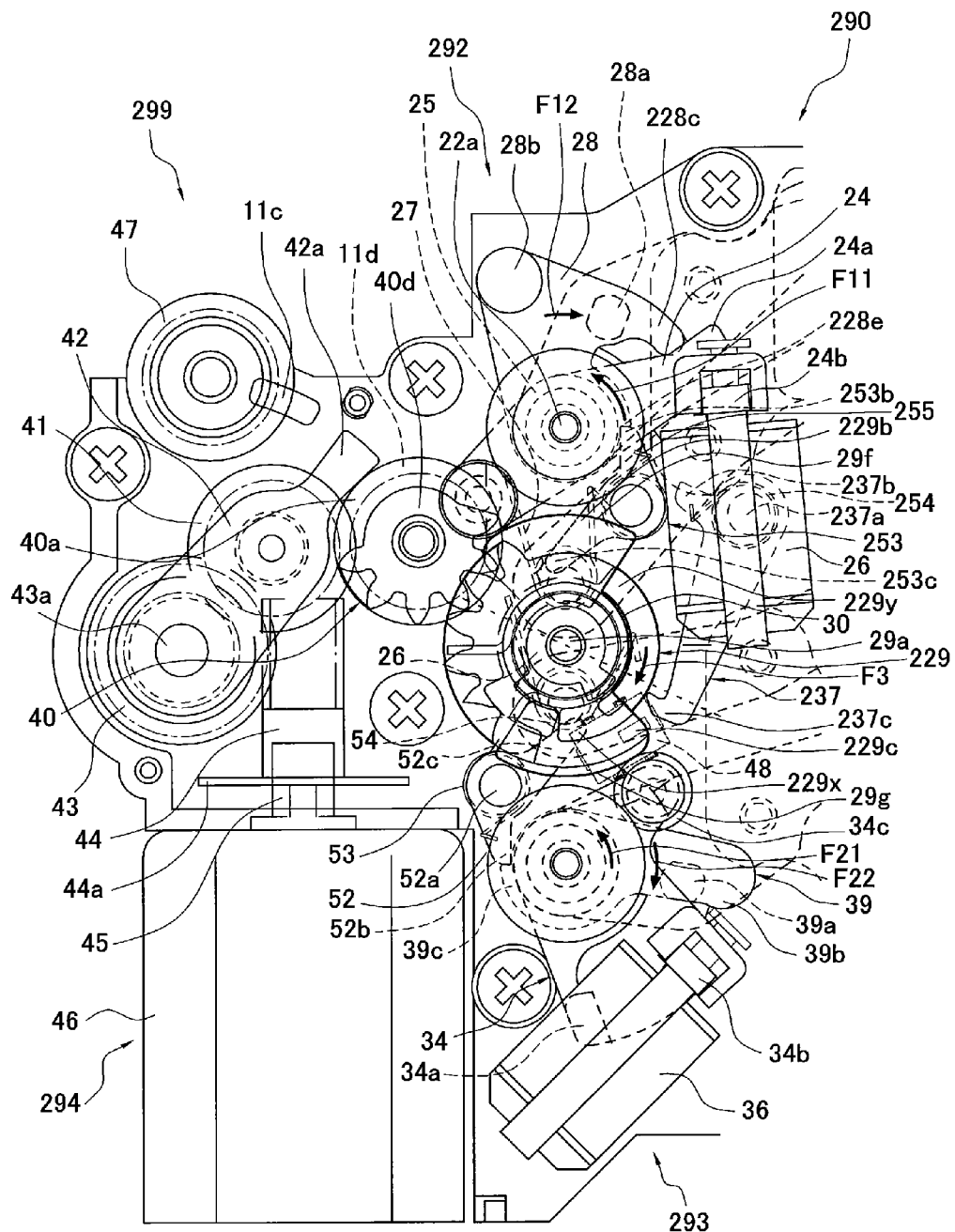
FIG. 28 is a detailed view of main parts in FIG. 27.

On the other hand, in states shown in FIGS. 26 and 28, the return locking lever 237 merely abuts the outer peripheral face of the charge lever 229, and therefore, the rotation restriction of the charge lever 229 by the return locking lever 237 is not performed.

1.3: Rear-Curtain Drive Mechanism 293

Subsequently, the rear-curtain drive mechanism 293 for driving the rear curtain 31 will be explained.

As shown in FIGS. 25 and 26, the rear-curtain drive mechanism 293 includes a rear-curtain drive lever 39, a rear-curtain set lever 34, a rear-curtain running spring 35, and a rear-curtain locking lever 52.

The rear-curtain drive lever 39 couples the rear curtain 31 to the shutter base plate 11 to be movable between the first rear curtain position P21 and the second rear curtain position P22. As shown in FIG. 35B, the rear-curtain drive lever 39 includes a rear-curtain drive lever coupling pin 39a. As shown in FIG. 25, the rear-curtain drive arm 32 includes a rear-curtain drive arm coupling hole 32e. The rear-curtain drive lever coupling pin 39a is inserted into the rear-curtain drive arm coupling hole 32e. Moreover, the rear-curtain drive lever 39 and the rear-curtain drive arm 32 are rotatably supported by the rotation shaft 32a around the rotation shaft 32a. The rear-curtain drive arm 32 and the rear-curtain drive lever 39 can integrally rotate around the rotation shaft 32a.

A rear-curtain set spring 54 biases the rear-curtain drive lever 39 in a direction where the rear curtain 31 is retracted from the opening part 11a. Specifically, as shown in FIG. 26, the rear-curtain set spring 54 imparts the rear curtain 31 with the elastic force F22 so that the rear curtain 31 moves from the first rear curtain position P21 to the second rear curtain position P22. The elastic force F22 of the rear-curtain set spring 54 is smaller than the elastic force F21 of the rear-curtain running spring 35. The elastic force F22 of the rear-curtain set spring 54 is transmitted to the rear-curtain drive arm 32 and the rear-curtain driven arm 33. As a result, the rear-curtain set spring 54 applies the clockwise elastic force F22 to the rear-curtain drive lever 39.

As shown in FIG. 35B, the rear-curtain drive lever 39 includes a rear-curtain-drive-lever contacting portion 39b. As shown in FIG. 36B, the rear-curtain set lever 34 includes a rear-curtain-set-lever contacting portion 34a. As shown in FIG. 26, the rear-curtain-drive-lever contacting portion 39b abuts the rear-curtain-set-lever contacting portion 34a. Similarly to the rear-curtain drive lever 39, the rear-curtain set lever 34 is rotatably supported by the rotation shaft 32a around the rotation shaft 32a. When the rear-curtain set lever 34 rotates counterclockwise, the rear-curtain-drive-lever contacting portion 39b is pushed by the rear-curtain-set-lever contacting portion 34a, and as a result, the rear-curtain drive lever 39 rotates counterclockwise. When the rear curtain 31 moves from the first rear curtain position P21 to the second rear curtain position P22, the rear-curtain set lever 34 transmits the elastic force F21 of the rear-curtain running spring 35 to the rear curtain 31 via the rear-curtain drive lever 39. That is, at the time of imparting the rear-curtain running spring 35 with the second bias force F23, the charge mechanism 194 imparts the rear-curtain running spring 35 with the second bias force F23 via the rear-curtain set lever 34.

Moreover, by the elastic force F22 of the rear-curtain set spring 54, the clockwise rotation force is imparted to the rear-curtain drive lever 39. Because of this, the rear-curtain-set-lever contacting portion 34a and the rear-curtain-drive-lever contacting portion 39b contact each other. The counterclockwise rotation of the rear-curtain set lever 34 is restricted by a stopper (not shown) at a position shown in FIG. 26. Thus, when the rear-curtain set lever 34 and the rear-curtain drive lever 39 integrally rotate counterclockwise, the rear-curtain set lever 34 and the rear-curtain drive lever 39 stop at the position shown in FIG. 26. By the elastic force F21 of the rear-curtain running spring 35, the rear-curtain set lever 34 and the rear-curtain drive lever 39 kept at the position shown in FIG. 26. That is, the rear-curtain drive lever 39 is capable of transmitting the elastic force F21 of the rear-curtain running spring 35 to the rear curtain 31 via the rear-curtain set lever 34.

On the other hand, even when the rear-curtain set lever 34 rotates clockwise, the rear-curtain-set-lever contacting portion 34a does not contact the rear-curtain-drive-lever contacting portion 39b, and thus, when the rear-curtain set lever 34 rotates clockwise, the rear-curtain set lever 34 rotates independently of the rear-curtain drive lever 39. Therefore, when the charge mechanism 194 imparts the rear-curtain running spring 35 with the second bias force F23, the rear-curtain set lever 34 imparts the rear-curtain running spring 35 with the second bias force F23 without intervention of the rear-curtain drive lever 39.

As shown in FIG. 35B, the rear-curtain drive lever 39 further includes a rear-curtain locking part 39c. The rear-curtain locking lever 52 includes a locking claw 52b. The rear-curtain locking part 39c is hooked onto the locking claw 52b in a state where the rear curtain 31 covers the opening part 11a. The rear-curtain locking lever 52 is rotatably supported by the rotation shaft 52a around the rotation shaft 52a. The rotation shaft 52a is fixed to the shutter base plate 11. To the rear-curtain locking lever 52, the counterclockwise rotation force is imparted by the rear-curtain locking spring 53. Therefore, the state where the rear-curtain locking part 39c is hooked onto the locking claw 52b is held by the elastic force of the rear-curtain locking spring 53.

As shown in FIG. 26, the rear-curtain running spring 35 (an example of a second elastic member) biases the rear curtain 31 in a direction where the rear curtain 31 covers the opening part 11a. Specifically, the rear-curtain running spring 35 imparts the rear curtain 31 with an elastic force F21 via the rear-curtain drive arm 32 so that the rear curtain 31 moves from the second rear curtain position P22 to the first rear curtain position P21. By the elastic force F21 of the rear-curtain running spring 35, the strong counterclockwise rotation force is acted upon the rear-curtain set lever 34. The rear-curtain set lever 34 is arranged to transmit the elastic force F21 of the rear-curtain running spring 35 to the rear-curtain drive lever 39. Therefore, as shown in FIG. 6, for example, in a state where the rear-curtain-set-lever contacting portion 34a contacts the rear-curtain-drive-lever contacting portion 39b, the elastic force F21 of the rear-curtain running spring 35 is transmitted to the rear-curtain drive lever 39 via the rear-curtain set lever 34. That is, when the rear curtain 31 is disposed at the second rear curtain position P22, the rear-curtain running spring 35 imparts the rear-curtain drive lever 39 with the strong counterclockwise elastic force F21. The elastic force F21 of the rear-curtain running spring 35 is transmitted to the rear-curtain drive arm 32 and the rear curtain 31 via the rear-curtain drive lever 39. Therefore, the rear-curtain running spring 35 biases the rear curtain 31 in a direction where the rear curtain 31 covers the opening part 11a.

In this case, the counterclockwise elastic force F21 applied by the rear-curtain running spring 35 to the rear-curtain drive lever 39 is larger than the clockwise elastic force F22 applied by the rear-curtain set spring 54 to the rear-curtain drive lever 39. Therefore, even in a state where the elastic force F22 of the rear-curtain set spring 54 acts upon the rear curtain 31, the rear curtain 31 can be run in a direction where the rear curtain 31 covers the opening part 11a by the elastic force F21 of the rear-curtain running spring 35. The force achieved when the rear curtain 31 runs is equivalent to a total force of the elastic force F21 of the rear-curtain running spring 35 and the elastic force F22 of the rear-curtain set spring 54.

Further, as shown in FIG. 26, to the end of the rear-curtain set lever 34, a rear-curtain attracting piece 34b is fixed. The rear-curtain attracting piece 34b is disposed to be attracted to the rear-curtain electromagnet 36. When the rear-curtain electromagnet 36 is supplied with power, the rear-curtain electromagnet 36 generates a magnetic force. Thus, if the rear-curtain electromagnet 36 is supplied with the power when the rear-curtain attracting piece 34b is disposed near the rear-curtain electromagnet 36, then the rear-curtain attracting piece 34b is attracted to the rear-curtain electromagnet 36 by the magnetic force of the rear-curtain electromagnet 36. The attracting force between the rear-curtain attracting piece 34b and the rear-curtain electromagnet 36 has a sufficient power to counteract the elastic force F21 of the rear-curtain running spring 35. Therefore, when the rear-curtain attracting piece 34b is attracted to the rear-curtain electromagnet 36, the position of the rear-curtain set lever 34 is kept at a charge position shown in FIG. 9 even when the elastic force F21 of the rear-curtain running spring 35 acts upon the rear-curtain set lever 34.

As shown in FIG. 36B, the rear-curtain set lever 34 is rotatably supported by the rear-curtain set lever roller 34c. As shown in FIGS. 37A and 37B, the charge lever 29 includes a rear-curtain set cam 229c (an example of a rear-curtain cam part). As shown in FIG. 26, the rear-curtain set lever roller 34c is arranged to be contactable with the rear-curtain set cam 29c.

1.4: Charge Mechanism 294

Next, the charge mechanism 294 will be explained.

The charge mechanism 294 (an example of a charge mechanism) is configured to impart the front-curtain running spring 25 and the rear-curtain running spring 35 with a first bias force F13 resisting the elastic force F11 of the front-curtain running spring 25 and a second bias force F23 resisting the elastic force F21 of the rear-curtain running spring 35. Specifically, as shown in FIG. 26, the charge mechanism 294 includes: a charge lever 229, a partly tooth-missing gear part 229e, a charge-lever return spring 30, a partly tooth-missing gear 40, a planet gear 41, a planet carrier 42, a sun gear 43, a worm gear 44, and a charge-lever detection switch 48.

A motor 46 (an example of an actuator) generates the first bias force F13 imparted to the front-curtain running spring 25 and the second bias force F23 imparted to the rear-curtain running spring 35. Specifically, the motor 46 is configured to drive the charge lever 229 to a front-curtain charge completion position at which imparting the front-curtain running spring 25 with the first bias force F13 is completed and a rear-curtain charge completion position, a position different from the front-curtain charge completion position at which imparting the rear-curtain running spring 35 with the second bias force F23 is completed. Further, the motor 46 is configured to drive the charge lever 229 to a front-curtain charge start position at which imparting the front-curtain running spring 25 with the first bias force F13 is started and a rear-curtain charge start position, a position different from or the same as the front-curtain charge start position at which imparting the rear-curtain running spring 35 with the second bias force F23 is started.

The rear-curtain charge completion position is disposed between the rear-curtain charge start position and the front-curtain charge completion position. The motor 46 is configured to drive the charge lever 229 to a release position on the opposite side of the front-curtain charge start position relative to the front-curtain charge completion position. Further, the motor 46 is configured to drive the charge lever 229 to a restriction position on the opposite side of the front-curtain charge start position relative to the front-curtain charge completion position.

The charge lever 229 (an example of a charge member) is arranged to transmit the first bias force F13 to the front-curtain running spring 25 via the front-curtain set lever 24, and arranged to transmit the second bias force F23 to the rear-curtain running spring 35 via the rear-curtain set lever 34. Specifically, as shown in FIGS. 37A and 37B, the charge lever 229 is provided in order to drive the front-curtain drive lever 28, the front-curtain set lever 24, and the rear-curtain set lever 34, and includes: a rotation shaft 29a, a front-curtain set cam 229b, and a rear-curtain set cam 229c. The charge lever 229 is rotatably arranged relative to the shutter base plate 11 around the rotation shaft 29a.

As shown in FIG. 26, the front-curtain set cam 229b (an example of a front-curtain cam part) is disposed to abut the front-curtain set lever 24, and drives to rotate the front-curtain set lever 24 clockwise. More particularly, the front-curtain set cam 229b is disposed to abut the front-curtain set lever roller 24c of the front-curtain set lever 24. If the charge lever 229 rotates counterclockwise when the front-curtain set cam 229b abuts the front-curtain set lever roller 24c, then the front-curtain set lever 24 rotates clockwise while resisting the elastic force F11 of the front-curtain running spring 25, resulting in the front-curtain attracting piece 24b contacting the front-curtain electromagnet 26. In this way, the elastic force required for running the front curtain 21 can be charged to the front-curtain running spring 25 by the charge lever 229. When the charge lever 229 is positioned at the front-curtain charge completion position, the front-curtain set cam 229b abuts the front-curtain set lever 24.

Moreover, the rear-curtain set cam 229c is disposed to abut the rear-curtain set lever 34, and drives to rotate the rear-curtain set lever 34 clockwise. The rear-curtain set cam 229c is disposed to abut the rear-curtain set lever roller 34c of the rear-curtain set lever 34. If the charge lever 229 rotates counterclockwise when the rear-curtain set cam 229c abuts the rear-curtain set lever roller 34c, then the rear-curtain set lever 34 rotates clockwise while resisting the elastic force F21 of the rear-curtain running spring 35, resulting in the rear-curtain attracting piece 34b contacting the rear-curtain electromagnet 36. In this way, the bias force required for running the rear curtain 31 can be charged to the rear-curtain running spring 35 by the charge lever 229. As shown in FIG. 28, when the charge lever 229 is at the rear-curtain charge completion position, the rear-curtain set cam 229c abuts the rear-curtain set lever 34, and the rear-curtain set lever roller 34c is held at a position shown in FIG. 28 by the rear-curtain set cam 229c.

A state where the front-curtain attracting piece 24b is at the position to be attracted to the front-curtain electromagnet 26 is also referred to as "charge completion state of the front curtain 21". Moreover, a state where the rear-curtain attracting piece 34b is at the position to be attracted to the rear-curtain electromagnet 36 is also referred to as "charge completion state of the rear curtain 31". Bringing the front curtain 21 into the charge completion state is also referred to as "charging the front curtain 21". Further, bringing the rear curtain 31 into the charge completion state is also referred to as "charging the rear curtain 31".

Figures 38A, 38B:
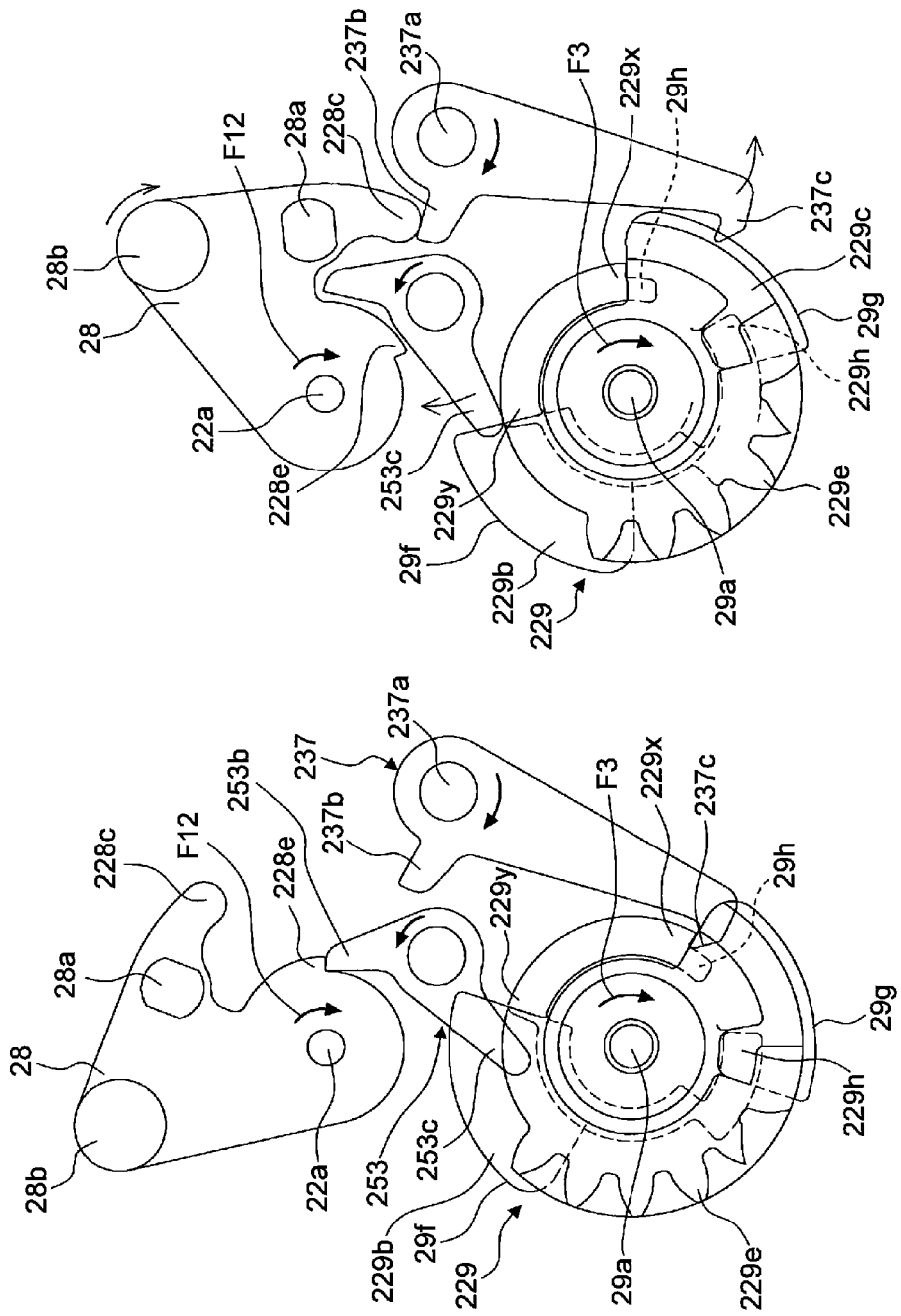
FIG. 38A is a configuration diagram of the front-curtain drive lever, the front-curtain lock lever, the charge lever and the return lock lever (when locked)
FIG. 38B is a configuration diagram of the front-curtain drive lever, the front-curtain lock lever, the charge lever and the return lock lever (when unlocked)

The charge lever 229 is arranged to release the locking of the front curtain 21 and the locking of the rear curtain 31. Specifically, as shown in FIGS. 38A and 38B, the charge lever 229 includes: the front-curtain unlocking part 229y (an example of a front-curtain unlocking part), and the rear-curtain unlocking part 229h (an example of a rear-curtain unlocking part).

The front-curtain unlocking part 229y is provided to release the restriction of the front-curtain drive lever 28 imposed by the front-curtain locking lever 253, and is arranged to be contactable with the unlocking claw 253c of the front-curtain locking lever 253. When the charge lever 229 rotates counterclockwise, the front-curtain unlocking part 229y contacts the unlocking claw 253c and the front-curtain locking lever 253 is driven clockwise by the motor 46 resisting the elastic force of the front-curtain locking spring 255. As a result, the front-curtain locking claw 253b is released from the front-curtain locking part 228e of the front-curtain drive lever 28. When the front-curtain locking claw 253b is released from the front-curtain locking part 228e, the front-curtain drive lever 28 rotates clockwise by the elastic force F12 of the front-curtain set spring 27, and the front curtain 21 runs from the second front curtain position P12 to the first front curtain position P11.

The rear-curtain unlocking part 229h is arranged to be contactable with the unlocking claw 52c of the rear-curtain locking lever 52. When the charge lever 229 rotates counterclockwise, the rear-curtain unlocking part 229h pushes the unlocking claw 52c. As a result, the rear-curtain locking lever 52 rotates in a clockwise direction resisting the elastic force of the rear-curtain locking spring 53, and the locking claw 52b is released from the rear-curtain locking part 39c. When the locking claw 52b is released from the rear-curtain locking part 39c, the rear-curtain drive lever 39 rotates clockwise by the elastic force F22 of the rear-curtain set spring 54, and the rear curtain 31 runs from the first rear curtain position P21 to the second rear curtain position P22.

The partly tooth-missing gear part 229e is rotatably arranged, together with the charge lever 229. The charge lever 229 and the partly tooth-missing gear part 229e are rotatably supported by the rotation shaft 29a. The charge lever 229 is biased clockwise by the charge-lever return spring 30. The charge-lever return spring 30 imparts the charge lever 229 with the elastic force F22 so that the charge lever 229 returns to the original position obtained before imparting the first bias force F13 and the second bias force F23 is started. The stopper 11b provided on the shutter base plate 11 abuts the charge lever 229 so as to restrict the rotation of the charge lever 229 by the charge-lever return spring 30. In a state where no force other than the bias force of the charge-lever return spring 30 acts upon the charge lever 229, the charge lever 229 is held at a position where the charge lever 229 abuts the stopper 11b.

The partly tooth-missing gear part 229e can be meshed with the partly tooth-missing gear 40. The partly tooth-missing gear 40 is rotatably supported by the shutter base plate 11. The partly tooth-missing gear 40 is configured by a stepped gear, and includes a gear part 40a having teeth extending over the length. The gear part 40a can be meshed with the planet gear 41.

The planet gear 41 is rotatably supported by the planet carrier 42. The planet carrier 42 is rotatably supported by the shutter base plate 11 around the same shaft 43b as the sun gear 43. The sun gear 43 is meshed with the planet gear 41. At this time, when an appropriate rotation load is applied to the sun gear 43, the planet carrier 42 and the planet gear 41 rotate around the shaft 43b according to a rotation direction of the sun gear 43. When the planet gear 41 rotates around the shaft 43b, a gear with which the planet gear 41 is meshed can be switched to the partly tooth-missing gear 40 or a coupling gear 47.

The planet carrier 42 includes a first rotation restriction part 42a and a second rotation restriction part 42b. The first rotation restriction part 42a and the second rotation restriction part 42b abut a first stopper 11c and a second stopper 11d provided on the shutter base plate 11, respectively. Thereby, the rotation of the planet carrier 42 relative to the shutter base plate 11 is restricted within a predetermined range.

The sun gear 43 is configured by a stepped gear, and includes a worm wheel 43a meshed with the worm gear 44. The worm gear 44 is fixed to the rotation shaft 46a of the motor 46. The worm gear 44 includes an encoder vane 44a. As a result of the encoder vane 44a blocking light of a photo interrupter 45, it becomes possible to measure a rotation amount (drive amount) or a speed of the motor 46.

The charge-lever detection switch 48 is fixed to the shutter base plate 11, and detects a rotation position of the charge lever 229. More particularly, the charge-lever detection switch 48 detects whether or not the charge lever 229 is in proximity.

2: Operation of Slit Exposure Photography

Figure 31:
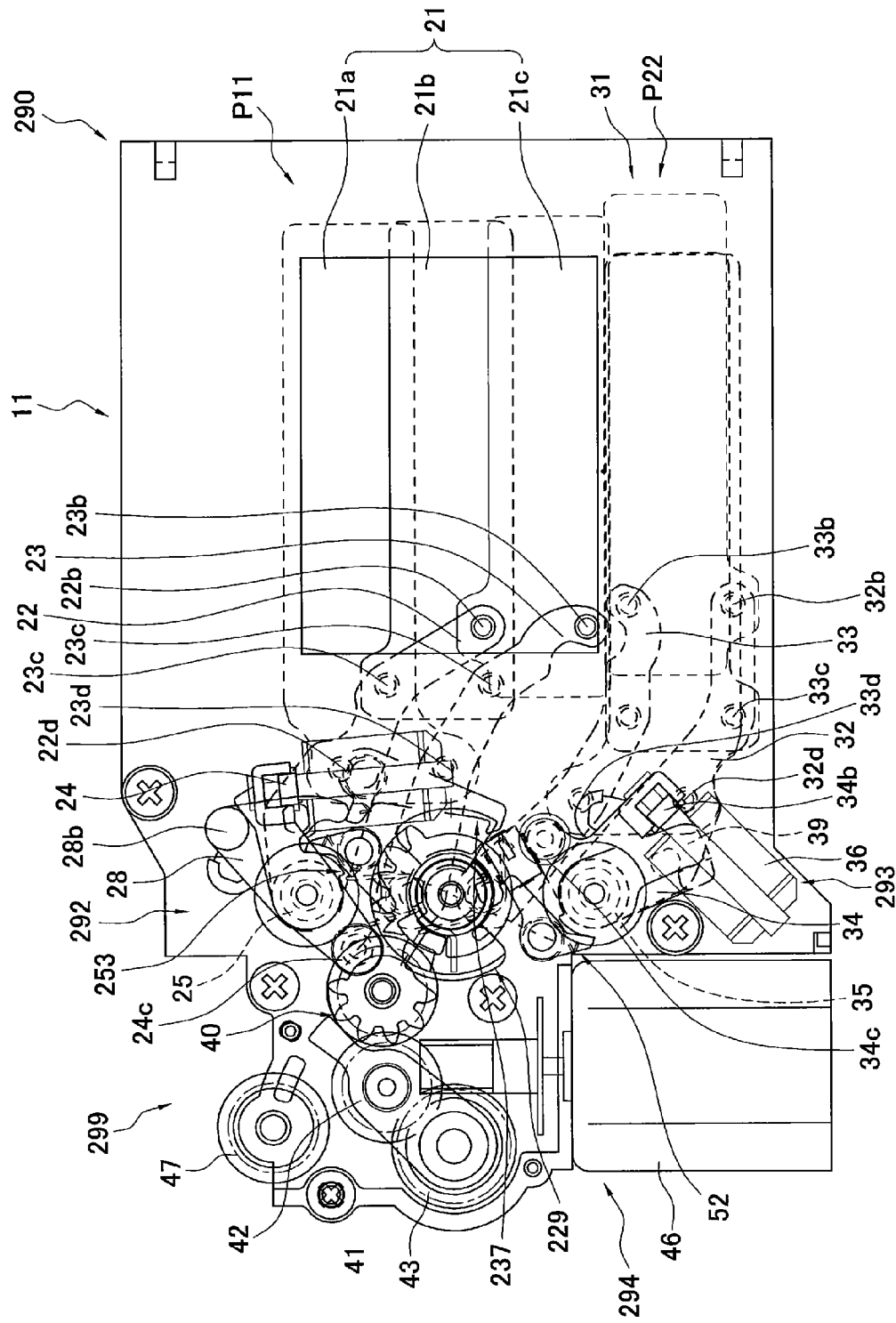
FIG. 31 is a state diagram of the focal plane shutter device 190 in a slit exposure photography standby state.
Figure 32:
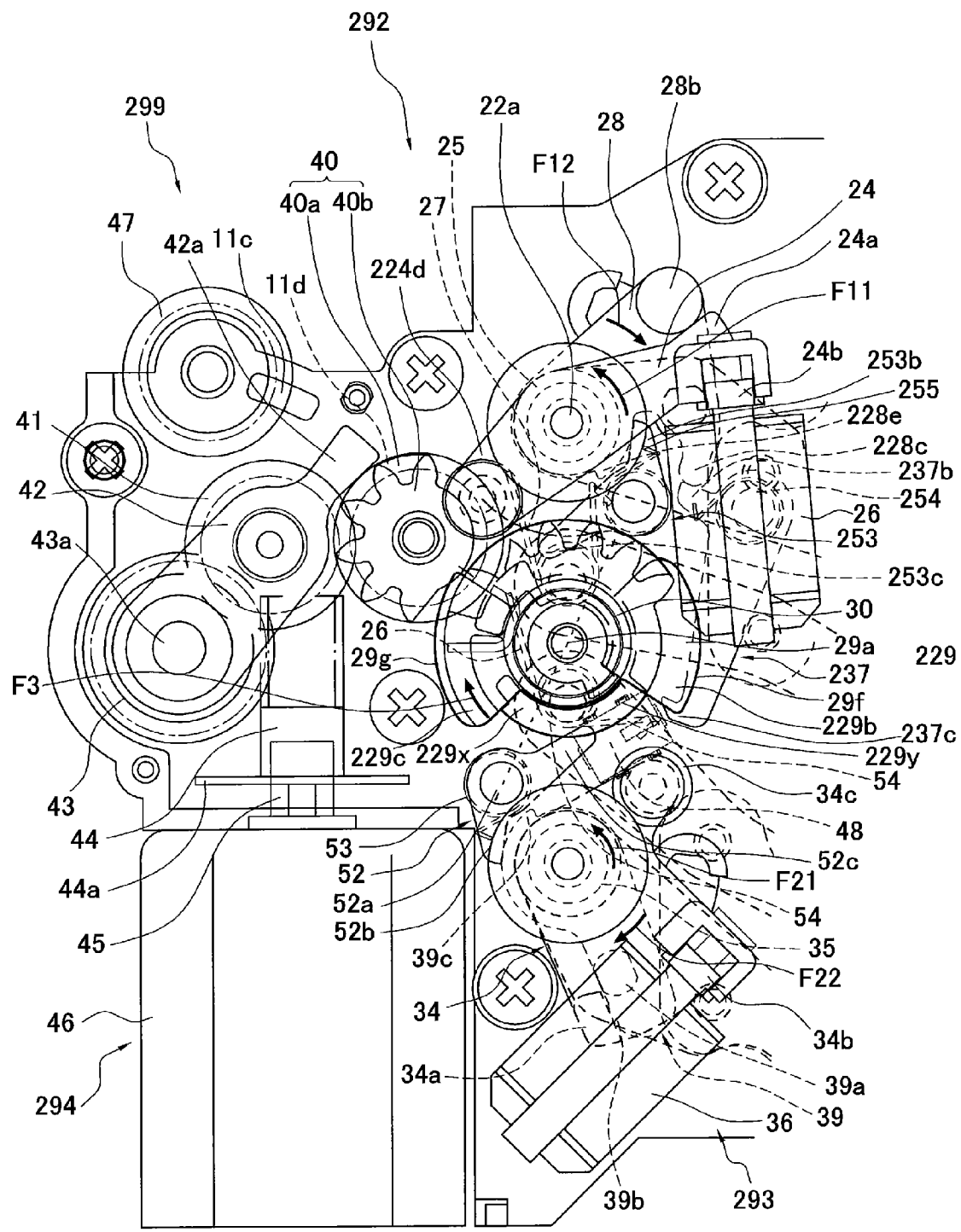
FIG. 32 is a detailed view of main parts in FIG. 31.
Figure 33:
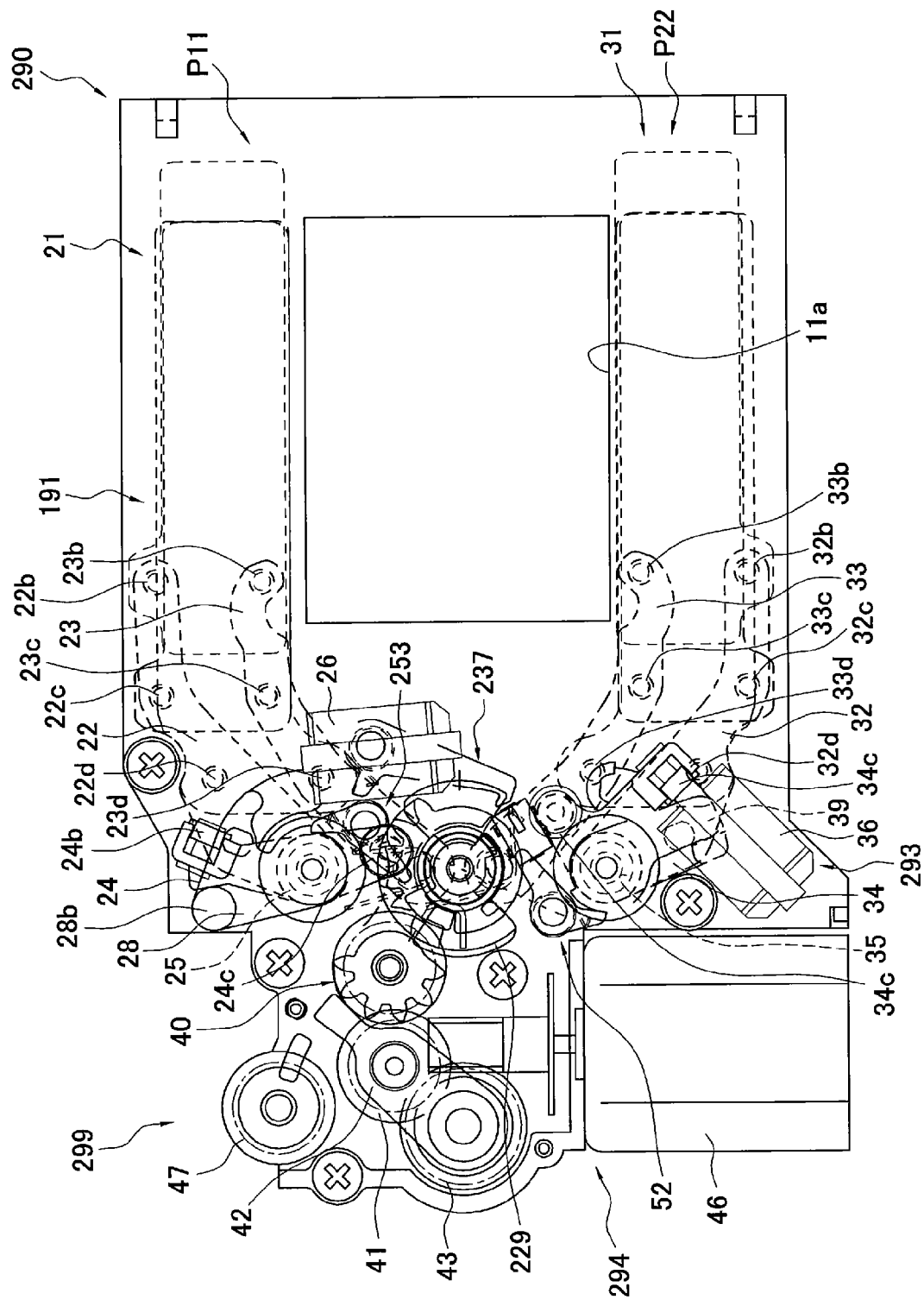
FIG. 33 is a state diagram of the focal plane shutter device 190 in an electronic front curtain photography standby state.
Figure 34:
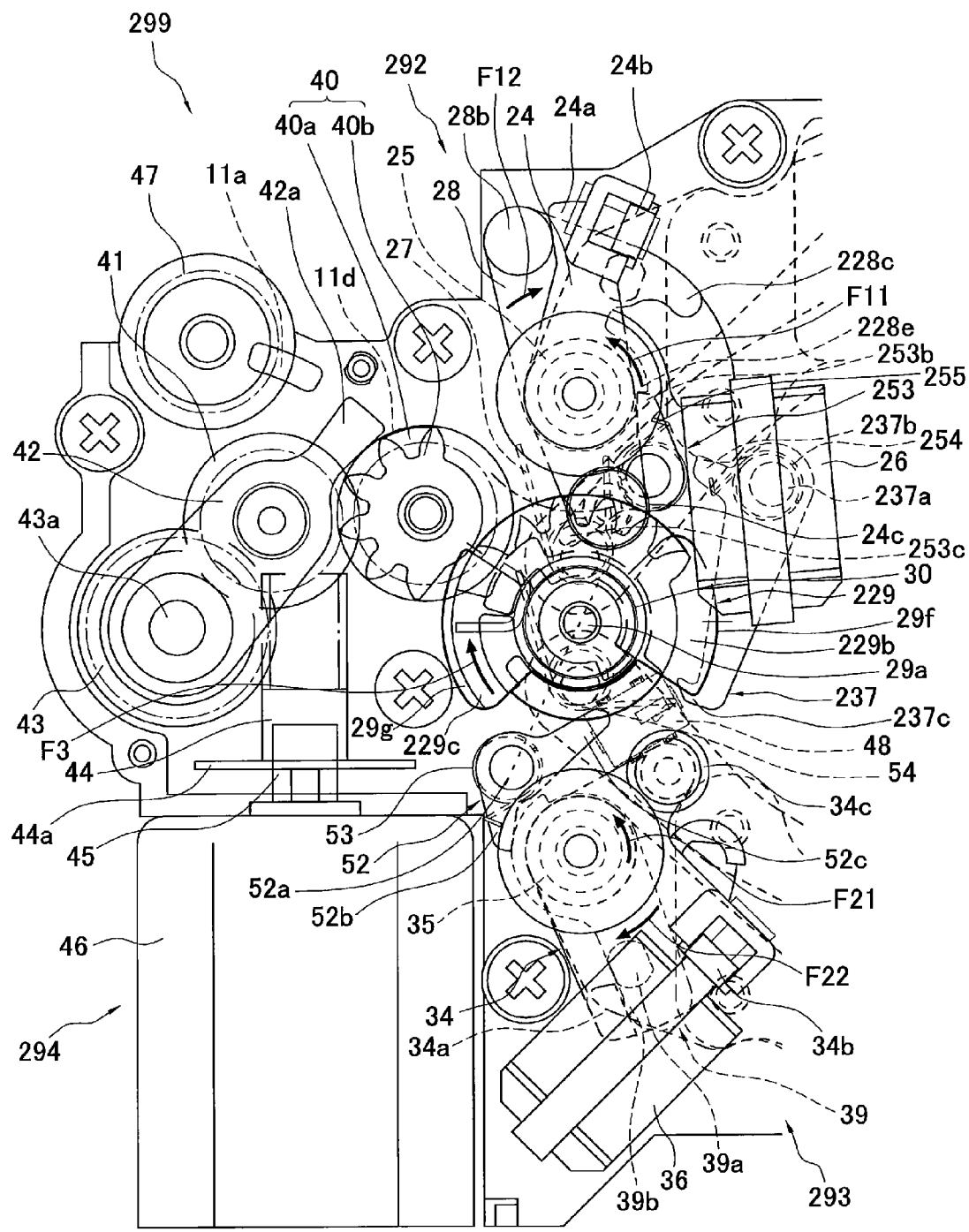
FIG. 34 is a detailed view of main parts in FIG. 33.
Figure 40:
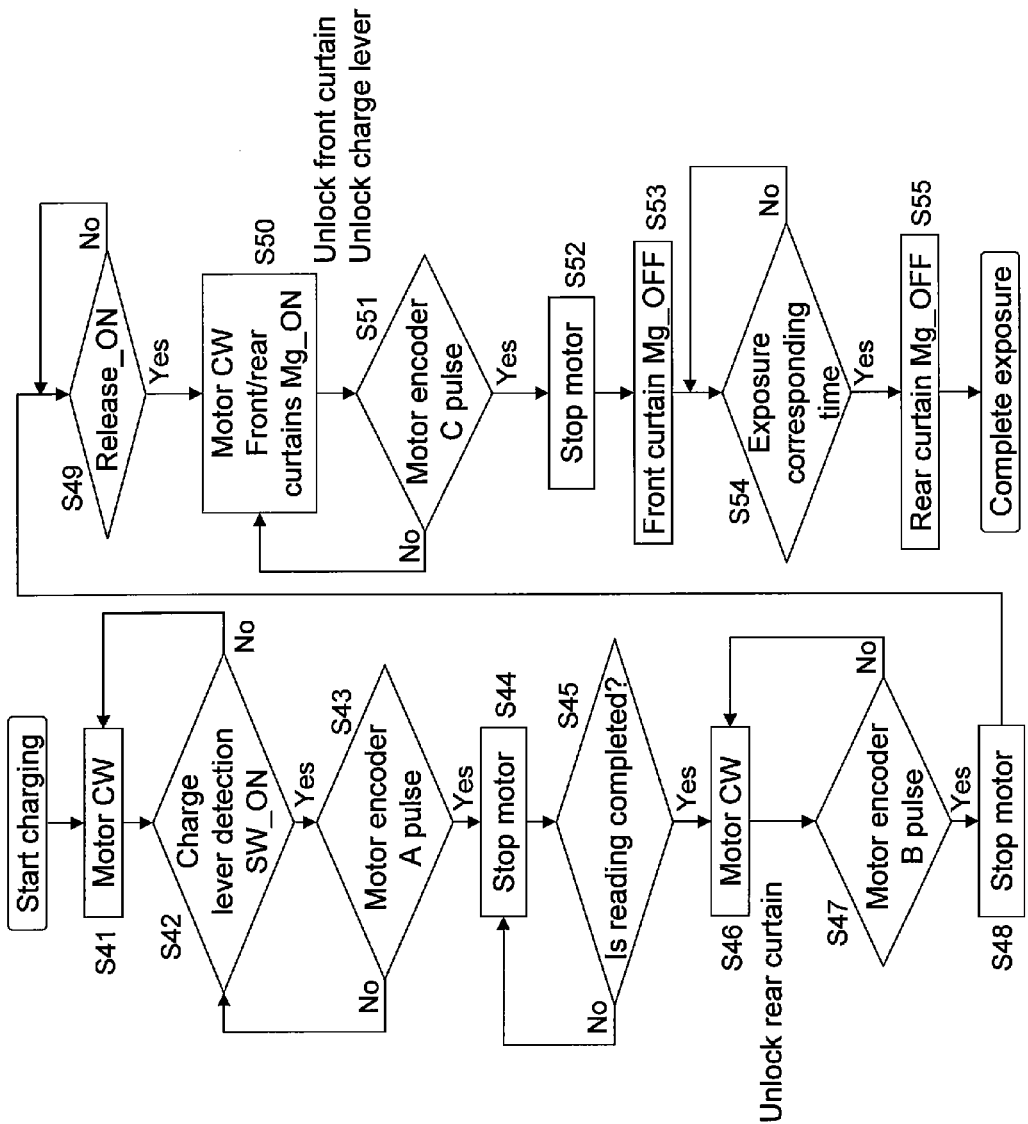
FIG. 40 is a flowchart of slit exposure photography.
Figure 41:
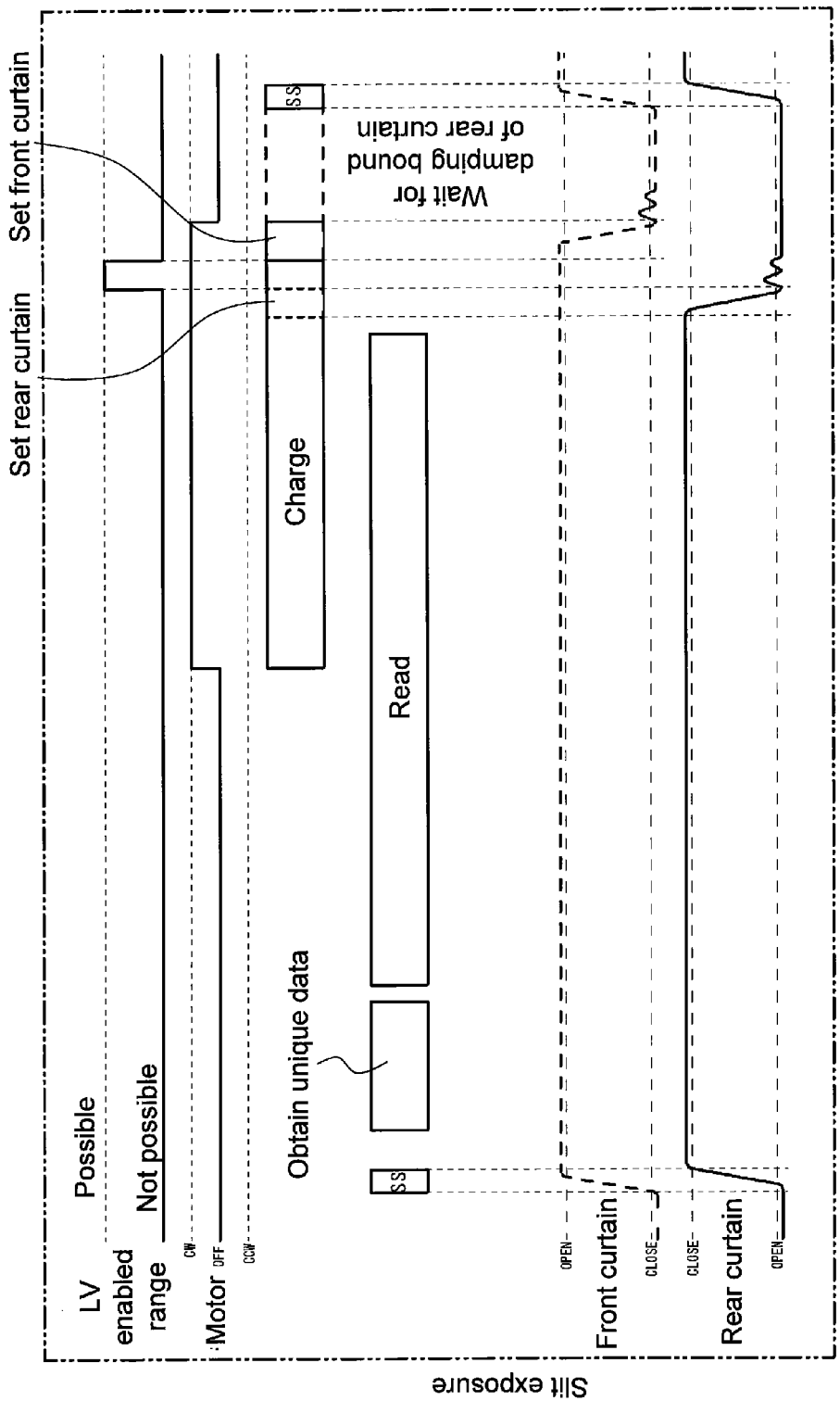
FIG. 41 is a time chart of the slit exposure photography.

Subsequently, an operation of slit exposure photography will be explained. A flowchart shown in FIG. 39 is a flowchart of the slit exposure photography. As shown in FIG. 40, a time chart shown in FIG. 31 shows a timing of an operation of the slit exposure photography.

2.1: Running Completion State

FIG. 25 shows a photography end state of the focal plane shutter device 290, i.e., a state where running of the front curtain 21 and the rear curtain 31 is completed. FIG. 26 is an enlarged view of main parts of FIG. 25.

In the running completion state shown in FIG. 25, the front curtain 21 is retracted to the upstream side of the opening part 11a by the elastic force F11 of the front-curtain running spring 25. When the front curtain 21 is disposed at the second front curtain position P12, the front-curtain set lever 24 abuts the front-curtain drive lever 28 so that the front-curtain-set-lever contacting portion 24a abuts the front-curtain-drive-lever contacting portion 28b by the elastic force F12 of the front-curtain set spring 27 and the elastic force F11 of the front-curtain running spring 25. Moreover, the state where the rear curtain 31 covers the opening part 11a by the elastic force F21 of the rear-curtain running spring 35 is maintained. In a state where the rear-curtain-set-lever contacting portion 34a abuts the rear-curtain-drive-lever contacting portion 39b by the elastic force F21 of the rear-curtain running spring 35, the rear-curtain set lever 34 keeps counterclockwise rotation.

2.2: Charge Operation

Figure 27:
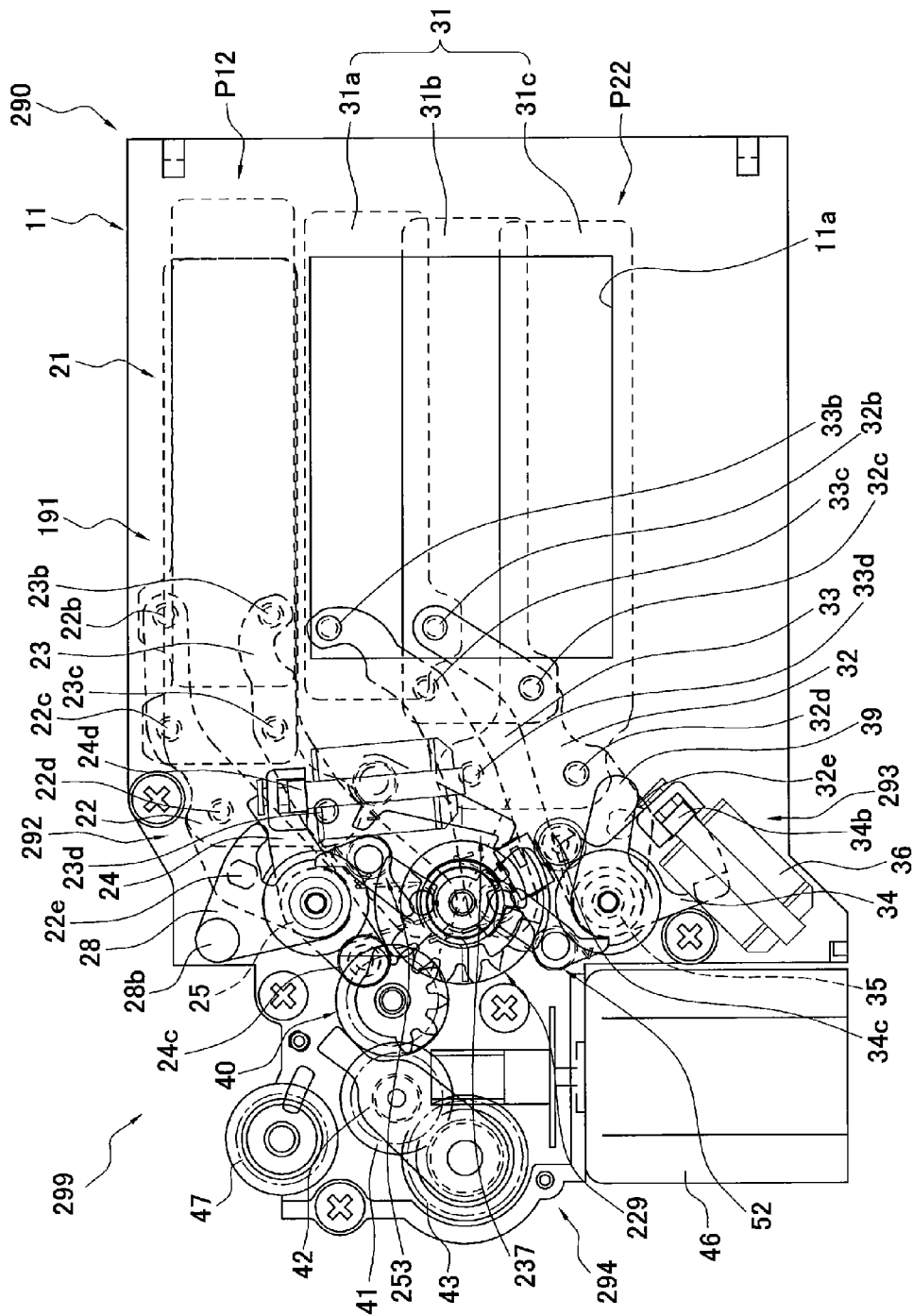
FIG. 27 is a state diagram of the focal plane shutter device 190 in a charge completion state.

FIG. 27 shows a state where charging the front curtain 21 and the rear curtain 31 is completed. In a running completion state shown in FIG. 25, the motor 46 is energized and the sun gear 43 rotates clockwise by the motor 46 (step S41). As a result, the planet carrier 42 rotates clockwise by a rotation load, resulting in the second rotation restriction part 42b abutting a second stopper 11d.

Thereafter, the planet gear 41 rotates counterclockwise, which in turns rotates the partly tooth-missing gear 40 clockwise. The partly tooth-missing part 40b provided to the partly tooth-missing gear 40 is meshed with the partly tooth-missing gear part 29e of the charge lever 229, and the partly tooth-missing gear part 29e is rotated counterclockwise. The charge lever 229 provided integrally with the partly tooth-missing gear part 29e rotates counterclockwise resisting the elastic force F22 of the charge-lever return spring 30.

At the same time that the motor 46 is energized, the charge-lever detection switch 48 starts detecting whether or not the charge lever 229 is in proximity (step S42). When the charge lever 229 is detected by the charge-lever detection switch 48 as a result of advancement of the rotation of the charge lever 229, detection of the drive amount of the motor 46 is started by using the photo interrupter 45 and the encoder vane 44a (step S43).

If the charge lever 229 rotates counterclockwise in states shown in FIGS. 25 and 26, then the rear-curtain set lever roller 34c is pressed by the rear-curtain set cam 29c, and the rear-curtain set lever 34 rotates clockwise. When the rear-curtain set lever 34 rotates clockwise, the rear curtain 31 moves from the first rear curtain position P21 toward the second rear curtain position P22, and the rear curtain 31 is retracted from the opening part 11a. When the rear-curtain set lever roller 34c reaches the outer peripheral face 29g of the rear-curtain set cam 29c, the rear curtain 31 reaches the second rear curtain position P22, and the rear-curtain attracting piece 34b is pushed against the rear-curtain electromagnet 36 (see FIGS. 27 and 28). The position of the rear-curtain set lever 34 is held by the outer peripheral face 29g of the rear-curtain set cam 29c, and thus, the elastic force F21 of the rear-curtain running spring 35 does not act, as the rotation force, upon the charge lever 229.

Similarly, when the charge lever 229 rotates counterclockwise, the front-curtain set lever roller 24c is pressed by the front-curtain set cam 29b, and the front-curtain set lever 24 rotates clockwise. When the front-curtain set lever roller 24c reaches the outer peripheral face 29f of the front-curtain set cam 29b, the front-curtain attracting piece 24b is pushed against the front-curtain electromagnet 26. The position of the front-curtain set lever 24 is held by the outer peripheral face 29f of the front-curtain set cam 29b, and thus, the elastic force F11 of the front-curtain running spring 25 does not act, as the rotation force, upon the charge lever 229.

While the rear-curtain set lever 34 rotates clockwise, the rear-curtain drive lever 39 also attempts to rotate clockwise, together with the rear-curtain set lever 34, by the elastic force F12 of the rear-curtain set spring 54.

However, the locking claw 52b of the rear-curtain locking lever 52 is hooked onto the rear-curtain locking part 39c, and thus, the clockwise rotation of the rear-curtain drive lever 39 is restricted. Therefore, although the rear-curtain set lever 34 is pushed by the charge lever 229 and rotates clockwise, the rear-curtain drive lever 39 does not rotates clockwise. Thereby, during the above-described charge operation, the rear curtain 31 is held at the second rear curtain position P22, and the rear curtain 31 keeps shielding the opening part 11a.

During the above-described charge operation, the state where the rear curtain 31 shields the opening part 11a is maintained, and thus, it is possible to read the image data from the CMOS image sensor 110 and charge the rear curtain 31 in parallel. It is noted that in the second embodiment, the state where the rear curtain 31 shields the opening part 11a is maintained until the charge operation of the rear curtain 31 is completed.

When the drive amount of the motor 46 reaches a predetermined value, the drive of the motor 46 is stopped (step S44). At this time, the charge lever 229 stops at the position shown in FIGS. 27 and 28. The charge lever 229 stops at the position shown in FIGS. 27 and 28, and thus, even after the charge operation, the state where the front curtain 21 is locked at the second front curtain position P12 and the state where the rear curtain 31 is locked at the second rear curtain position P22 are maintained.

Figure 29:
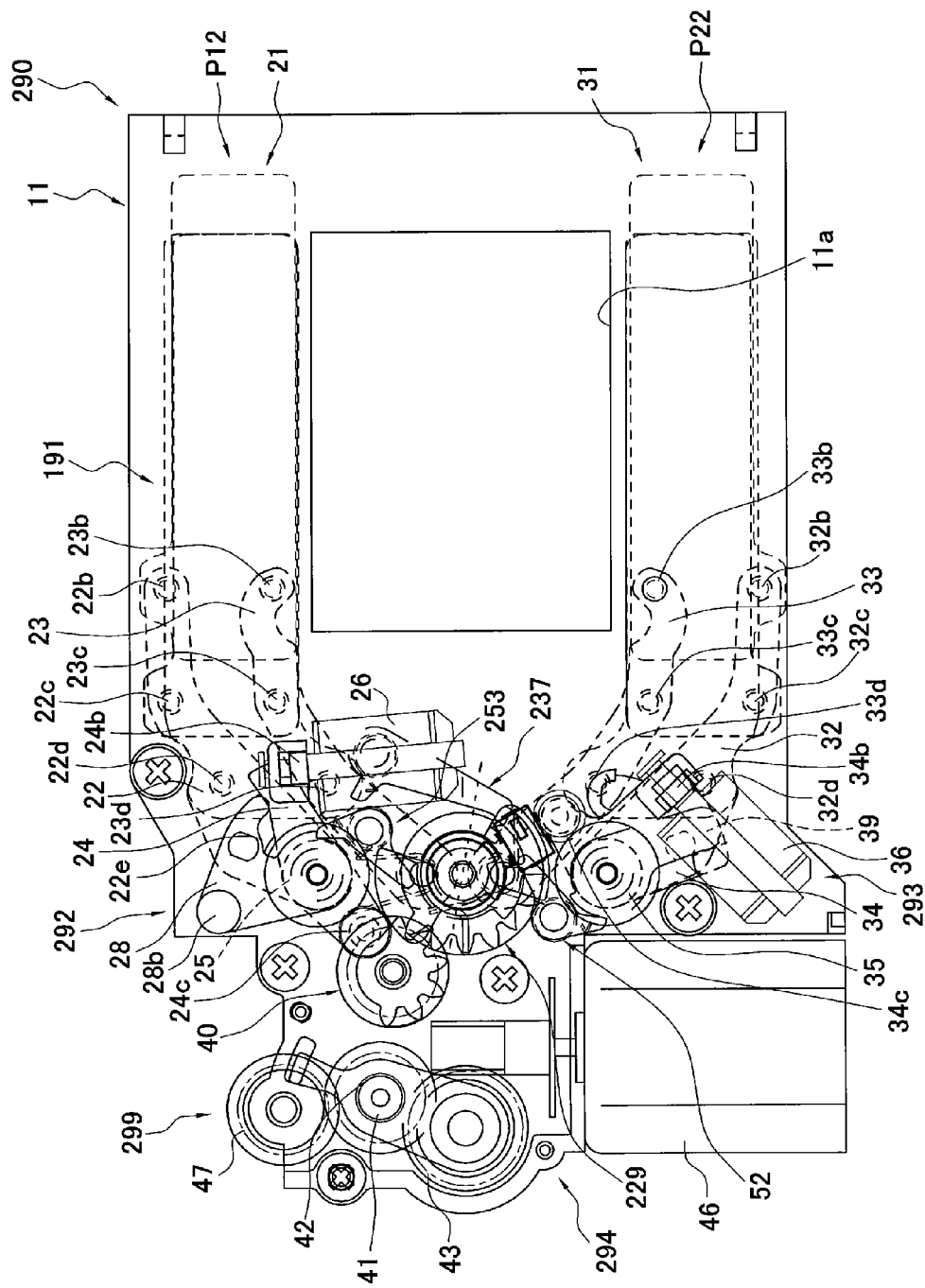
FIG. 29 is a state diagram of the focal plane shutter device 190 in a live view state.
Figure 30:
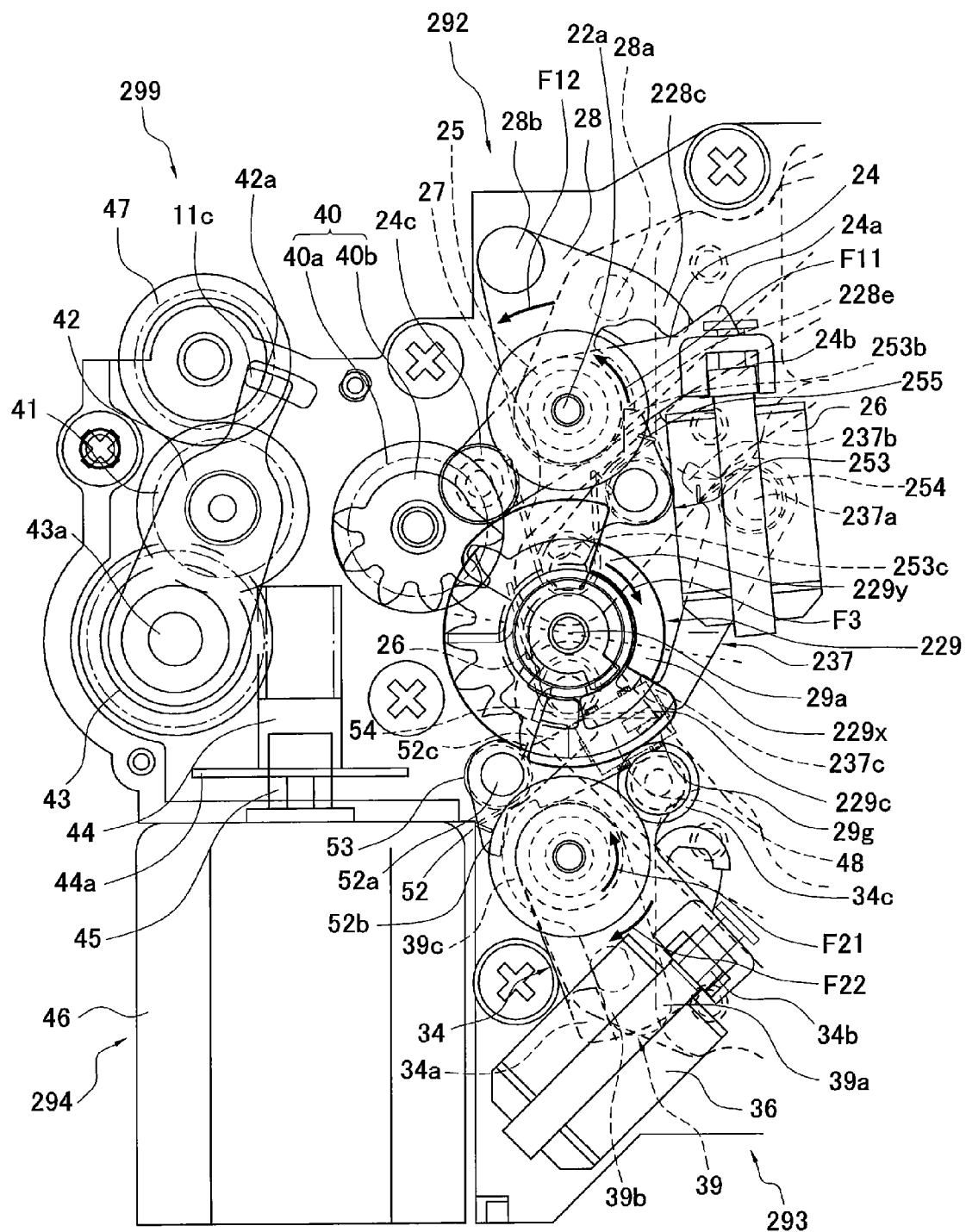
FIG. 30 is a detailed view of main parts in FIG. 29.

Upon completion of reading the image data from the CMOS image sensor 110, the drive of the charge lever 229 by the motor 46 is started again, and the charge lever 229 further rotates counterclockwise (steps S45 and S46). When the charge lever 229 rotates counterclockwise from the position shown in FIG. 27, the rear-curtain unlocking part 29h of the charge lever 229 contacts the unlocking claw 52c of the rear-curtain locking lever 52. When the unlocking claw 52c is pushed by the rear-curtain unlocking part 29h, the rear-curtain locking lever 52 rotates clockwise resisting the elastic force of the rear-curtain locking spring 53. As a result, the locking claw 52b is released from the rear-curtain locking part 39c, and the locking of the rear-curtain drive lever 39 is released. As shown in FIGS. 29 and 30, when the locking of the rear-curtain drive lever 39 is released, the rear curtain 31 moves from the first rear curtain position P21 to the second rear curtain position P22 by the elastic force of the rear-curtain set spring 54, and the state where the rear curtain 31 is retracted from the opening part 11a is maintained. When the drive amount of the motor 46 reaches a predetermined value, the drive of the charge lever 229 by the motor 46 is stopped (steps S44 and S48). In this way, the focal plane shutter device 290 reaches states shown in FIGS. 29 and 30.

On the other hand, at the position shown in FIG. 29, the front-curtain unlocking part 229y of the charge lever 229 does not contact the unlocking claw 253c of the front-curtain locking lever 253. Therefore, the locking of the front curtain 21 by the front-curtain locking lever 253 is continued, and the state where the front curtain 21 is retracted from the opening part 11a is maintained.

In a state shown in FIG. 29, the light from the subject is guided to the CMOS image sensor 110. This state is effective particularly when the user wishes to maintain a state where the CMOS image sensor 110 is exposed. For example, this state is particularly effective when by using a live view function by the camera body 100, the subject is observed, framing is performed, or moving picture photography is performed.

In this way, the focal plane shutter device 290 can automatically maintain the opened state of the opening part 11a during the charge operation and after the charge operation. That is, the focal plane shutter device 290 includes a so-called normally open function.

2.3: Reverse of Motor

When the motor 46 is inverted in a state shown in FIG. 29, the sun gear 43 rotates counterclockwise, and along therewith, the planet carrier 42 rotates counterclockwise around the shaft 43b. As a result, the first rotation restriction part 42a of the planet carrier 42 abuts the first stopper 11c. The planet gear 41 is meshed not with the partly tooth-missing gear 40 but with the coupling gear 47 at the position where the first rotation restriction part 42a abuts the first stopper 11c, and thus, the rotation of the sun gear 43 is transmitted to the coupling gear 47 via the planet gear 41. As a result of the coupling gear 47 being coupled to another drive member, the other drive member can also be driven by taking advantage of the rotation of the coupling gear 47. Examples of the other drive member include a flash pop-up.

When the planet gear 41 is meshed with the partly tooth-missing gear 40, because of a self lock function of the worm gear 44, the sun gear 43 and the planet gear 41 do not rotate, and the partly tooth-missing gear 40 meshed with the planet gear 41 does not rotate, either. Therefore, if the partly tooth-missing gear 40 is meshed with the partly tooth-missing gear part 29e, then the charge lever 29 does not rotate.

However, when the planet gear 41 rotates counterclockwise around the shaft 43b, the meshing between the planet gear 41 and the partly tooth-missing gear 40 is released. Therefore, the self lock function of the worm gear 44 does not act upon the partly tooth-missing gear 40 and the charge lever 29, resulting in the charge lever 29 being rotated clockwise by the elastic force F22 of the charge-lever return spring 30. When the charge lever 29 rotates clockwise, the front-curtain set lever 24 and the rear-curtain set lever 34 also rotate clockwise, and the charging of the front curtain 21 and the rear curtain 31 is also released.

To solve this, as shown in FIGS. 29 and 30, the locking claw 237c of the return locking lever 237 is hooked onto the reverse preventive part 229x of the charge lever 229. Thereby, the clockwise rotation of the charge lever 229 can be restricted, and it becomes possible to freely utilize the inverted rotation of the motor 46 to drive another member while maintaining the charge completion state.

2.4: Slit Exposure Standby State

When the release button 131 is operated by the user in the state shown in FIG. 29, necessary photography information such as photometry is obtained by the camera controller 140. After completing obtaining the photography information, the release operation is started.

Specifically, when the release button 131 is depressed, as shown in FIG. 39, in order to maintain the charge completion state of the front curtain 21 and the rear curtain 31, power feeding to the front-curtain electromagnet 26 and the rear-curtain electromagnet 36 is started before the motor 46 is driven or at the same time that the motor 46 is driven (steps S49 and S50). As a result, the front-curtain attracting piece 24b is attracted to the front-curtain electromagnet 26, and the rear-curtain attracting piece 34b is attracted to the rear-curtain electromagnet 36. Therefore, even when the front-curtain set lever 24 and the rear-curtain set lever 34 become able to rotate counterclockwise, the front-curtain set lever 24 and the rear-curtain set lever 34 are held at the charge position.

After the power feeding to the front-curtain electromagnet 26 and the rear-curtain electromagnet 36 is started, the motor 46 is driven by a predetermined drive amount by the camera controller 140 (steps S50, S51, and S52). Specifically, when the sun gear 43 is driven to rotate clockwise by the motor 46, the charge lever 29 rotates counterclockwise. When the charge lever 229 rotates counterclockwise, the front-curtain unlocking part 229y contacts the unlocking claw 253c of the front-curtain locking lever 253. When the unlocking claw 253c is pushed by the front-curtain unlocking part 229y, the front-curtain locking lever 253 rotates clockwise resisting the elastic force of the front-curtain locking spring 255. As a result, the front-curtain locking claw 253b is released from the front-curtain locking part 228e, and the locking of the front-curtain drive lever 28 is released. Once the locking of the front-curtain drive lever 28 is released, the front curtain 21 moves from the second front curtain position P12 to the first front curtain position P11 by the elastic force F12 of the front-curtain set spring 27, and the opening part 11a is covered by the front curtain 21, as shown in FIG. 26.

Further, when the charge lever 229 is driven to rotate counterclockwise by the motor 46, the meshing between the partly tooth-missing gear 40 and the partly tooth-missing gear part 29e is released, and the charge lever 229 rotates clockwise by the elastic force of the charge-lever return spring 30. As a result, as shown in FIG. 31, the contacting portion between the front-curtain set lever roller 24c and the front-curtain set cam 29b is released, and the contacting portion between the rear-curtain set lever roller 34c and the rear-curtain set cam 29c is released.

However, the power feeding to the front-curtain electromagnet 26 and the rear-curtain electromagnet 36 is started before the meshing between the partly tooth-missing gear 40 and the partly tooth-missing gear part 29e of the charge lever 229 is released, and thus, the front-curtain set lever 24 and the rear-curtain set lever 34 can maintain the charge state.

2.5: Slit Exposure

Thereafter, based on the release command from the camera controller 140, the power feeding to the front-curtain electromagnet 26 is stopped (step S53). Then, the front-curtain set lever 24 rotates counterclockwise by the elastic force F11 of the front-curtain running spring 25. At this time, the front-curtain-drive-lever contacting portion 28b is pushed by the front-curtain-set-lever contacting portion 24a, and thus, the front-curtain drive lever 28 rotates counterclockwise together with the front-curtain set lever 24, and the front curtain 21 runs from the first front curtain position P11 to the second front curtain position P12. As a result, the light is incident upon on the CMOS image sensor 110 through the opening part 11a, and exposing the CMOS image sensor 110 is started.

On the other hand, after a previously-set exposure time elapses from the stop of the power feeding to the front-curtain electromagnet 26, the power feeding to the rear-curtain electromagnet 36 is stopped (steps S54 and S55). The exposure time is set based on exposure information, etc., by the camera controller 140. Once the power feeding to the rear-curtain electromagnet 36 is stopped, the rear-curtain set lever 34 rotates counterclockwise by the elastic force F21 of the rear-curtain running spring 35, and the rear curtain 31 runs from the second rear curtain position P22 to the first rear curtain position P21. As a result, the opening part 11a is shielded by the rear curtain 31 sequentially from a lower portion of the opening part 11a. At this time, a slit is formed between the front curtain 21 and the rear curtain 31, and the slit moves from the downstream side to the upstream side of the opening part 11a. Thus, the CMOS image sensor 110 is exposed by light incident through the slit. The exposure operation by such a slit is called "slit exposure photography". When the front curtain 21 and rear curtain 31 complete running, the state of the focal plane shutter device 290 is changed to a state shown in FIG. 25. When the charge operation is performed, the state of the focal plane shutter device 290 is changed to a state shown in FIG. 27, and the process prepares for next photography.

In this way, when charging and reading are performed in parallel, it becomes possible to shorten a preparation time for the next photography. This makes intervals of continuous photography small, for example, enabling high-speed continuous shooting.

It is noted that when the rear curtain 31 completes running, as shown in FIG. 25, the locking claw 52*b* of the rear-curtain locking lever 52 is hooked onto the rear-curtain locking part 39*c*, and the rear curtain 31 is locked again by the rear-curtain locking lever 52.

Thus, according to a technology disclosed herein, it is possible to provide a focal plane shutter device capable of performing a slit exposure using the front curtain and the rear curtain and capable of maintaining a state where the opening part is shielded while retracting the front curtain at the time of charging the front curtain and the rear curtain. Therefore, in a state where the front curtain is retracted, for example, it is possible to read image data from the imaging element in parallel with charging the front curtain and the rear curtain.

Other Embodiments

The present invention is not limited to the above-described embodiments, and can be corrected and modified in various ways without departing from the gist of the present invention.

(1) The above-described embodiments show the interchangeable-lens-type digital camera in which the camera body 100 and the lens unit 200 can be separated; however, even with a digital camera in which a lens unit is fixed to a camera body and the exposure is controlled by the focal plane shutter device, the similar effect can be demonstrated.

(2) Although the drive units 199 and 299 are explained as example of the drive unit in the above-described embodiments, the drive unit is not limited to the above-described configuration. The drive unit can include a configuration that the front curtain 21 is held at the second front-curtain position P12 when the first bias force F13 is imparted to the front-curtain running spring 25, and the rear-curtain 31 is held at the first rear-curtain position P21 when the second bias force F23 is imparted to the rear-curtain running spring 35.

(3) In the above-described embodiments, the drive units 199 and 299 hold the rear curtain 31 at the first rear-curtain position P21 in a state where the drive units 199 and 299 complete imparting the rear-curtain running spring 35 with the second bias force F23. However, the drive unit can release holding the rear curtain 31 before the drive unit completes imparting the rear-curtain running spring 35 with the second bias force F23.

(4) In the above-described embodiments, the drive units 199 and 299 hold the front curtain 21 at the second front-curtain position P12 in a state where the drive units 199 and 299 complete imparting the rear-curtain running spring 35 with the second bias force F23. However, the drive unit can release holding the front curtain 21 before the drive unit completes imparting the front-curtain running spring 25 with the first bias force F13.

(5) In the above-described embodiments, the drive units 199 and 299 include the rear-curtain lock lever 52 configured to restrict the movement of the rear-curtain drive lever 39 when the rear curtain 31 moves from the first rear-curtain position P21 to the second rear-curtain position P22. However, a configuration that restricts movement of the rear curtain 31 is not limited to the above-described configuration.

For example, the charge lever 29 can restrict movement of the rear curtain 31 to the second rear-curtain position P22.

(6) In the above-described embodiments, the charge levers 29 and 229 release restricting the rear-curtain drive lever 39 by the rear-curtain lock lever 52. However, the restricting the rear-curtain drive lever 39 by the rear-curtain lock lever 52 can be released by other members.

(7) Although the charge lever 29 holds the front curtain 21 at the second front-curtain position P12 via the front-curtain drive lever 28 in the above-described embodiments, other members can hold the front curtain 21 at the second front-curtain position P12 like the second embodiment.

(8) In the above-described embodiments, the timing at which the charge mechanism 194 completes charging the rear-curtain running spring 35 is earlier than the timing at which the charge mechanism 194 completes charging the front-curtain running spring 25. However, the timing at which the charge mechanism 194 completes charging the rear-curtain running spring 35 may be different from the timing at which the charge mechanism 194 completes charging the front-curtain running spring 25. For example, the timing at which the charge mechanism 194 completes charging the front-curtain running spring 25 is earlier than the timing at which the charge mechanism 194 completes charging the rear-curtain running spring 35.

(9) In the above-described embodiments, the timing at which the charge mechanism 194 starts charging the front-curtain running spring 25 is earlier than the timing at which the charge mechanism 194 starts charging the rear-curtain running spring 35. However, the timing at which the charge mechanism 194 starts charging the front-curtain running spring 25 can be the same as the timing at which the charge mechanism 194 starts charging the rear-curtain running spring 35, and the timing at which the charge mechanism 194 starts charging the rear-curtain running spring 35 can be earlier than the timing at which the charge mechanism 194 starts charging the front-curtain running spring 25.

(10) Although the charge lever 29 is restricted to return to the original position by the reverse preventive part 29*da* and the claw 28*c*, the charge lever 29 does not need to have the reverse preventive part 29*da*.

Features of the Embodiments

The features in the above-described embodiments are listed below. It is noted that the invention included in the above-described embodiments is not limited to below. Moreover, the components in parentheses after the respective configurations are specific examples of each configuration in order to facilitate the understanding of the characteristics. Each configuration should not be limited to these specific examples. Further, in order to obtain the effects described regarding each characteristic, the configuration other than the listed characteristics may be modified or deleted.

(1) A focal plane shutter device according to a first aspect comprises:

a shutter base plate (11) having an opening part (11*a*);

a front curtain (21) disposed to be movable between a first front curtain position (P11) at which the front curtain (21) covers the opening part (11*a*) and a second front curtain position (P12) at which the front curtain (21) is retracted from the opening part (11*a*);

a first elastic member (front-curtain running spring 25) for imparting the front curtain (21) with an elastic force so that the front curtain (21) moves from the first front curtain position (P11) to the second front curtain position (P12);

a rear curtain (31) disposed to be movable between the first rear curtain position (P21) at which the rear curtain (31) covers the opening part (11*a*) and the second rear curtain position (P22) at which the rear curtain (31) is retracted from the opening part (11*a*);

a second elastic member (rear-curtain running spring 35) for imparting the rear curtain (31) with an elastic force so that the rear curtain (31) moves from the first rear curtain position (P21) to the second rear curtain position (P22); and a drive unit (199, 299) configured to impart the first elastic member (front-curtain running spring 25) and the second elastic member (rear-curtain running spring 35) with a first bias force resisting the elastic force of the first elastic member (front-curtain running spring 25) and a second bias force resisting the elastic force of the second elastic member (rear-curtain running spring 35), the drive unit (199, 299) being configured to hold the front curtain (21) at the second front curtain position (P12) when imparting the first elastic member (front-curtain running spring 25) with the first bias force, and the drive unit (199, 299) being configured to hold the rear curtain (31) at the first rear curtain position (P21) when imparting the second elastic member (rear-curtain running spring 35) with the second bias force.

In this focal plane shutter device, by the drive unit (199, 299), the front curtain (21) is held at the second front curtain position (P12) when imparting the first elastic member (front-curtain running spring 25) with the first bias force, and the rear curtain (31) is held at the first rear curtain position (P21) when imparting the second elastic member (rear-curtain running spring 35) with the second bias force. Thus, it is possible to perform a slit exposure using the front curtain (21) and the rear curtain (31) and to keep a state where the opening part (11*a*) is covered while retracting the front curtain (21) at the time of charging the front curtain (21) and the rear curtain (31). Therefore, in a state where the front curtain (21) is retracted, for example, it is possible to read image data from the imaging element in parallel with charging the front curtain (21) and the rear curtain (31).

(2) A focal plane shutter device according to a second aspect is the focal plane shutter device according to the first aspect, wherein the drive unit (199, 299) holds the rear curtain (31) at the first rear curtain position (P21) in a state where imparting the second elastic member (rear-curtain running spring 35) with the second bias force is completed.

(3) A focal plane shutter device according a third aspect is the focal plane shutter device according to the first or second aspect, wherein the drive unit (199, 299) holds the front curtain (21) at the second front curtain position (P12) in a state where imparting the first elastic member (front-curtain running spring 25) with the first bias force is completed.

(4) A focal plane shutter device according a fourth aspect is the focal plane shutter device according to the first to third aspects, wherein the drive unit (199, 299) includes an actuator (motor 46) for generating the first bias force and the second bias force, and a charge member (charge lever 29, 229) arranged to transmit the first bias force to the first elastic member (front-curtain running spring 25) and arranged to transmit the second bias force to the second elastic member (rear-curtain running spring 35).

(5) A focal plane shutter device according a fifth aspect is the focal plane shutter device according to the fourth aspect, wherein the drive unit (199, 299) includes a rear-curtain drive member (rear-curtain drive lever 39) coupling the rear curtain (31) to the shutter base plate (11) to be movable between the first rear curtain position (P21) and the second rear curtain position (P22), and a rear-curtain locking member (rear-curtain locking lever 52) arranged to restrict movement of the rear-curtain drive member (rear-curtain drive lever 39) when the rear curtain (31) moves from the first rear curtain position (P21) to the second rear curtain position (P22).

(6) A focal plane shutter device according a sixth aspect is the focal plane shutter device according to the fifth aspect, wherein the charge member (charge lever 29, 229) includes a rear-curtain unlocking part (29*h*) for releasing the restriction of the rear-curtain drive member (rear-curtain drive lever 39) imposed by the rear-curtain locking member (rear-curtain locking lever 52).

(7) A focal plane shutter device according a seventh aspect is the focal plane shutter device according to the fifth or sixth, wherein the drive unit (199, 299) includes a rear-curtain lock elastic member (rear-curtain locking spring 53) for imparting the rear-curtain locking member (rear-curtain locking lever 52) with an elastic force so that the rear-curtain locking member (rear-curtain locking lever 52) keeps a state of restricting the movement of the rear-curtain drive member (rear-curtain drive lever 39), and the actuator (motor 46) is configured to drive the rear-curtain locking member (rear-curtain locking lever 52) via the charge member (charge lever 29, 229) to resist the elastic force of the rear-curtain lock elastic member (rear-curtain locking spring 53).

(8) A focal plane shutter device according an eighth aspect is the focal plane shutter device according to the fifth to seventh aspects, wherein the drive unit (199, 299) includes a rear-curtain set member (rear-curtain set lever 34) arranged to transmit the elastic force of the second elastic member (rear-curtain running spring 35) to the rear-curtain drive member (rear-curtain drive lever 39), and the rear-curtain set member (rear-curtain set lever 34) is driven by the actuator (motor 46) via the charge member (charge lever 29, 229) when imparting the second elastic member (rear-curtain running spring 35) with the second bias force.

(9) A focal plane shutter device according a ninth aspect is the focal plane shutter device according to the fourth to eighth aspects, wherein the drive unit (199) includes a front-curtain drive member (front-curtain drive lever 28) coupling the front curtain (21) to the shutter base plate (11) to be movable between the first front curtain position (P11) and the second front curtain position (P12), the charge member (charge lever 29, 229) includes a front-curtain holding part (29*d*) for holding the front curtain (21) at the second front curtain position (P12) via the front-curtain drive member (front-curtain drive lever 28), and the front-curtain drive member (front-curtain drive lever 28) includes a contacting portion provided to abut the front-curtain holding part (29*d*).

(10) A focal plane shutter device according a tenth aspect is the focal plane shutter device according to the ninth aspect, wherein the actuator (motor 46) is configured to drive the charge member (charge lever 29) to a front-curtain charge completion position at which imparting the first elastic member (front-curtain running spring 25) with the first bias force is completed and a rear-curtain charge completion position, different from the front-curtain charge completion position, at which imparting the second elastic member (rear-curtain running spring 35) with the second bias force is completed, and when the charge member (charge lever 29) is at the front-curtain charge completion position, the front-curtain holding part (29*d*) enters into a moving region of the contacting portion obtained when the front curtain (21) moves from the second front curtain position (P12) to the first front curtain position (P11).

(11) An imaging device according an eleventh aspect comprises:

the focal plane shutter device (190, 290) according to the tenth aspect;

an imaging element (CMOS image sensor 110) for converting an optical image of a subject into an image signal; and a controller (camera controller 140) for controlling the imaging element (CMOS image sensor 110) and the focal plane shutter device (190, 290), wherein the imaging element (CMOS image sensor 110) includes an electronic front curtain photography function for sequentially resetting a pixel in a running direction of the front curtain (21), and the controller (camera controller 140) controls the actuator (motor 46) to stop the charge member (charge lever 29, 229) at the second charge completion position when photographing by using the electronic front curtain photography function, and establishes an electronic front curtain photography standby state when the drive unit (199, 299) completes imparting the second elastic member (rear-curtain running spring 35) with the second bias force and when the drive unit (199, 299) does not complete imparting the first elastic member (front-curtain running spring 25) with the first bias force.

(12) A focal plane shutter device according a twelfth aspect is the focal plane shutter device according to the fourth to eighth aspects, wherein the drive unit (199, 299) includes a front-curtain drive member (front-curtain drive lever 28) coupling the front curtain (21) to the shutter base plate (11) to be movable between the first front curtain position (P11) and the second front curtain position (P12), and a front-curtain locking member (front-curtain locking lever 253) arranged to restrict movement of the front-curtain drive member (front-curtain drive lever 28) when the front curtain (21) moves from the second front curtain position (P12) to the first front curtain position (P11).

(13) A focal plane shutter device according a thirteenth aspect is the focal plane shutter device according to the twelfth aspect, wherein the charge member (charge lever 229) includes a front-curtain unlocking part for (29*h*) releasing the restriction of the front-curtain drive member (front-curtain drive lever 28) imposed by the front-curtain locking member (front-curtain locking lever 253).

(14) A focal plane shutter device according a fourteenth aspect is the focal plane shutter device according to the twelfth or thirteenth aspect, wherein the drive unit (299) includes a front-curtain locking elastic member for imparting the front-curtain locking member (front-curtain locking lever 253) with an elastic force so that the front-curtain locking member (front-curtain locking lever 253) keeps a state of restricting the movement of the front-curtain drive member (front-curtain drive lever 28), and the actuator (motor 46) configured to drive the front-curtain locking member (front-curtain locking lever 253) via the charge member (charge lever 29, 229) so as to resist the elastic force of the front-curtain lock elastic member (front-curtain locking spring 255).

(15) A focal plane shutter device according a fifteenth aspect is the focal plane shutter device according to the twelfth to fourteenth aspect, wherein the drive unit (299) includes a front-curtain set member (front-curtain set lever 24) arranged to transmit the elastic force of the first elastic member (front-curtain running spring 25) to the front-curtain drive member (front-curtain drive lever 28), and the front-curtain set member (front-curtain set lever 24) is driven by the actuator (motor 46) via the charge member (charge lever 29, 229) when imparting the first elastic member (front-curtain running spring 25) with the first bias force.

(16) A focal plane shutter device according a sixteenth aspect is the focal plane shutter device according to the fourth to fifteenth aspects, wherein the drive unit (199, 299) includes a return elastic member (charge-lever return spring 30) for imparting the charge member (charge lever 29, 229) with an elastic force so that the charge member (charge lever 29, 229) returns to an original position obtained before the charge member (charge lever 29, 229) imparts the first bias force and the second bias force, and a return locking member (front-curtain drive lever 28, return locking lever 237) for restricting the returning of the charge member (charge lever 29, 229) to the original position.

(17) A focal plane shutter device according a seventeenth aspect is the focal plane shutter device according to the first to sixteenth aspects, wherein a timing at which the drive unit (199, 299) completes imparting the first elastic member (front-curtain running spring 25) with the first bias force is different from a timing at which the drive unit (199, 299) completes imparting the second elastic member (rear-curtain running spring 35) with the second bias force.

At the time of completion or about the time of completion of imparting the first elastic member (front-curtain running spring 25) with the first bias force, a force required for imparting the first bias force is at the maximum. Moreover, at the time of completion or about the time of completion of imparting the second elastic member (rear-curtain running spring 35) with the second bias force, a force required for imparting the bias force is at the maximum.

However, in the focal plane shutter device, the timing at which the charge mechanism (194) completes imparting the first elastic member (front-curtain running spring 25) with the first bias force is different from the timing at which the charge mechanism (194) completes imparting the second elastic member (rear-curtain running spring 35) with the second bias force. Thus, it is possible to reduce maximum values of a total of the first bias force and the second bias force. This can decrease a load of the charge mechanism (194).

Moreover, in the focal plane shutter device, it is possible to perform a slit exposure photography by the front curtain (21) and the rear curtain (31).

Therefore, with the focal plane shutter device, it is possible to perform the slit exposure photography using the front curtain (21) and the rear curtain (31), and moreover, it is possible to decrease a load of a drive source at the time of charging the front curtain (21) and the rear curtain (31).

(18) A focal plane shutter device according an eighteenth aspect is the focal plane shutter device according to the first to seventeenth aspect, wherein a timing at which the drive unit (199, 299) completes imparting the second elastic member (rear-curtain running spring 35) with the second bias force is earlier than a timing at which the drive unit (199, 299) completes imparting the first elastic member (front-curtain running spring 25) with the first bias force.

With this focal plane shutter device, since the charge completion of the rear curtain (31) can be earlier, it is possible to speed up the electric front curtain photography.

(19) A focal plane shutter device according a nineteenth aspect is the focal plane shutter device according to the first to eighteenth aspects, wherein a timing at which the drive unit (199, 299) starts imparting the second elastic member (rear-curtain running spring 35) with the second bias force is earlier than a timing at which the drive unit (199, 299) starts imparting the first elastic member (front-curtain running spring 25) with the first bias force.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of an imaging device equipped with the focal plane shatter device. Accordingly, these terms, as utilized to describe the present invention should be interpreted relative to an imaging device equipped with the focal plane shatter device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A focal plane shutter device comprising:

a shutter base plate defining an opening;

a front curtain movably disposed between a first front curtain position to cover the opening and a second front curtain position to uncover the opening;

a first urging member configured to apply an urging force to the front curtain to move the front curtain from the first front curtain position to the second front curtain position;

a rear curtain movably disposed between a first rear curtain position to cover the opening and a second rear curtain position to uncover the opening;

a second urging member configured to apply an urging force to the rear curtain to move the rear curtain from the second rear curtain position to the first rear curtain position; and a drive unit configured to apply a first biasing force to the first urging member to resist the urging force of the first urging member and apply a second biasing force to the second urging member to resist the urging force of the second urging member, the drive unit being further configured to hold the front curtain at the second front curtain position until application of the first biasing force to the first urging member has ended and hold the rear curtain at the first rear curtain position until application of the second biasing force to the second urging member has ended.

2. The focal plane shutter device according to claim 1, wherein the drive unit includes an actuator and a charge member, the actuator is configured to generate the first biasing force and the second biasing force, and the charge member is configured to transmit the first biasing force to the first urging member and the second biasing force to the second urging member.

3. The focal plane shutter device according to claim 2, wherein the drive unit further includes a rear-curtain drive member and a rear-curtain locking member, the rear-curtain drive member couples the rear curtain to the shutter base plate so that the rear curtain is movable between the first rear curtain position and the second rear curtain position, and the rear-curtain locking member is configured to restrict movement of the rear-curtain drive member when the rear curtain moves from the first rear curtain position to the second rear curtain position.

4. The focal plane shutter device according to claim 3, wherein the charge member includes a rear-curtain unlocking part configured to release the rear-curtain drive member from a restricted position imposed by the rear-curtain locking member.

5. The focal plane shutter device according to claim 3, wherein the drive unit further includes a rear-curtain lock urging member configured to apply an urging force to the rear-curtain locking member so that the rear-curtain locking member prevents the rear-curtain drive member from moving, and the actuator is further configured to drive the rear-curtain locking member via the charge member to resist the urging force of the rear-curtain lock urging member.

6. The focal plane shutter device according to claim 3, wherein
the drive unit further includes a rear-curtain set member arranged to transmit the urging force of the second urging member to the rear-curtain drive member, and
the actuator is further configured to drive the rear-curtain set member via the charge member when the second biasing force is applied to the second urging member.

7. The focal plane shutter device according to claim 2, wherein
the drive unit further includes a front-curtain drive member with a contact portion, the front-curtain drive member couples the front curtain to the shutter base plate so that the front curtain is movable between the first front curtain position and the second front curtain position, and
the charge member includes a front-curtain holding part arranged to gently rub against and briefly engage the contact portion and configured to hold the front curtain at the second front curtain position via the front-curtain drive member.

8. The focal plane shutter device according to claim 7, wherein
the actuator is further configured to drive the charge member to a front-curtain charge terminating position at which time the first biasing force that is applied to the first urging member has terminated and drive the charge member to a rear-curtain charge terminating position, which is different from the front-curtain charge terminating position, at which time the second biasing force that is applied to the second urging member has terminated, and
when the charge member is at the front-curtain charge terminating position, the front-curtain holding part passes through a substantially arc-shaped trajectory where the contact portion is moved when the front curtain moves from the second front curtain position to the first front curtain position.

9. An imaging device comprising:
the focal plane shutter device according to claim 8;
an imaging element configured to convert an optical image of a subject into an image signal, the imaging element including an electronic front curtain photography function that sequentially resets a pixel in a running direction of the front curtain; and
a controller operatively coupled to the imaging element and the focal plane shutter device to control the imaging element and the focal plane shutter device, the controller being configured to control the actuator during photographing by using the electronic front curtain photography function so that the charge member stops at the second charge terminating position, and the controller being further configured to establish an electronic front curtain photography standby state when the drive unit stops applying the second biasing force to the second urging member and before the drive unit stops applying the first biasing force to the first urging member.

10. The focal plane shutter device according to claim 2, wherein
the drive unit further includes a front-curtain drive member and a front-curtain locking member, the front-curtain drive member couples the front curtain to the shutter base plate so that the front curtain is movable between the first front curtain position and the second front curtain position, and the front-curtain locking member is arranged to restrict movement of the front-curtain drive member when the front curtain moves from the second front curtain position to the first front curtain position.

11. The focal plane shutter device according to claim 10, wherein
the charge member includes a front-curtain unlocking part configured to release the front-curtain drive member from a restricted position imposed by the front-curtain locking member.

12. The focal plane shutter device according to claim 10, wherein
the drive unit further includes a front-curtain locking urging member that applies an urging force to the front-curtain locking member so that movement of the front-curtain drive member is restricted by the front-curtain locking member, and
the actuator is configured to drive the front-curtain locking member via the charge member so as to resist the urging force of the front-curtain lock urging member.

13. The focal plane shutter device according to claim 10, wherein
the drive unit further includes a front-curtain set member configured to transmit the urging force of the first urging member to the front-curtain drive member, and
the actuator is further configured to drive the front-curtain set member via the charge member when the first biasing force is applied to the first urging member.

14. The focal plane shutter device according to claim 2, wherein
the drive unit further includes a return urging member and a return locking member, the return urging member applies an urging force to the charge member so that the charge member returns to an initial position before application of the first biasing force and the second biasing force by the charge member, and the return locking member restricts the charge member from returning to the initial position.

15. The focal plane shutter device according to claim 1, wherein
the first biasing force that is applied to the first urging member is terminated at a different time than the second biasing force that is applied to the second urging member.

16. The focal plane shutter device according to claim 1, wherein
the second biasing force that is applied to the second urging member terminates earlier than the first biasing force that is applied to the first urging member.

17. The focal plane shutter device according to claim 1, wherein
the second biasing force that is applied to the second urging member is applied earlier than the first biasing force that is applied to the first urging member.

18. An imaging device comprising:
a focal plane shutter device;
the focal plane shutter device including:
a shutter base plate defining an opening;
a front curtain movably disposed between a first front curtain position to cover the opening and a second front curtain position to uncover the opening;
a first urging member configured to apply an urging force to the front curtain to move the front curtain from the first front curtain position to the second front curtain position;
a rear curtain movably disposed between a first rear curtain position to cover the opening and a second rear curtain position to uncover the opening;

a second urging member configured to apply an urging force to the rear curtain to move the rear curtain from the first rear curtain position to the second rear curtain position; and a drive unit configured to apply a first biasing force to the first urging member to resist the urging force of the first urging member and apply a second biasing force to the second urging member to resist the urging force of the second urging member, the drive unit being further configured to hold the front curtain at the second front curtain position when the first biasing force is being applied to the first urging member and hold the rear curtain at the first rear curtain position when the second biasing force is being applied to the second urging member;

an imaging element configured to convert an optical image of a subject into an image signal, the imaging element including an electronic front curtain photography function that sequentially resets a pixel in a running direction of the front curtain; and a controller operatively coupled to the imaging element and the focal plane shutter device to control the imaging element and the focal plane shutter device, the controller being configured to control the actuator during photographing by using the electronic front curtain photography function so that the charge member stops at the second charge terminating position, and the controller being further configured to establish an electronic front curtain photography standby state when the drive unit stops applying the second biasing force to the second urging member and before the drive unit stops applying the first biasing force to the first urging member.

* * * * *